(12) United States Patent
Shimoshikiryoh et al.

(10) Patent No.: US 10,948,782 B2
(45) Date of Patent: Mar. 16, 2021

(54) LIQUID CRYSTAL PANEL AND METHOD OF MANUFACTURING THEREOF

(71) Applicant: SHARP KABUSHIKI KAISHA, Sakai (JP)

(72) Inventors: Fumikazu Shimoshikiryoh, Sakai (JP); Shinichi Terashita, Sakai (JP); Kouichi Watanabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 33 days.

(21) Appl. No.: 16/368,182

(22) Filed: Mar. 28, 2019

(65) Prior Publication Data

US 2019/0302542 A1 Oct. 3, 2019

(30) Foreign Application Priority Data

Mar. 28, 2018 (JP) .............................. JP2018-062301

(51) Int. Cl.
*G02F 1/1337* (2006.01)
*G02F 1/1343* (2006.01)

(52) U.S. Cl.
CPC .. *G02F 1/133753* (2013.01); *G02F 1/133707* (2013.01); *G02F 1/134336* (2013.01); *G02F 2001/133757* (2013.01); *G02F 2001/133761* (2013.01)

(58) Field of Classification Search
CPC ......... G02F 1/133753; G02F 1/134336; G02F 1/133707; G02F 2001/133761; G02F 2001/133757
USPC .................................................. 349/123–136
See application file for complete search history.

(56) References Cited

U.S. PATENT DOCUMENTS

2015/0036073 A1 2/2015 Im et al.
2015/0268515 A1* 9/2015 Seo et al. .............. G02F 1/1337

FOREIGN PATENT DOCUMENTS

JP 2015-031961 A 2/2015

* cited by examiner

*Primary Examiner* — Charles S Chang
(74) *Attorney, Agent, or Firm* — ScienBiziP, P.C.

(57) ABSTRACT

A liquid crystal panel includes a first substrate including multiple pixel electrodes; a liquid crystal layer; and a second substrate including a common electrode. In at least 30 pixels consecutive in a row direction, arrays of the domains are identical, the domains in the display unit region located in an nth row are arranged in an order of a first domain, a second domain, a third domain, and a fourth domain, and each of the pixel electrodes includes a first pixel electrode having a configuration in which fine slits parallel to an alignment vector of the corresponding domain are provided in at least one of a region superimposed on the first domain, a region superimposed on the second domain, a region superimposed on the third domain, or a region superimposed on the fourth domain while the fine slits are not provided in the remaining regions.

18 Claims, 38 Drawing Sheets

TFT substrate

CF substrate

TFT/CF superposed

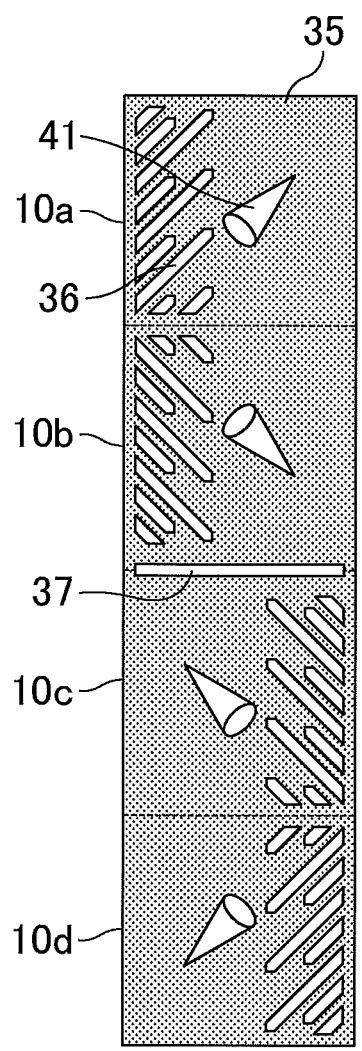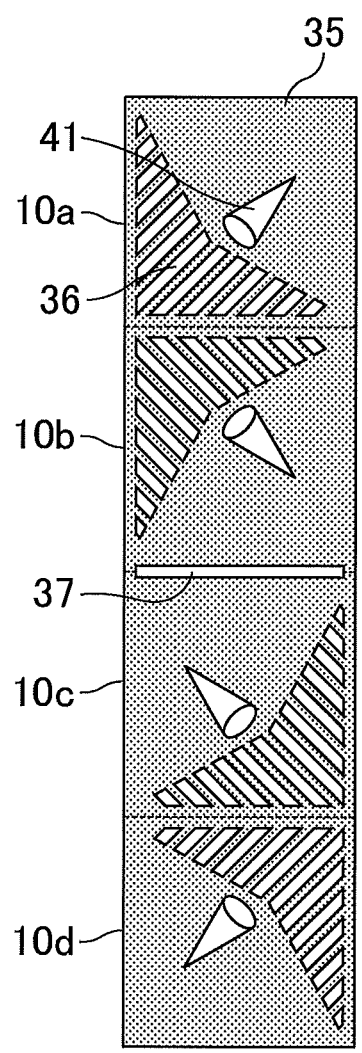

Liquid crystal panel is not bent

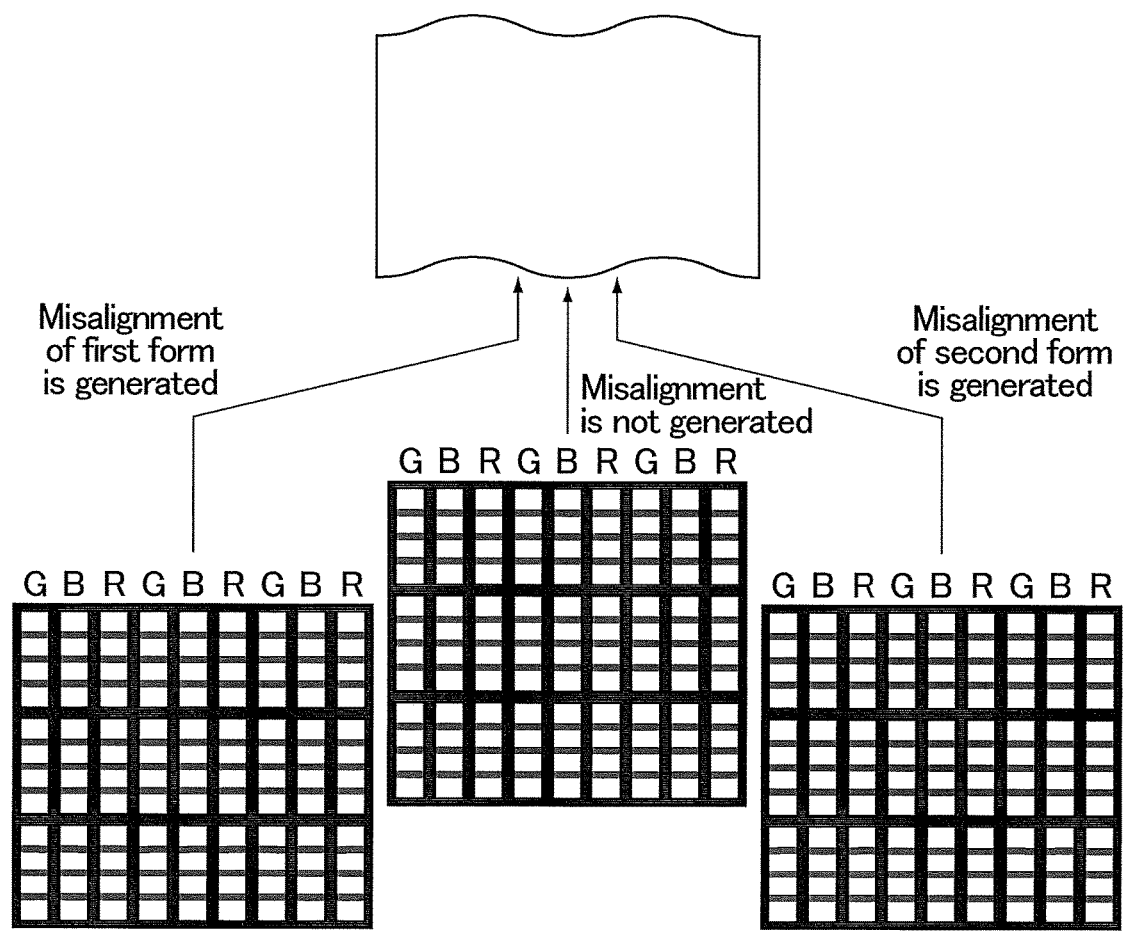

Dark line of type A

Alignment controlling region of domain IV on CF substrate side

Black matrix (light shielding body)

CF substrate

Liquid crystal layer

TFT substrate

Alignment controlling region of domain IV on TFT substrate side

Liquid crystal panel is not bent

Liquid crystal panel is not bent

Dark line of type A

Alignment controlling region of domain IV on CF substrate side

Black matrix (light shielding body)

CF substrate

Liquid crystal layer

TFT substrate

Alignment controlling region of domain IV on TFT substrate side

Dark line of type A

Liquid crystal panel is not bent

LIQUID CRYSTAL PANEL AND METHOD OF MANUFACTURING THEREOF

CROSS-REFERENCE TO RELATED APPLICATIONS

The present application claims priority under 35 U.S.C. § 119 to Japanese Patent Application No. 2018-062301 filed on Mar. 28, 2018, the contents of which are incorporated herein by reference in their entirety.

BACKGROUND OF THE INVENTION

Field of the Invention

The present invention relates to a liquid crystal panel and a method of manufacturing thereof. More particularly, the present invention relates to a liquid crystal panel having a configuration in which one pixel is divided into multiple alignment regions (domains) and a method suitable for manufacturing of the liquid crystal panel.

Description of Related Art

A liquid crystal display device is a display device in which a liquid crystal composition is used to perform display. In a typical display system for the liquid crystal display device, the liquid crystal composition enclosed between a pair of substrates is irradiated with, light from a backlight, and voltage is applied to the liquid crystal composition to change alignment of liquid crystal molecules, thereby controlling an amount of light transmitted through the liquid crystal panel. Because the liquid crystal display device has the features such as a low profile, light weight, and low power consumption, the liquid crystal display device is used in electronic products such as a smartphone, a tablet PC, and an automotive navigation system.

Conventionally, an alignment division technique have been studied. In the alignment division technique, one pixel is divided into multiple alignment regions (domains), and the liquid crystal molecules are aligned at different azimuths in different alignment regions, thereby improving a viewing angle characteristic. JP 2015-31961 A can be cited as an example of a citation list disclosing the alignment division technique.

A liquid crystal display device disclosed in JP 2015-31961 A includes: a display substrate that includes multiple pixel regions and has a curved shape bent according to a first direction; a counter substrate that is opposed and coupled to the display substrate and has a curved shape together with the display substrate; and a liquid crystal layer disposed between the display substrate and the counter substrate. In the liquid crystal display device, multiple domains are defined in each of the pixel regions, at least two of the domains are different from each other in a direction in which liquid crystal molecules of the liquid crystal layer are aligned, and the domains are arrayed in a second direction crossing the first direction.

BRIEF SUMMARY OF THE INVENTION

In the liquid crystal panel in which the alignment division technique is used, a fine slit is occasionally formed in a pixel electrode. However, a line width of the fine slit with high accuracy is hardly controlled, and luminance unevenness (transmittance unevenness) is occasionally generated due to a variation in line width.

The present invention has been made in view of such a current state of the art and aims to provide a liquid crystal panel in which the luminance unevenness due to the variation in line width of the fine slit is suppressed and a method suitable for manufacturing of the liquid crystal panel.

The inventors have found that luminance unevenness is generated due to the variation in line width of the fine slit formed in the pixel electrode. Coexistence of a region where the fine slit is provided in the pixel electrode and a region where the fine slit is not provided in the pixel electrode reduces the luminance unevenness. Thereby, the inventors have arrived at the solution to the above problem, completing the present invention.

That is, according to one aspect of the present invention, there is provided a liquid crystal panel including, in the following order: a first substrate including multiple pixel electrodes arranged into a matrix form and a first alignment film; a liquid crystal layer containing liquid crystal molecules; and a second substrate including a common electrode and a second alignment film, wherein an alignment vector is defined as being from a first substrate side long-axis end of each of the liquid crystal molecules, a start point, to a second substrate side long-axis end of the liquid crystal molecule, an end point, and the first alignment film and the second alignment film having been subjected to an alignment treatment each include a first domain in which a direction of the alignment vector is a first direction, a second domain in which a direction of the alignment vector is a second direction, a third domain in which a direction of the alignment vector is a third direction, and a fourth domain in which a direction of the alignment vector is a fourth direction, in a column direction in each display unit region superimposed on one of the pixel electrodes, in at least 30 pixels consecutive in a row direction, arrays of the domains are identical, the domains in the display unit region located in an nth row, where n is any integer of 1 or more, are arranged in an order of the first domain, the second domain, the third domain, and the fourth domain, and each of the pixel electrodes includes a first pixel electrode having a configuration in which fine slits parallel to the alignment vector of the corresponding domain is provided in at least one of a region superimposed on the first domain, a region superimposed on the second domain, a region superimposed on the third domain, or a region superimposed on the fourth domain while the fine slits are not provided in the remaining regions.

According to another aspect of the present invention, there is provided a method of manufacturing the liquid crystal panel of the above aspect, the method including forming the fine slits by photolithography, the photolithography including irradiating a photosensitive resin formed on a conductive film with light through a mask in which a pattern corresponding to the fine slits is formed and multiple lenses.

The present invention can provide the liquid crystal panel in which the luminance unevenness due to the variation in line width of the fine slit is suppressed and the method suitable for manufacturing of the liquid crystal panel.

BRIEF DESCRIPTION OF THE DRAWINGS

FIGS. 19A and 19B are schematic plan views each illustrating an example of the arrangement pattern of the fine slits;

FIGS. 20A and 20B are views each illustrating the case that the liquid crystal panel of the embodiment is bent, FIG. 20A illustrates the state in which the liquid crystal panel is not bent, and FIG. 20B illustrates the state in which the liquid crystal panel is bent;

FIG. 21A is a plan view of a pixel, and FIG. 21B is a cross-sectional view taken along line A-A';

FIG. 22A is a plan view of the pixel, and FIG. 22B is a cross-sectional view taken along line A-A';

FIG. 23A is a plan view of the pixel, and FIG. 23B is a cross-sectional view taken along line A-A';

FIG. 24A illustrates the state in which the first conventional liquid crystal panel is not bent, and FIG. 24B illustrates the state in which the first conventional liquid crystal panel is bent;

FIG. 25A is a plan view of the pixel, and FIG. 25B is a cross-sectional view taken along line A-A';

FIG. 26A is a plan view of the pixel, and FIG. 26B is a cross-sectional view taken along line A-A';

FIG. 27A is a plan view of the pixel, and FIG. 27B is a cross-sectional view taken along line A-A';

FIG. 28A illustrates the state in which the second conventional liquid crystal panel is not bent, and FIG. 28B illustrates the state in which the second conventional liquid crystal panel is bent;

FIG. 29A is a plan view of the pixel, and FIG. 29B is a cross-sectional view taken along line A-A';

FIG. 30A is a plan view of the pixel, and FIG. 30B is a cross-sectional view taken along line A-A';

FIG. 31A is a plan view of the pixel, and FIG. 31B is a cross-sectional view taken along line A-A';

FIG. 32A illustrates the state in which the third conventional liquid crystal panel is not bent, and FIG. 32B illustrates the state in which the third conventional liquid crystal panel is bent;

FIG. 33A is a plan view of the pixel, and FIG. 33B is a cross-sectional view taken along line A-A';

FIG. 34A is a plan view of the pixel, and FIG. 34B is a cross-sectional view taken along line A-A'; FIG. 35A is a plan view of the pixel, and FIG. 35B is a cross-sectional view taken along line A-A'.

DETAILED DESCRIPTION OF THE INVENTION

Hereinafter, an embodiment of the present invention will be described. However, the following embodiment is not intended to limit the scope of the present invention, and appropriate modifications can be made within the spirit of the present invention.

Embodiment

Figure 1:
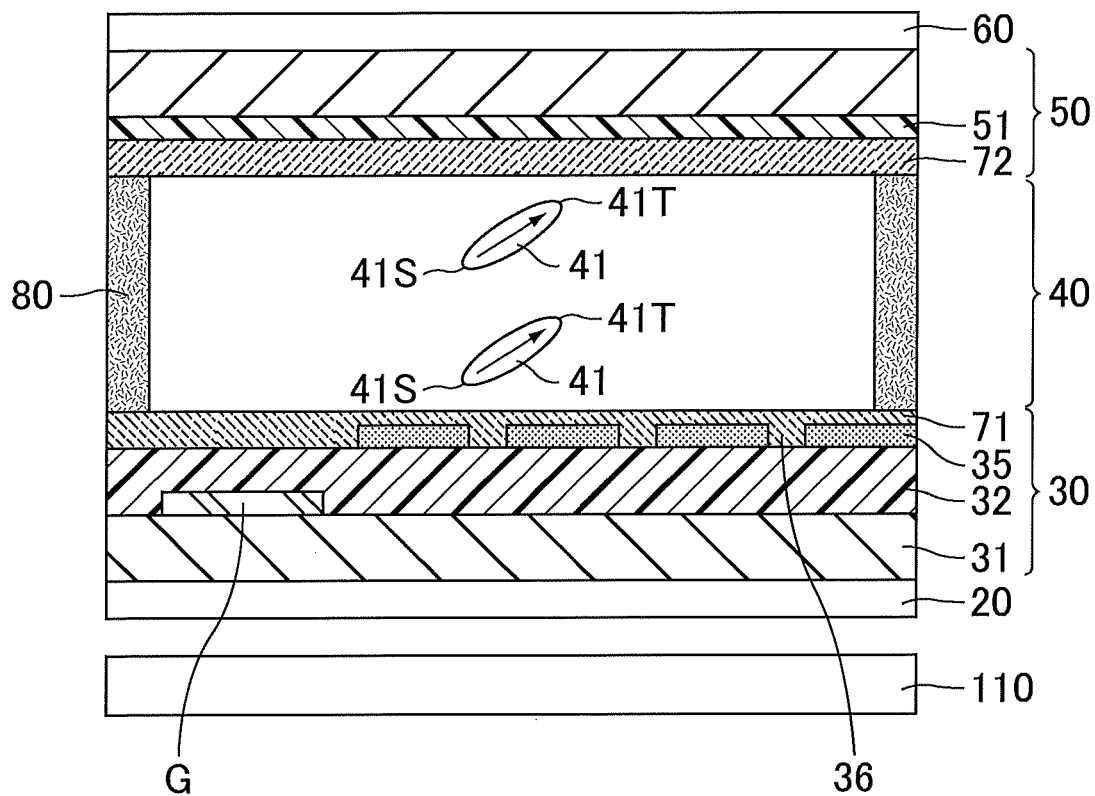
FIG. 1 is a cross-sectional view schematically illustrating an example of a liquid crystal display device of an embodiment.

FIG. 1 is a cross-sectional view schematically illustrating an example of a liquid crystal display device of an embodiment. As illustrated in FIG. 1, the liquid crystal display device of the embodiment includes a liquid crystal panel 100 and a backlight 110 disposed on a back side of the liquid crystal panel 100. The liquid crystal panel 100 includes a back-side polarizing plate 20, a first substrate 30 including multiple pixel electrodes 35 and a first alignment film 71, a liquid crystal layer 40 containing liquid crystal molecules 41, a second substrate 50 including a second alignment film 72 and a counter electrode (common electrode) 51, and a display-surface-side polarizing plate 60 in this order. The liquid crystal panel 100 includes a sealing material 80 around the liquid crystal layer 40.

A method of displaying the liquid crystal display device of the embodiment will be described. In the liquid crystal display device of the embodiment, light is incident on the liquid crystal panel 100 from the backlight 110, and an amount of light transmitted through the liquid crystal panel 100 is controlled by switching the alignment of the liquid crystal molecules 41 in the liquid crystal layer 40. The alignment of the liquid crystal molecules 41 is switched by applying voltage to the liquid crystal layer 40 using the multiple pixel electrodes 35 and the counter electrode 51. When the voltage applied to the liquid crystal layer 40 is less than a threshold (at time of applying no voltage), the initial alignment of the liquid crystal molecules 41 is controlled by the first alignment film 71 and the second alignment film 72.

At the time of applying no voltage, the liquid crystal molecules 41 are aligned substantially vertically to the first substrate 30 and the second substrate 50. As used herein, the term "substantially vertically" means that the liquid crystal molecules 41 are aligned slightly oblique to the first substrate 30 and the second substrate 50 by the alignment treatment performed on the first alignment film 71 and the second alignment film 72. A pre-tilt angle of the liquid crystal molecules 41 with respect to the first substrate 30 and the second substrate 50 at the time of applying no voltage is preferably greater than or equal to 85° and less than 90°. When the voltage is applied between the pixel electrode 35 and the counter electrode 51, a vertical electric field is generated in the liquid crystal layer 40, and the liquid crystal molecules 41 are further obliquely aligned while an oblique azimuth is maintained from the time of applying no voltage.

The oblique azimuth of the liquid crystal molecules 41 will be described as appropriate using an alignment vector in which in a plan view of the liquid crystal panel 100, a first substrate 30 side long-axis end of each liquid crystal molecule 41 is defined as a start point (hereinafter, also referred to as "a tail of a liquid crystal director") 41S while the second substrate 50 side long-axis end of the liquid crystal molecule 41 is defined as an end point (hereinafter also referred to as "a head of the liquid crystal director") 41T. The alignment vector is in the same direction as the oblique azimuth of the liquid crystal molecules 41 with respect to the first alignment film 71 on the side of the first substrate 30 and is in an opposite direction to the oblique azimuth of the liquid crystal molecules 41 with respect to the second alignment film 72 on the side of the second substrate 50. As used herein, the term "azimuth" means a direction in a view projected onto a substrate surface without consideration of an inclination angle (a polar angle, the pre-tilt angle) from a normal direction of the substrate surface. The liquid crystal molecules 41 are aligned substantially vertically (aligned slightly obliquely) at the time of applying no voltage, and are largely obliquely aligned at the time of applying the voltage while the oblique azimuth at the time of applying no voltage is maintained, so that the start point 41S and the end point 41T of the alignment vector may be checked while the voltage is applied to the liquid crystal layer 40.

Preferably the first alignment film 71 and the second alignment film 72 are each a photo alignment film in which a photo alignment film material is deposited to exert a function of aligning the liquid crystal molecules 41 in a specific direction by performing a photo alignment treatment. The photo alignment film material means a general material that generates a structural change when irradiated with light (electromagnetic wave) such as ultraviolet light and visible light, thereby exerting an ability of controlling the alignment of the nearby liquid crystal molecules 41 (alignment controlling force) or changing the alignment controlling force level and/or direction. For example, the photo alignment film material includes a photoreactive site in which a reaction such as dimerization (dimer formation), isomerization, photo Fries rearrangement, and decomposition is generated by light irradiation. Examples of the photoreactive sites (functional groups) that dimerize and isomerize by the light irradiation include cinnamate, cinnamoyl, 4-chalcone, coumarin, and stilbene. Azobenzene can be cited as an example of the photoreactive site (functional group) that isomerizes by the light irradiation. A phenol ester structure can be cited as an example of the photoreactive site that undergoes the photo Fries rearrangement by the light irradiation. Dianhydride containing a cyclobutane ring such as 1,2,3,4-cyclobutanetetracarboxylic acid-1, 2: 3, 4-dianhydride (CBDA) can be cited as an example of the photoreactive site that is decomposed by the light irradiation. Preferably the photo alignment film material exhibits vertical alignability that can be used in a vertical alignment mode. Examples of the photo alignment film materials include polyamide (polyamic acid), polyimide, polysiloxane derivative, methyl methacrylate, and polyvinyl alcohol that contain the photoreactive site.

Figure 2:
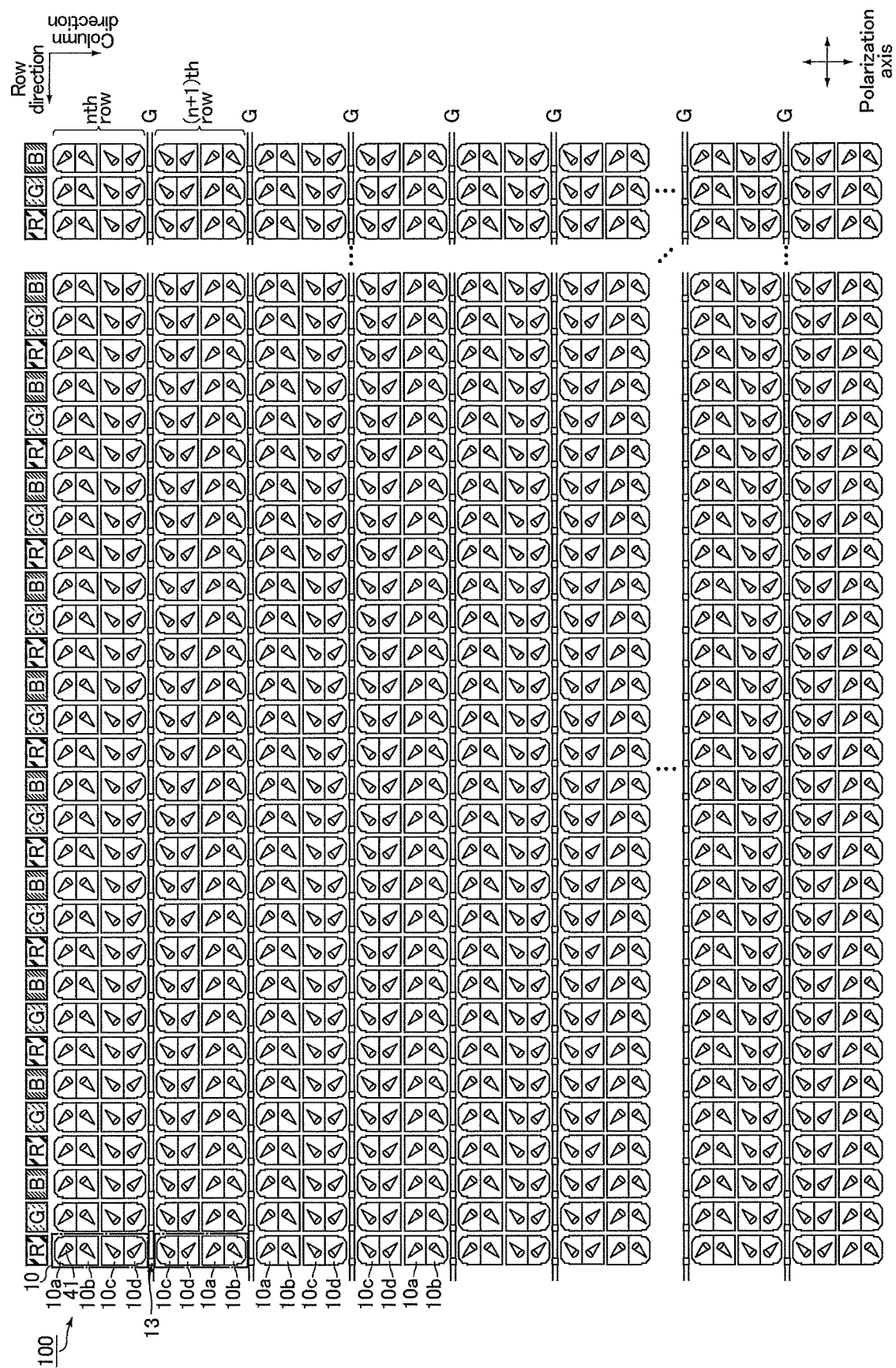
FIG. 2 is a plan view schematically illustrating an arrangement relation of an oblique azimuth of liquid crystal molecules in a liquid crystal layer of the embodiment and a color filter of a second substrate.

FIG. 2 is a schematic plan view illustrating an arrangement relation of the oblique azimuth of the liquid crystal molecules 41 in the liquid crystal layer 40 of the embodiment and a color filter of the second substrate 50. As illustrated in FIG. 2, in the liquid crystal panel 100 of the embodiment, multiple pixels 10 are arranged into a matrix form of N rows and M columns (N and M are integers of 1 or more). As used herein, the pixel 10 means a display unit region superimposed on a single pixel electrode 35, and a pixel superimposed on a color filter of R (red), a pixel superimposed on a color filter of G (green), and a pixel superimposed on the color filter of B (blue) are provided in the pixel 10. In FIG. 2, a portion surrounded by a one dot chain line is one pixel. Stripe-shaped color filters extending in the column direction are arranged on the second substrate 50 in order of R, G, B in the row direction. That is, the arrangement order of the pixels 10 in the row direction is repetition of the R pixel, the G pixel, and the B pixel, and the pixels 10 having the identical color are consecutively arranged in the column direction.

Four domains having different alignment vectors are provided in each pixel 10. These domains can be formed by varying the alignment treatment performed on the first alignment film 71 and the second alignment film 72. When the voltage is applied to the liquid crystal layer 40, the liquid crystal molecules 41 are obliquely aligned so as to be matched with each of the alignment vectors of multiple domains.

Figure 3:
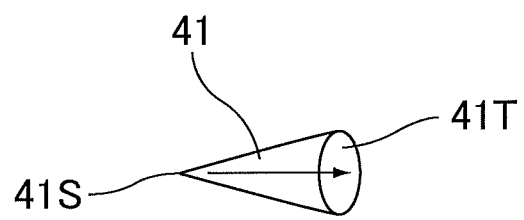
FIG. 3 is a view illustrating a relationship between the oblique azimuth of the liquid crystal molecules and an alignment vector.

In FIG. 2, in order to easily understand the oblique azimuth of the liquid crystal molecules 41, the liquid crystal molecules 41 are represented by pins (cones), the bottom surface of the cone represents the side of the second substrate 50 (observer side), and a vertex of the cone represents the side of the first substrate 30. FIG. 3 is a view illustrating a relationship between the oblique azimuth of the liquid crystal molecules and the alignment vector.

The domains in the pixel located in the nth row (n is any integer greater than or equal to 1) are arranged in the order of a first domain 10a in which the direction of the alignment vector is a first direction, a second domain 10b in which the direction of the alignment vector is a second direction, a third domain 10c in which the direction of the alignment vector is a third direction, and a fourth domain 10d in which the direction of the alignment vector is a fourth direction. The group of identical-color pixels consecutive in the column direction may include the pixels 10 in which the arrangement order of the four domains varies. Specifically, the domains in the pixel (the (n+1)th row pixel) located in the (n+1)th row adjacent to the nth row preferably satisfy the relationship in which the first domain 10a and the fourth domain 10d are located between the second domain 10b and the third domain 10c. As illustrated in FIG. 2, more preferably the domains in the (n+1)th row pixel are arranged in the order of the third domain 10c, the fourth domain 10d, the first domain 10a, and the second domain 10b. Two kinds of pixels having different arrangement order of the four domains may be alternately and repeatedly arranged in the group of identical-color pixels consecutive in the column direction. In other words, pixels having different domain arrangement order may be arranged in two row periods. In this case, as illustrated in FIG. 2, the domains in the pixel located in the (n+2)th row are arranged in the order of the first domain 10a, the second domain 10b, the third domain 10c, and the fourth domain 10d.

From the viewpoint of obtaining a good viewing angle characteristic, the alignment vectors of the first domain 10a, the second domain 10b, the third domain 10c, and the fourth domain 10d are a combination of four alignment vectors that face in directions different from one another by 90°. The alignment vector of each domain can be decided by the direction of the liquid crystal molecules 41 located in the center of the domain in a plan view and located in the center of the liquid crystal layer in a cross-sectional view.

In the domain arrangement of FIG. 2, in the nth row pixel, the first domain 10a and the fourth domain 10d are located on the end side of the pixel, and the second domain 10b and the third domain 10c are located on the center side of the pixel. In the (n+1)th row pixel, the second domain 10b and the third domain 10c are located on the end side of the pixel, and the first domain 10a and the fourth domain 10d are located on the center side of the pixel. Thus, in the domain arrangement illustrated in FIG. 2, each of the domain group located on the center side of the pixel and the domain group located on the end side of the pixel is constructed with a combination of the first domain 10a, the second domain 10b, the third domain 10c, and the fourth domain 10d that face in directions different from one another by 90°.

From the viewpoint of suppressing a dark line generated between the domains, in a plan view of the nth row pixel, the alignment vectors of the first domain 10a, the second domain 10b, the third domain 10c, and the fourth domain 10d preferably have the following relationships (1) to (3).

(1) The alignment vectors of the first domain 10a and the second domain 10b have a relationship, in which the end points are opposed to each other and the alignment vectors are orthogonal to each other (forming an angle of about 90°)(hereinafter referred to as "a domain boundary condition A").

(2) The alignment vectors of the second domain 10b and the third domain 10c have a relationship, in which the start points are opposed to each other and the alignment vectors are parallel to each other (forming an angle of about 180°) (hereinafter referred to as "a domain boundary condition B").

(3) The alignment vectors of the third domain 10c and the fourth domain 10d have the relationship (domain boundary condition A), in which the end points are opposed to each other and the alignment vectors are orthogonal to each other (forming the angle of about 90°).

As used herein, in the term "orthogonal (forming the angle of about 90°)", the alignment vectors may be substantially orthogonal to each other within a range where the effect of the present invention is obtained, specifically the term "orthogonal" means that the alignment vectors form an angle of 75° to 105°, preferably an angle of 80° to 100°, more preferably an angle of 85° to 95°. In the term "parallel (forming an angle of about 180°)", the alignment vectors may be substantially parallel to each other within the range where the effect of the present invention is obtained, specifically the term "parallel" means that the alignment vectors form an angle of −15° to +15°, preferably an angle of −10° to +10°, more preferably an angle of −5° to +5°.

The dark line is formed due to discontinuity of the alignment of the liquid crystal molecules 41 at a boundary between the domains having different alignment azimuths of the liquid crystal molecules 41. In the region where the alignment of the liquid crystal molecules 41 is discontinuous, because the liquid crystal molecules 41 cannot be aligned in an intended direction, the light can insufficiently be transmitted during display, and the region is recognized as a dark portion. The dark portion formed in a linear shape is called the dark line. When the dark line is generated, transmittance (contrast ratio) of the pixel 10 decreases, so that light use efficiency of the liquid crystal panel 100 is degraded. In recent years, high definition of the pixel 10 has advanced and an area per pixel is reduced, but an area of the dark line does not change even if the pixel 10 is reduced, so that an area ratio occupied by the dark line in the pixel 10 increases, and therefore prevention of the degradation of the light use efficiency becomes more important. When the dark line is generated at a different position in each pixel 10, uniformity of the display is also degraded. On the other hand, the inventors have studied that a generation situation of the dark line changes according to the arrangement of the domains, and have found that the arrangement of the domain boundary conditions A-B-A satisfying all of the relationships (1) to (3) effectively suppresses the dark line.

In the first domain 10a, the second domain 10b, the third domain 10c, and the fourth domain 10d, an inter-substrate twist angle of the liquid crystal molecules 41 is preferably less than or equal to 45°, more preferably about 0°. That is, in the first domain 10a, the second domain 10b, the third domain 10c, and the fourth domain 10d, an angle formed between the oblique azimuth of the liquid crystal molecules 41 with respect to the first alignment film 71 on the side of the first substrate 30 and the oblique azimuth of the liquid crystal molecules 41 with respect to the second alignment film 72 on the side of the second substrate 50 is preferably less than or equal to 45°, more preferably about 0°.

In the liquid crystal panel 100 of the embodiment, as illustrated in FIG. 2, the arrangement order (domain array) of the first domain 10a, the second domain 10b, the third domain 10c, and the fourth domain 10d is identical in at least 30 pixels consecutive in the row direction. The identical-domain-array pixels arranged consecutively in the row direction preferably have at least a ratio of one half to the total number of pixels in the row direction of the display region, more preferably at least a ratio of 90% to the total number of pixels in the row direction of the display region. Further preferably the pixels arranged in the row direction in the entire display region have the same domain array. The pixels arranged in the row direction can have the same domain array by performing the alignment treatment on the first alignment film 71 and the second alignment film 72 using scanning exposure. For example, the scanning exposure may be performed using a photo alignment treatment device in FIG. 9.

The domain arrays of pixels arranged consecutively in the row direction are made identical, which allows the suppression of the generation of defects due to misalignment in a lateral direction (row direction) of the liquid crystal panel 100. Specifically, the generation of a display defect such as display unevenness due to bending of the liquid crystal panel 100 can be suppressed, and the effect that suppresses the generation of the display defect appears notably in a higher-added-value, large-sized, and high-definition liquid crystal panel. Consequently, the liquid crystal panel 100 of the embodiment can suitably be used for a higher-added-value, large-sized, and high-definition liquid crystal display in which excellent display quality is required. The liquid crystal panel 100 of the embodiment can also be used for a high-designability, large-sized, high-definition curved (non-planar) display. A method of thickening a light shielding body is adopted as another method of improving the display unevenness, but the transmittance decreases in this method. In particular, because the high-definition liquid crystal panel has the low transmittance, the further decrease in transmittance causes a serious problem such as a loss of marketability.

The liquid crystal panel 100 tends to become larger, lighter (thinning of the glass substrate), and higher definition. The liquid crystal panel 100 that becomes larger and lighter is easily bent, and particularly easily bent in a long-side direction (row direction). When the liquid crystal panel 100 is bent, the fitting between the first substrate 30 and the second substrate 50 is partially and irregularly misaligned. For a conventional liquid crystal panel having a multi-domain structure, when the misalignment is generated, a width and a shape of the dark line at the domain boundary change, and the transmittance changes, so that the display unevenness is generated. The display unevenness is a belt-shaped unevenness extending from an upper end to a lower end of the liquid crystal panel, and is sometimes generated at an irregular position, which sometimes significantly degrades the display quality of the entire liquid crystal panel. The display unevenness tends to be easily generated in a relatively-expensive, large-sized, and high-definition liquid crystal panel. On the other hand, the liquid crystal panel 100 of the embodiment has the multi-domain structure, but does not generate the changes of the width and shape of the dark line due to the misalignment in the lateral direction (row direction). Because the liquid crystal panel 100 of the embodiment has the identical domain array in the lateral direction (row direction) so that the domain boundary and the dark line do not exist in the lateral direction, this leads to an essential measure against the display unevenness in the liquid crystal panel 100 of the embodiment.

The generation situation of the display unevenness in the case that the liquid crystal panel 100 is bent will be described with reference to the drawings.

Figure 20A:
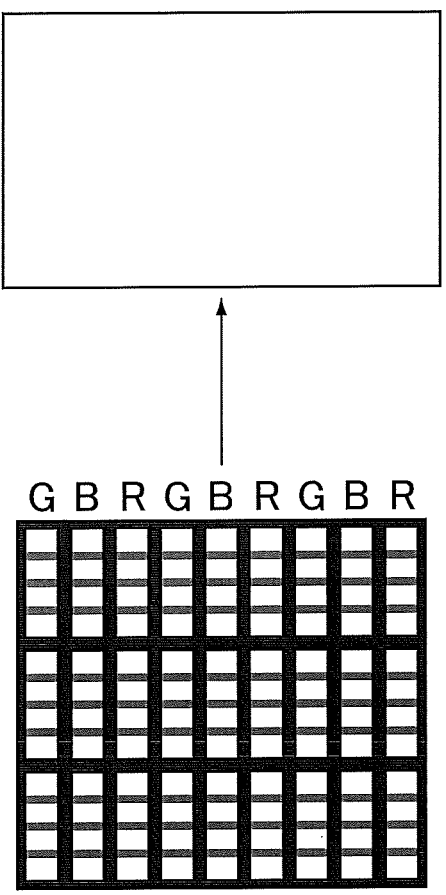
Figure 21A:
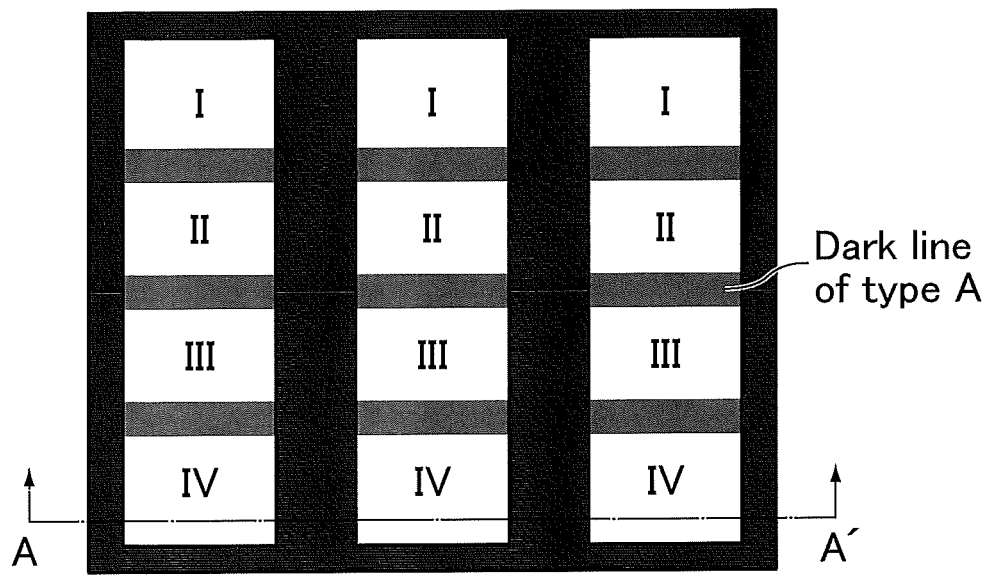
FIGS. 21A and 21B are views each illustrating a state of a dark line in a portion where misalignment is not generated in the liquid crystal panel of the embodiment.
Figure 21B:
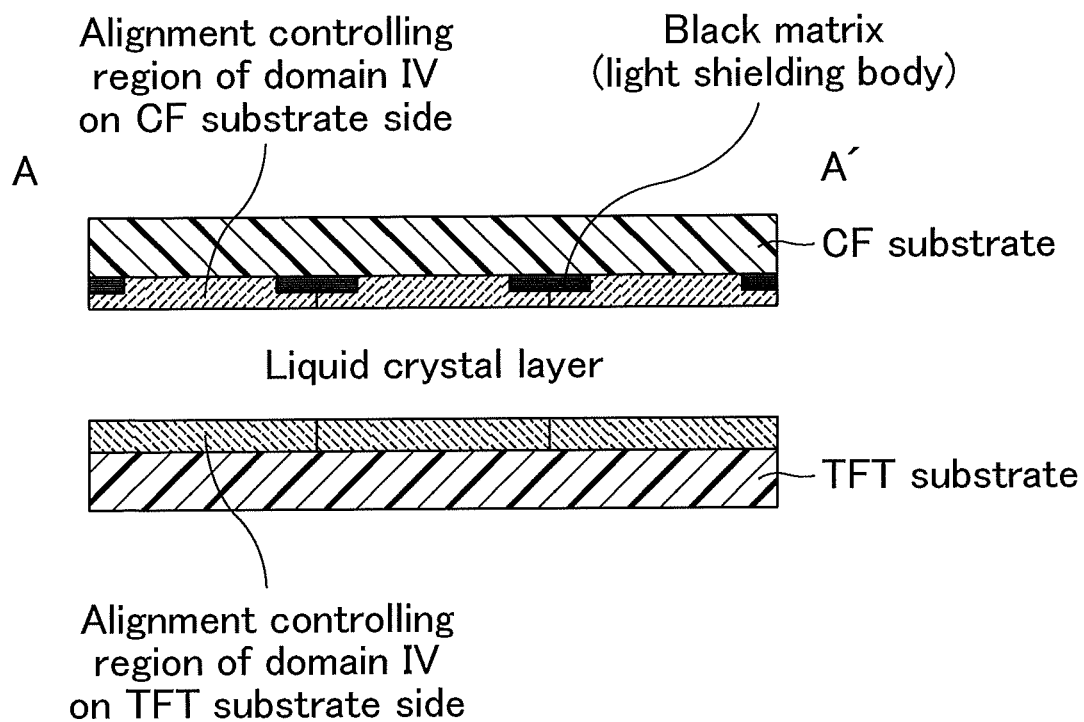
Figure 22A:
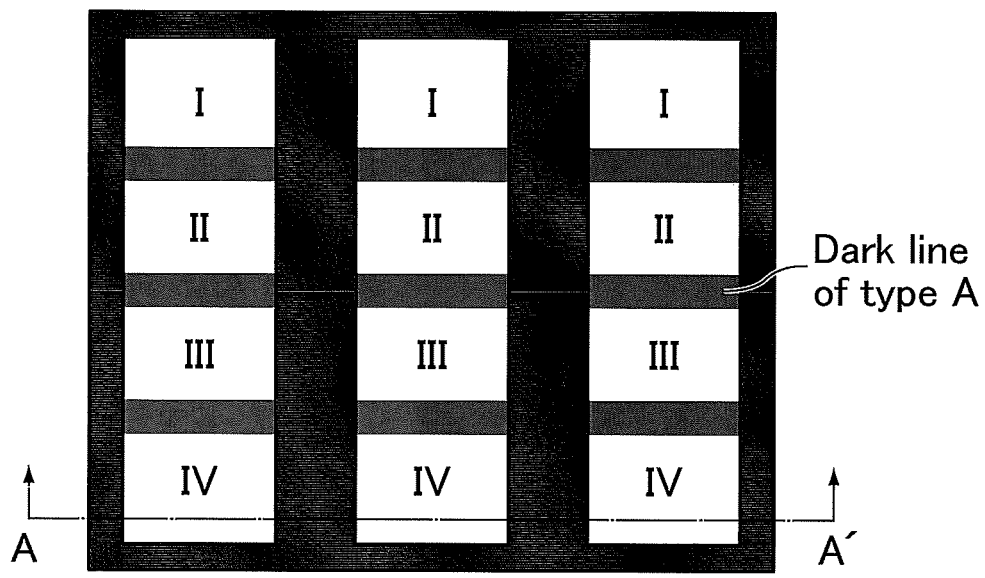
FIGS. 22A and 22B are views each illustrating the state of the dark line in a portion in which the misalignment of a first form is generated in the liquid crystal panel of the embodiment.
Figure 22B:
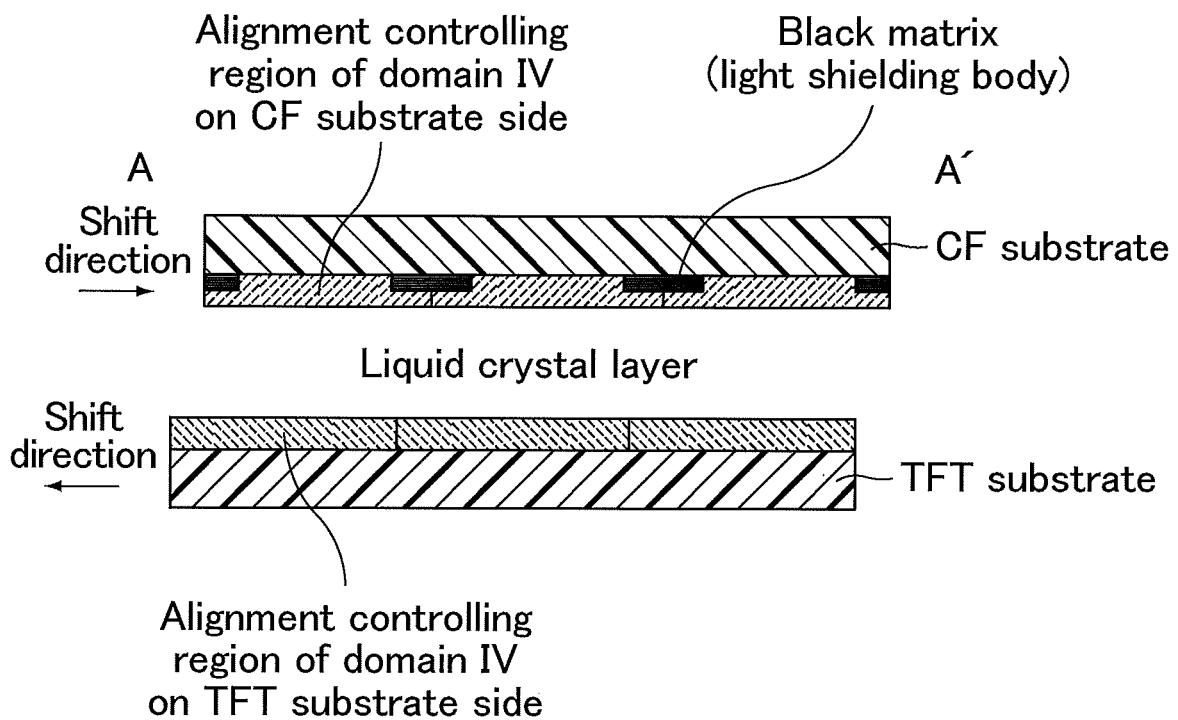
Figure 23A:
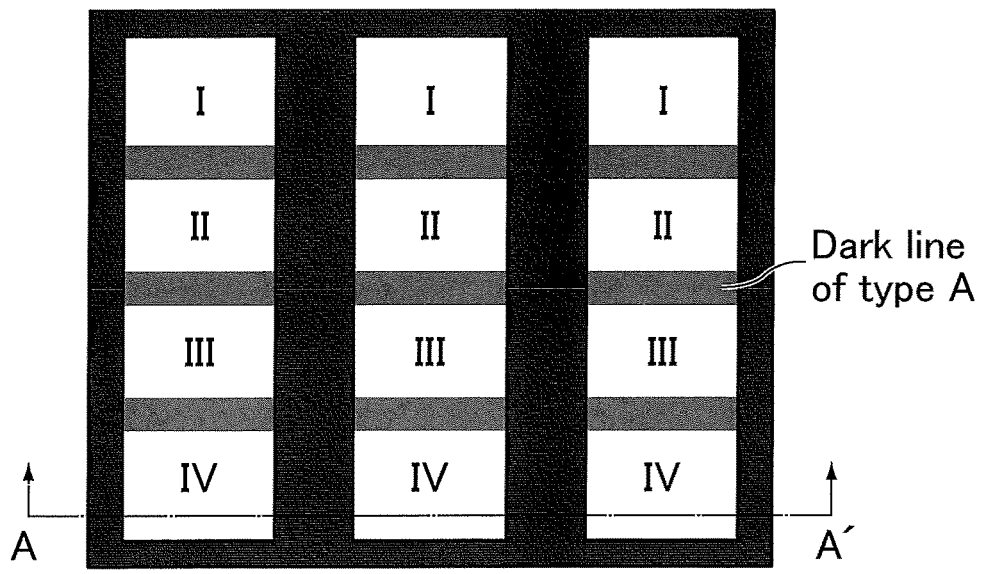
FIGS. 23A and 23B are views each illustrating the state of the dark line in a portion in which the misalignment of a second form is generated in the liquid crystal panel of the embodiment.
Figure 23B:
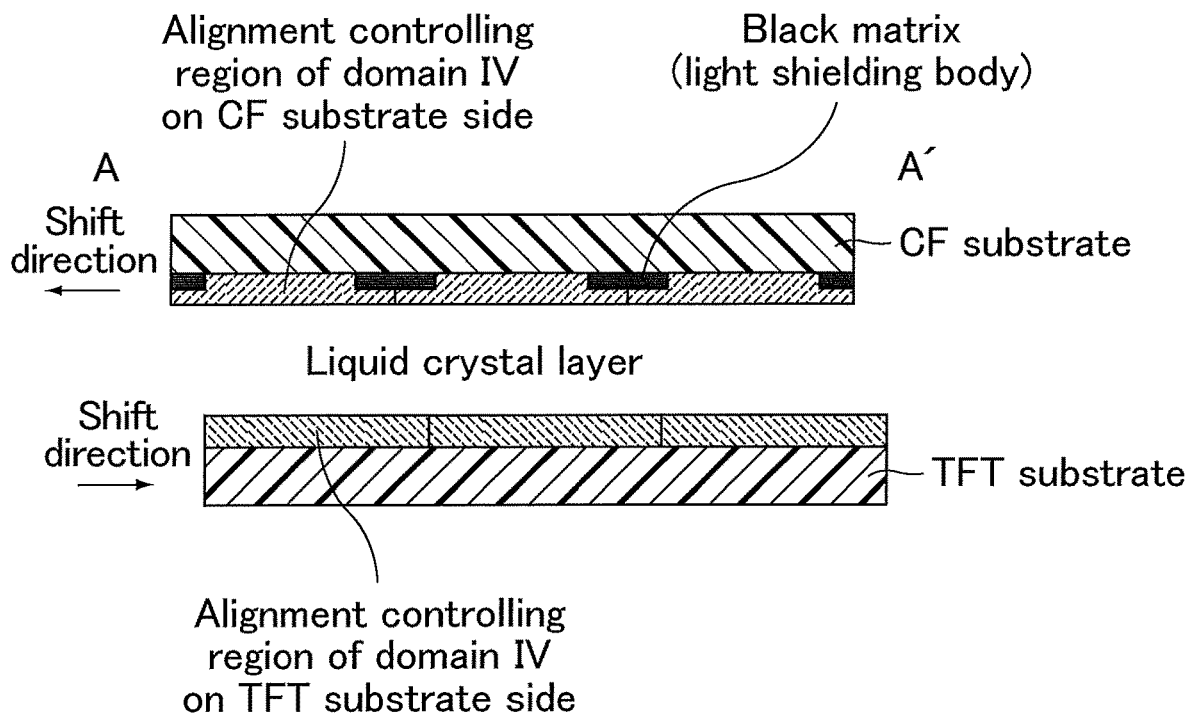

FIGS. 20A and 20B are views each illustrating the case that the liquid crystal panel 100 of the embodiment is bent, FIG. 20A illustrates the state in which the liquid crystal panel 100 is not bent, and FIG. 20B illustrates the state in which the liquid crystal panel 100 is bent. As illustrated in FIG. 20B, the display defect is not generated in any one of a portion in which the misalignment of a first form is generated, a portion in which the misalignment is not generated, and a portion in which the misalignment of a second form is generated. FIGS. 21A and 21B are views each illustrating the state of a dark line in a portion in which misalignment is not generated in the liquid crystal panel 100 of the embodiment, FIG. 21A is a plan view of the pixel, and FIG. 21B is a cross-sectional view taken along line A-A'. As illustrated in FIGS. 21A and 21B, the dark line of a type A generated in a region where the alignment changes continuously due to an influence of the adjacent domain having different alignment is generated in a domain boundary region. FIGS. 22A and 22B are views each illustrating the state of the dark line in a portion in which the misalignment of the first form is generated in the liquid crystal panel 100 of the embodiment, FIG. 22A is a plan view of the pixel, and FIG. 22B is a cross-sectional view taken along line A-A'. As illustrated in FIGS. 22A and 22B, in the state in which the liquid crystal panel 100 is bent, for example, the TFT substrate is shifted onto the left side and the CF substrate is shifted onto the right side, and the misalignment is generated. However, the misalignment in the lateral direction does not influence the liquid crystal alignment, and the dark line of the type A is generated only in the domain boundary region. FIGS. 23A and 23B are views each illustrating the state of the dark line in a portion in which the misalignment of the second form is generated in the liquid crystal panel 100 of the embodiment, FIG. 23A is a plan view of the pixel, and FIG. 23B is a cross-sectional view taken along line A-A'. As illustrated in FIGS. 23A and 23B, the misalignment in the lateral direction does not influence the liquid crystal alignment, and the dark line of the type A is generated only in the domain boundary region.

Figure 24A:
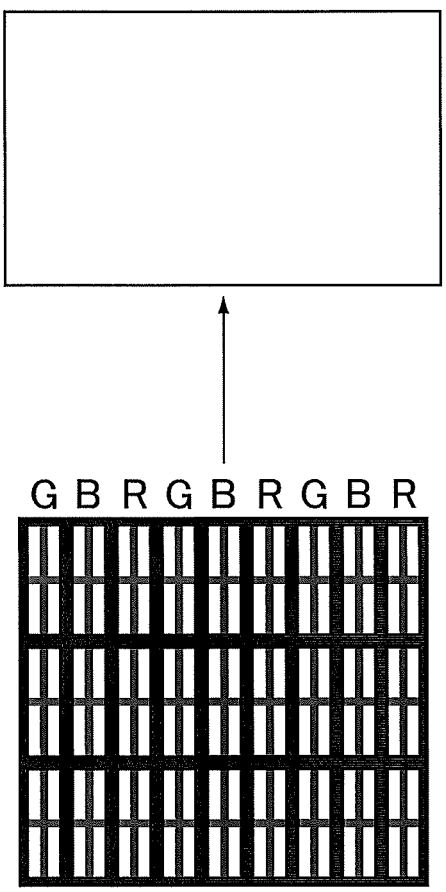
FIGS. 24A and 24B are views each illustrating the case that a first conventional liquid crystal panel is bent.
Figure 24B:
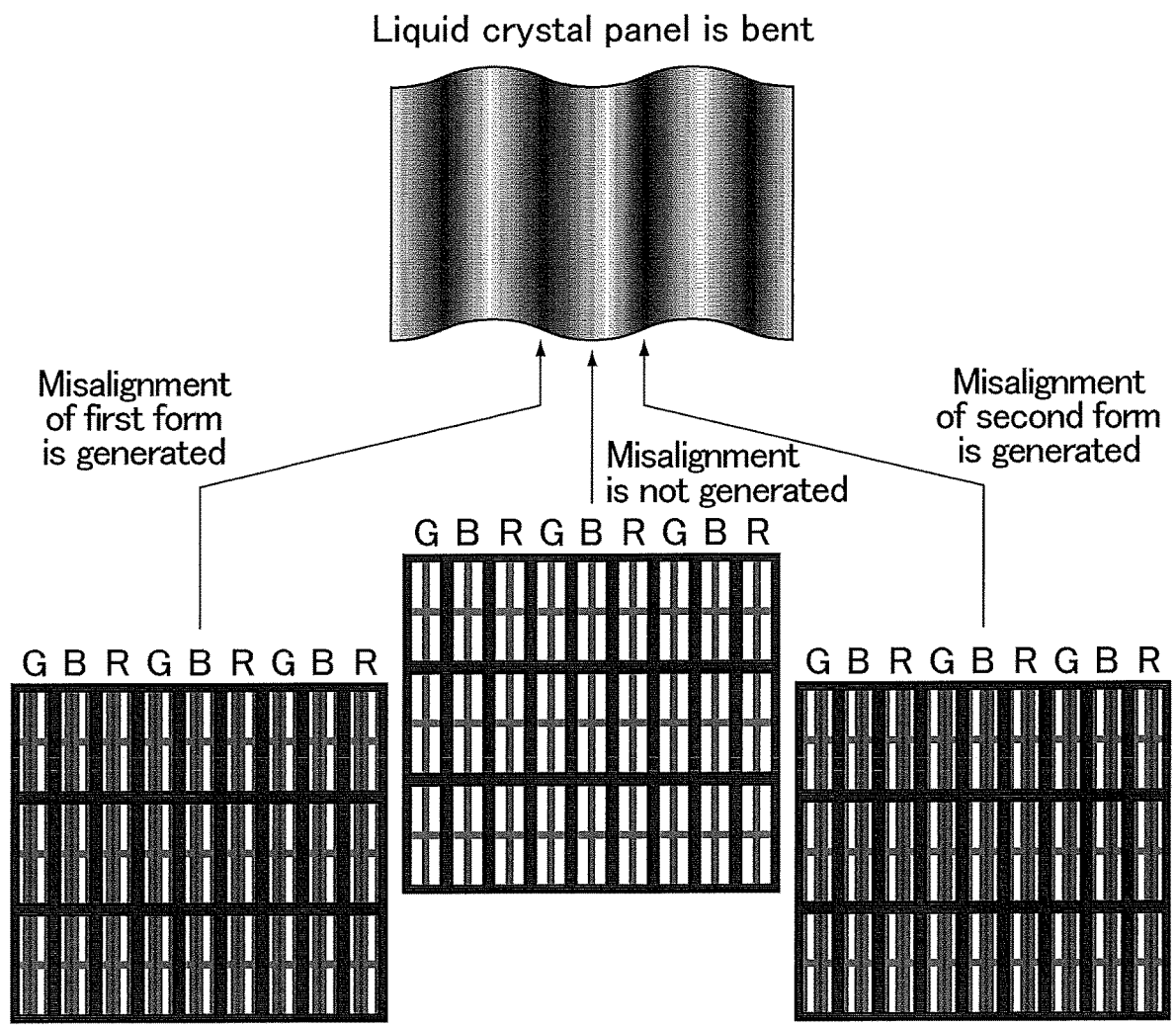
Figure 25A:
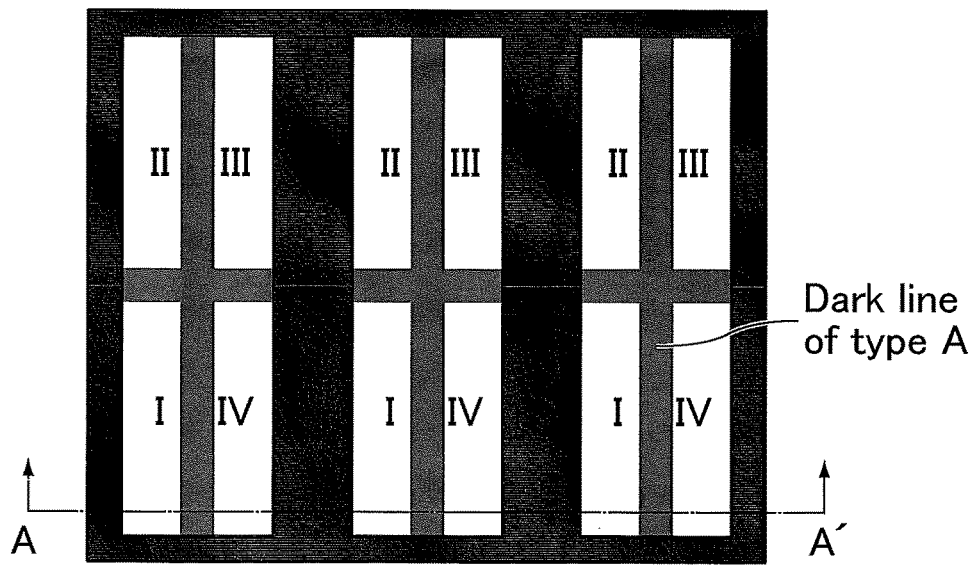
FIGS. 25A and 25B are views each illustrating the state of the dark line in a portion in which the misalignment is not generated in the first conventional liquid crystal panel.
Figure 25B:
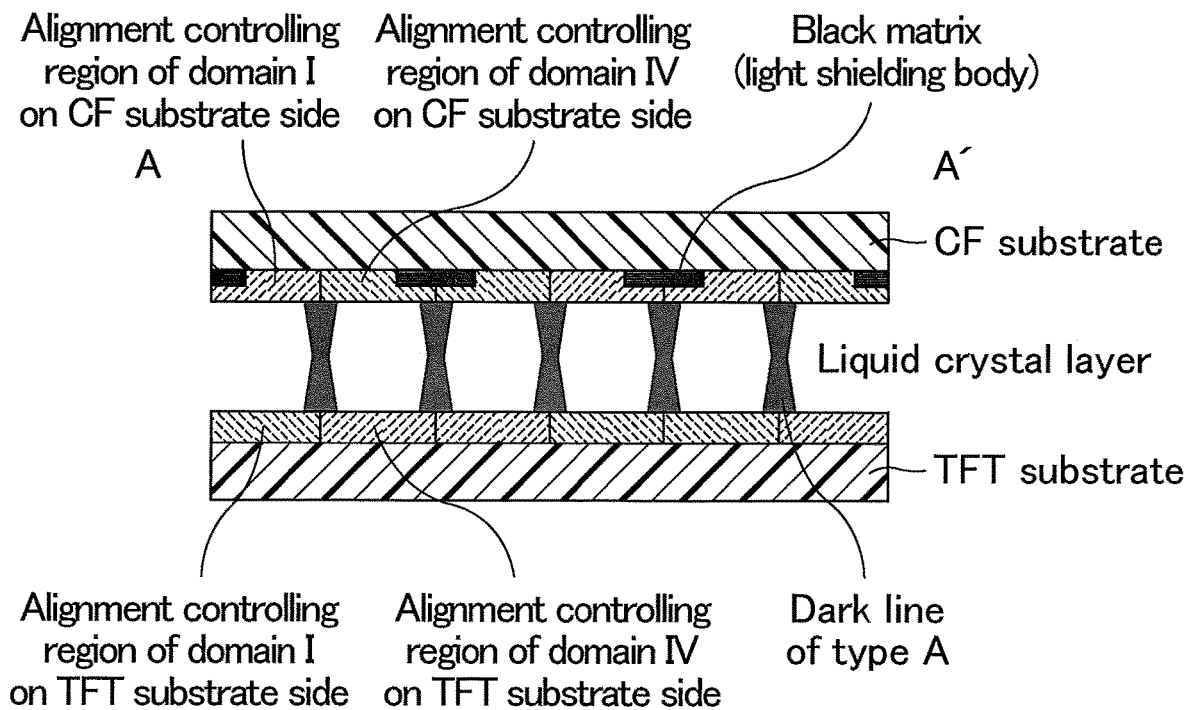
Figure 26A:
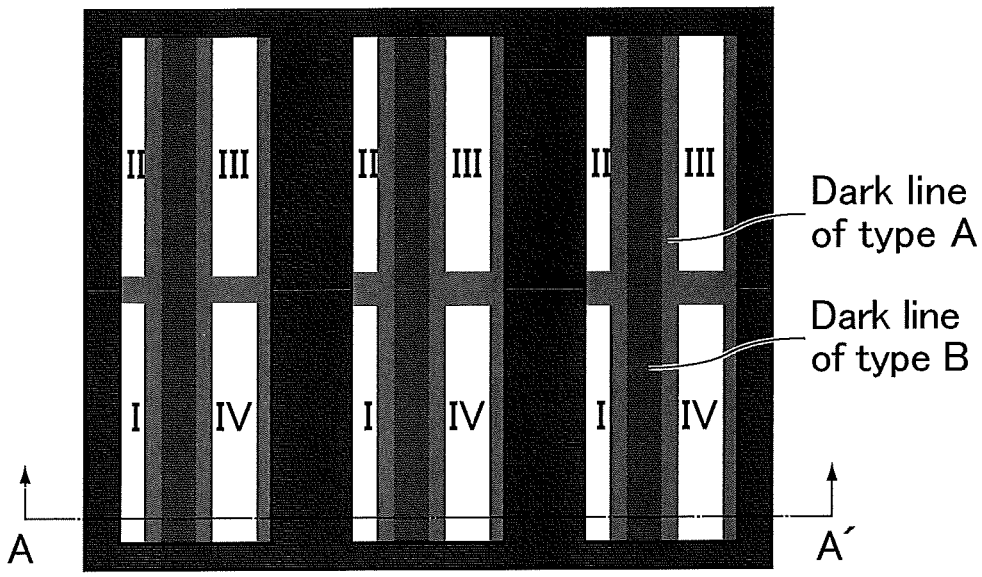
FIGS. 26A and 26B are views each illustrating the state of the dark line in a portion in which the misalignment of the first form is generated in the first conventional liquid crystal panel.
Figure 26B:
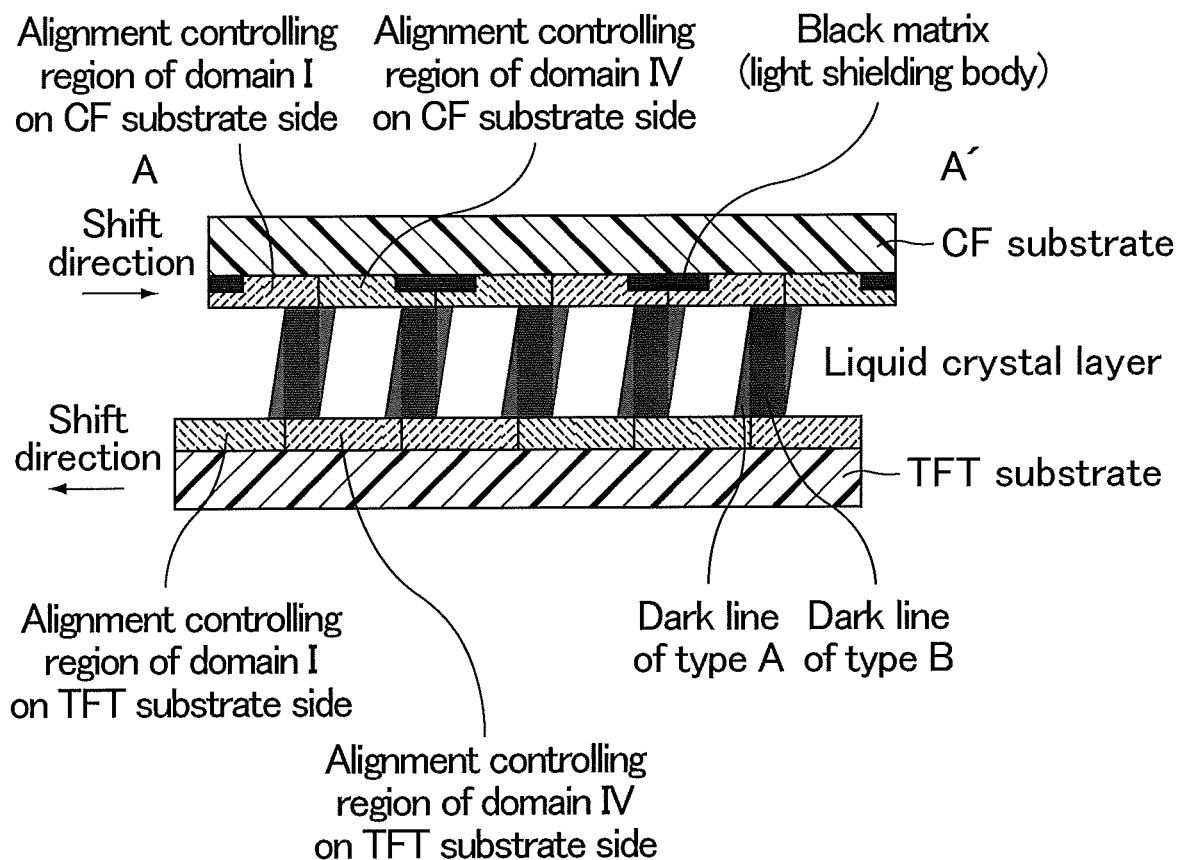
Figure 27A:
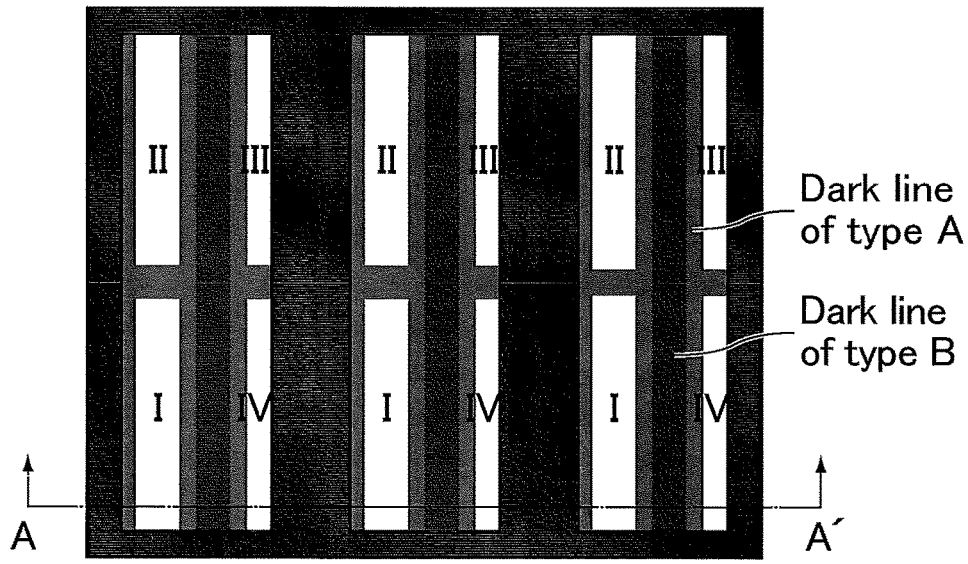
FIGS. 27A and 27B are views each illustrating the state of the dark line in a portion in which the misalignment of the second form is generated in the first conventional liquid crystal panel.
Figure 27B:
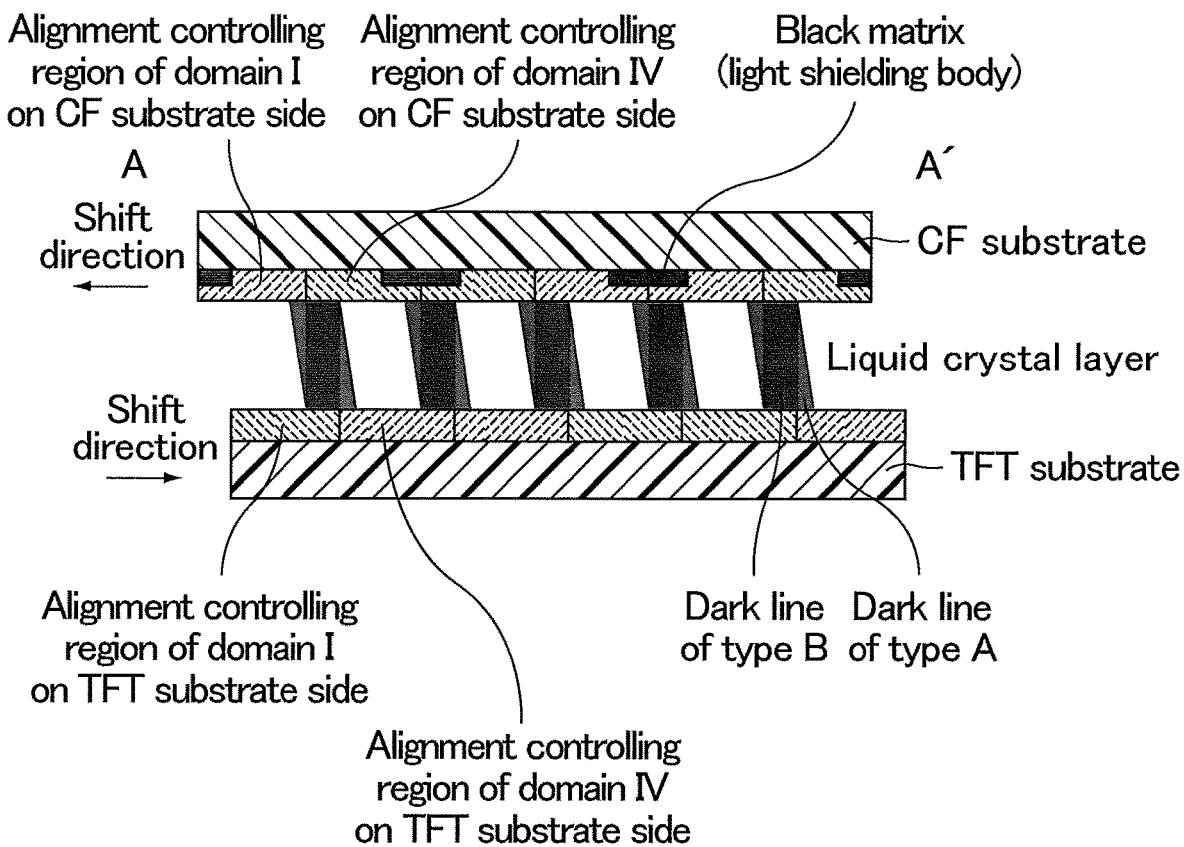

FIGS. 24A and 24B are views each illustrating the case that a first conventional liquid crystal panel is bent, FIG. 24A illustrates the state in which the first conventional liquid crystal panel is not bent, and FIG. 24B illustrates the state in which the first conventional liquid crystal panel is bent. As illustrated in FIG. 24B, the display defect is generated in the portion in which the misalignment of the first form is generated and the portion in which the misalignment of the second form is generated. FIGS. 25A and 25B are views each illustrating the state of the dark line in a portion in which the misalignment is not generated in the first conventional liquid crystal panel, FIG. 25A is a plan view of the pixel, and FIG. 25B is a cross-sectional view taken along line A-A'. As illustrated in FIGS. 25A and 25B, the dark line of the type A is generated only in the domain boundary region. FIGS. 26A and 26B are views each illustrating the state of the dark line in a portion in which the misalignment of the first form is generated in the first conventional liquid crystal panel, FIG. 26A is a plan view of the pixel, and FIG. 26B is a cross-sectional view taken along line A-A'. As illustrated in FIGS. 26A and 26B, in a portion, in which the first conventional liquid crystal panel is bent, and the TFT substrate is shifted onto the left side while the CF substrate is shifted onto the right side, thereby generating the misalignment of the first form, not only the dark line of the type A is generated in the domain boundary region, but also the dark line of a type B generated in the region where the liquid crystal alignment becomes abnormal is generated by mismatching of the alignment controlling regions on the TFT substrate side and the CF substrate side due to the misalignment of the upper and lower substrates. As a result, luminance is degraded lower than the portion in which the misalignment is not generated. FIGS. 27A and 27B are views each illustrating the state of the dark line in a portion in which the misalignment of the second form is generated in the first conventional liquid crystal panel, FIG. 27A is a plan view of the pixel, and FIG. 27B is a cross-sectional view taken along line A-A'. As illustrated in FIGS. 27A and 27B, in a portion, in which the first conventional liquid crystal panel is bent, and the TFT substrate is shifted onto the right side while the CF substrate is shifted onto the left side, thereby generating the misalignment of the second form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, luminance is degraded lower than the portion in which the misalignment is not generated.

Figure 28A:
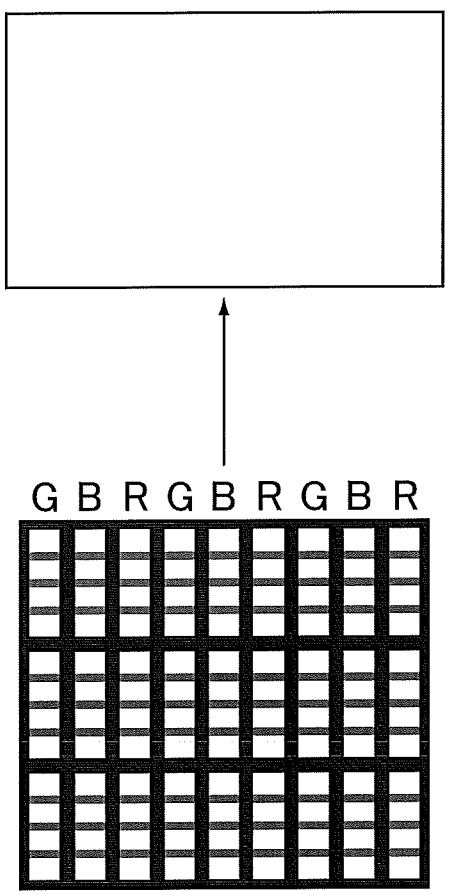
FIGS. 28A and 28B are views each illustrating the case that a second conventional liquid crystal panel is bent.
Figure 28B:
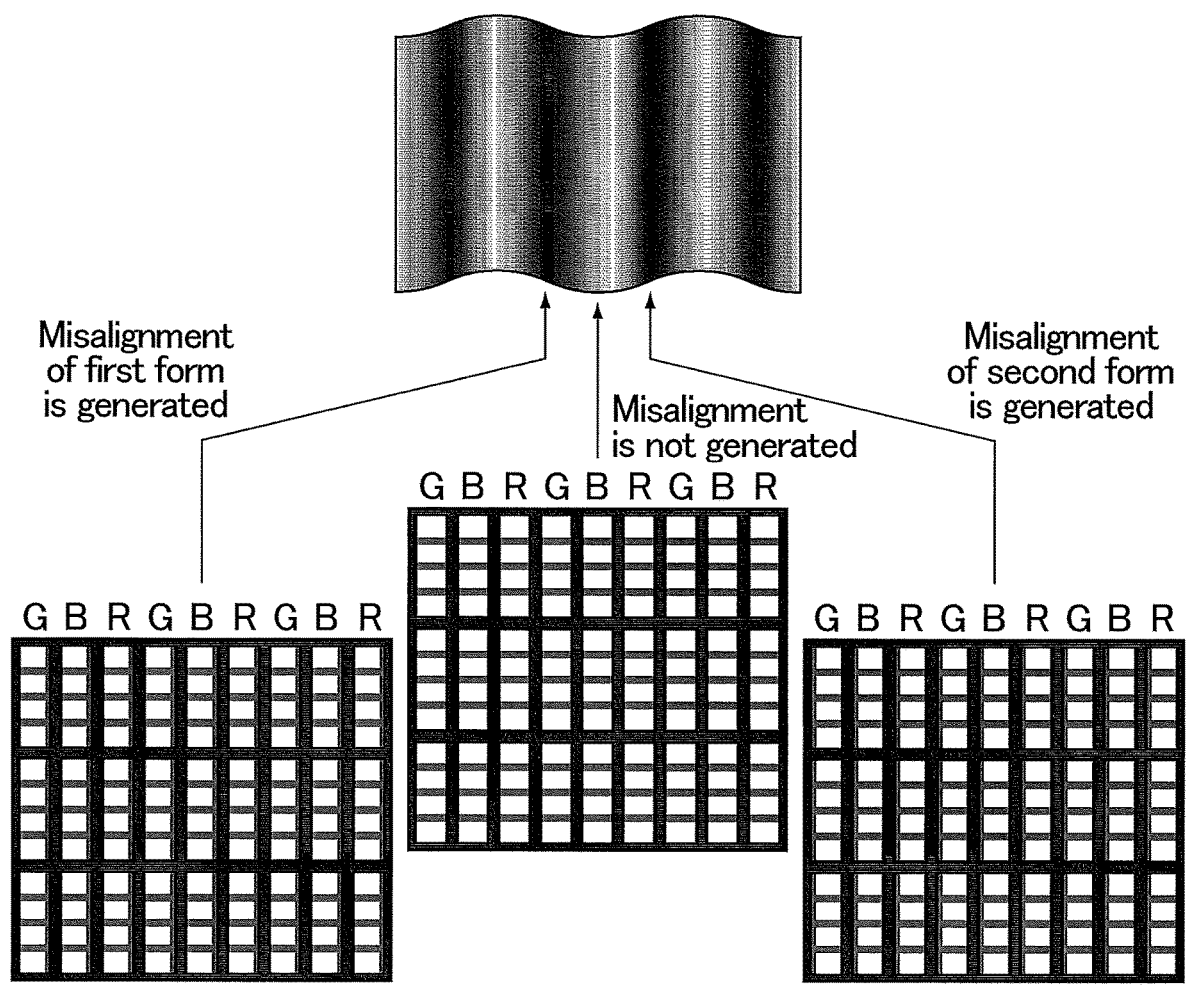
Figure 29A:
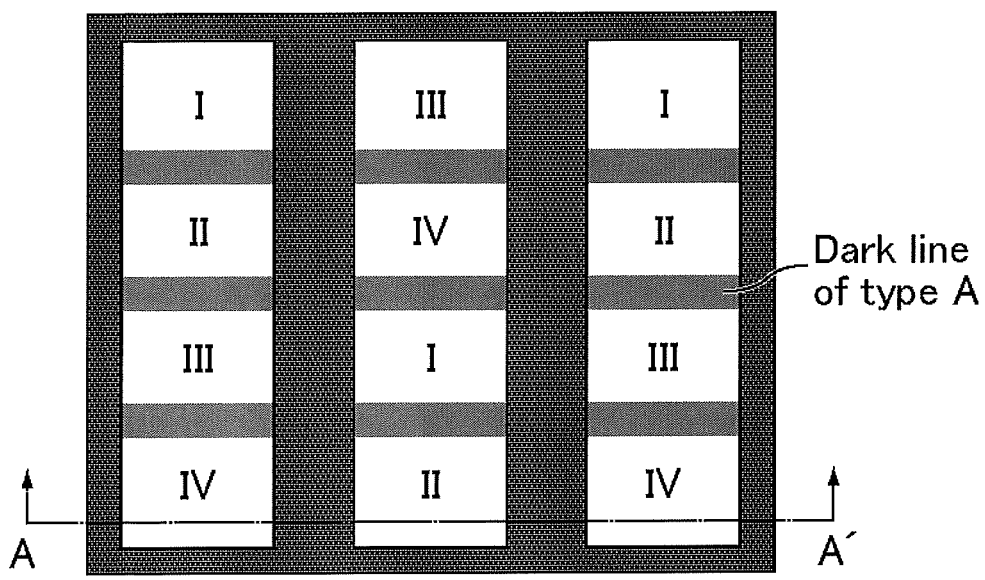
FIGS. 29A and 29B are views each illustrating the state of the dark line in a portion in which the misalignment is not generated in the second conventional liquid crystal panel.
Figure 29B:
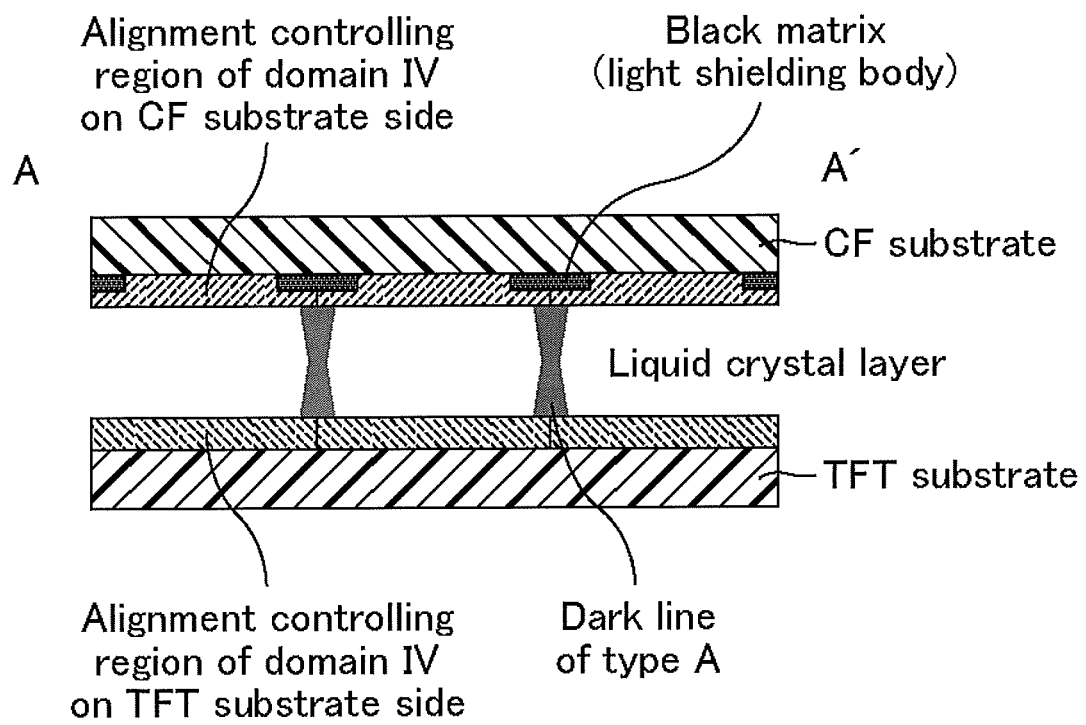
Figure 30A:
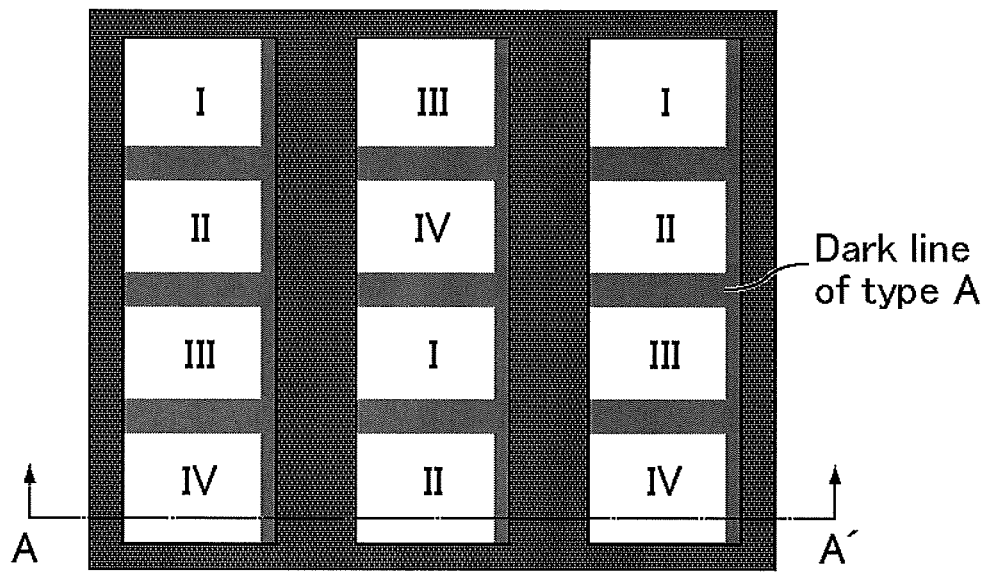
FIGS. 30A and 30B are views each illustrating the state of the dark line in a portion in which the misalignment of the first form is generated in the second conventional liquid crystal panel.
Figure 30B:
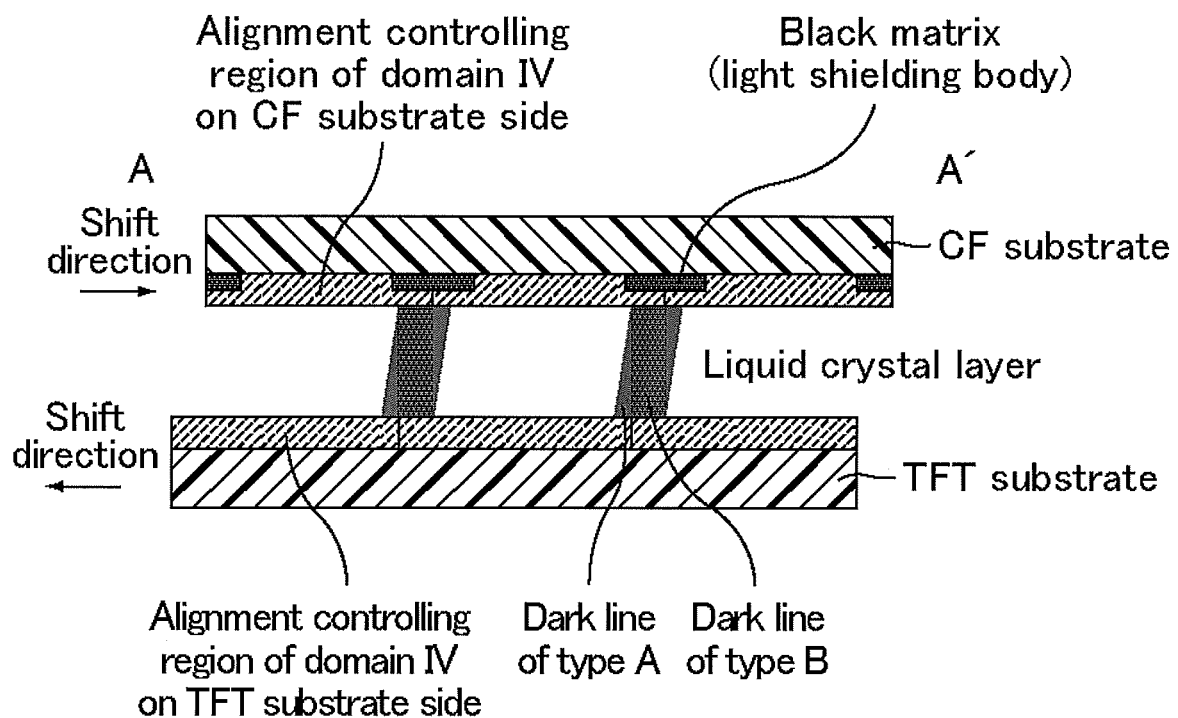
Figure 31A:
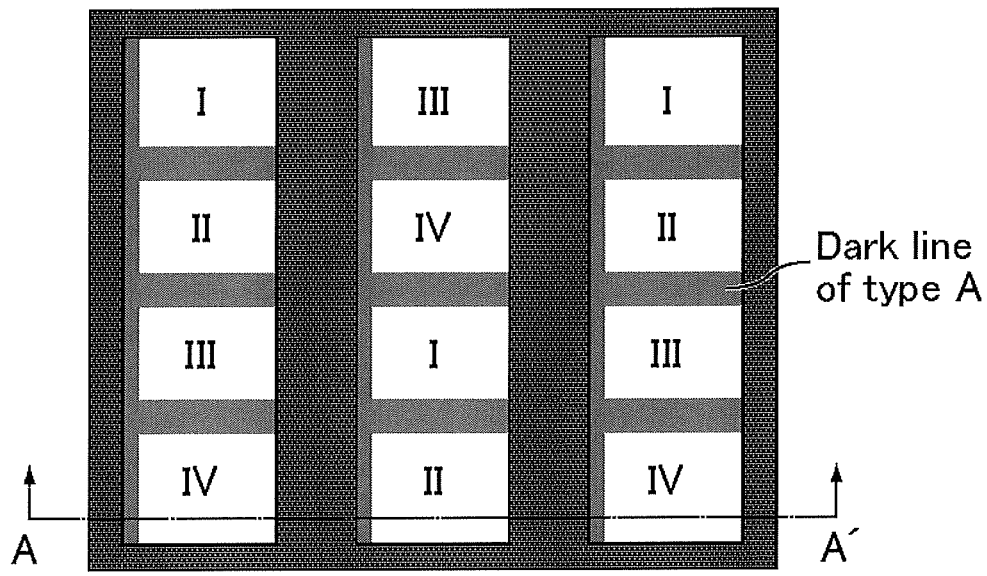
FIGS. 31A and 31B are views each illustrating the state of the dark line in a portion in which the misalignment of the second form is generated in the second conventional liquid crystal panel.
Figure 31B:
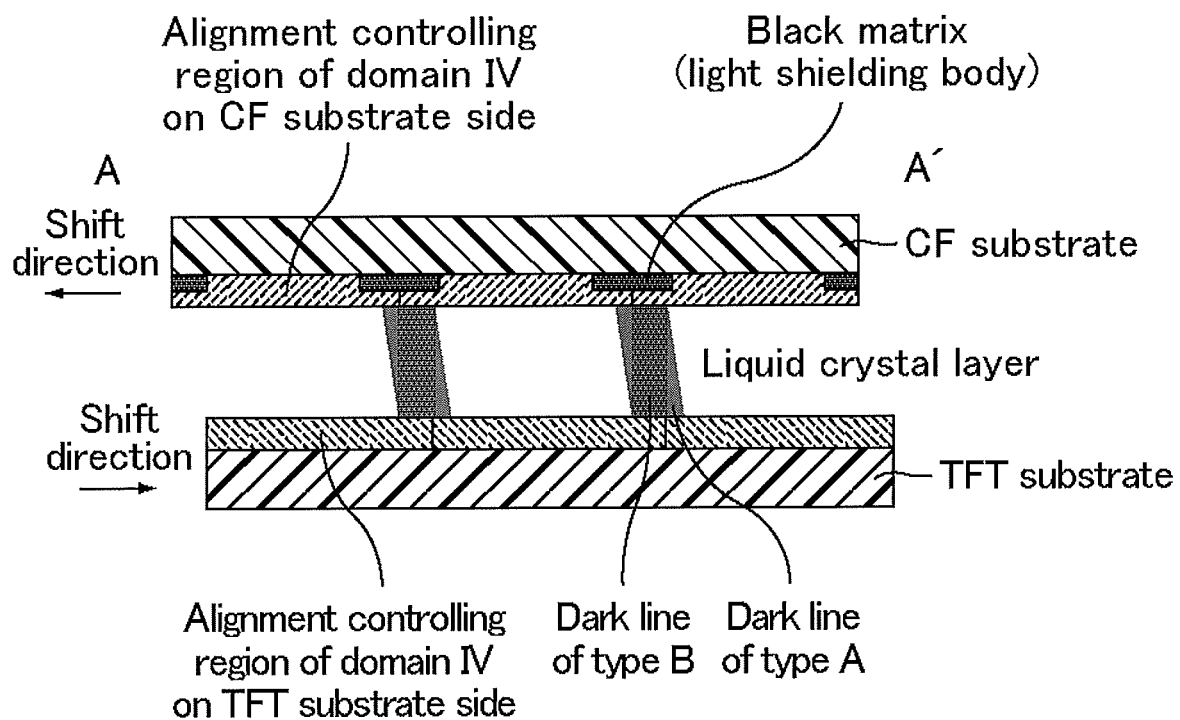

FIGS. 28A and 28B are views each illustrating the case that a second conventional liquid crystal panel is bent, FIG. 28A illustrates the state in which the second conventional liquid crystal panel is not bent, and FIG. 28B illustrates the state in which the second conventional liquid crystal panel is bent. As illustrated in FIG. 28B, the display defect is generated in the portion in which the misalignment of the first form is generated and the portion in which the misalignment of the second form is generated. FIGS. 29A and 29B are views each illustrating the state of the dark line in a portion in which the misalignment is not generated in the second conventional liquid crystal panel, FIG. 29A is a plan view of the pixel, and FIG. 29B is a cross-sectional view taken along line A-A'. As illustrated in FIGS. 29A and 29B, the dark line of the type A is generated only in the domain boundary region. FIGS. 30A and 30B are views each illustrating the state of the dark line in a portion in which the misalignment of the first form is generated in the second conventional liquid crystal panel, FIG. 30A is a plan view of the pixel, and FIG. 30B is a cross-sectional view taken along line A-A'. As illustrated in FIGS. 30A and 30B, in a portion, in which the second conventional liquid crystal panel is bent, and the TFT substrate is shifted onto the left side while the CF substrate is shifted onto the right side, thereby generating the misalignment of the first form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body, and the luminance is degraded lower than the portion in which the misalignment is not generated. FIGS. 31A and 31B are views each illustrating the state of the dark line in a portion in which the misalignment of the second form is generated in the second conventional liquid crystal panel, FIG. 31A is a plan view of the pixel, and FIG. 31B is a cross-sectional view taken along line A-A'. As illustrated in FIGS. 31A and 31B, in a portion, in which the second conventional liquid crystal panel is bent, and the TFT substrate is shifted onto the right side while the CF substrate is shifted onto the left side, thereby generating the misalignment of the second form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body, and the luminance is degraded lower than the portion in which the misalignment is not generated.

Figure 32A:
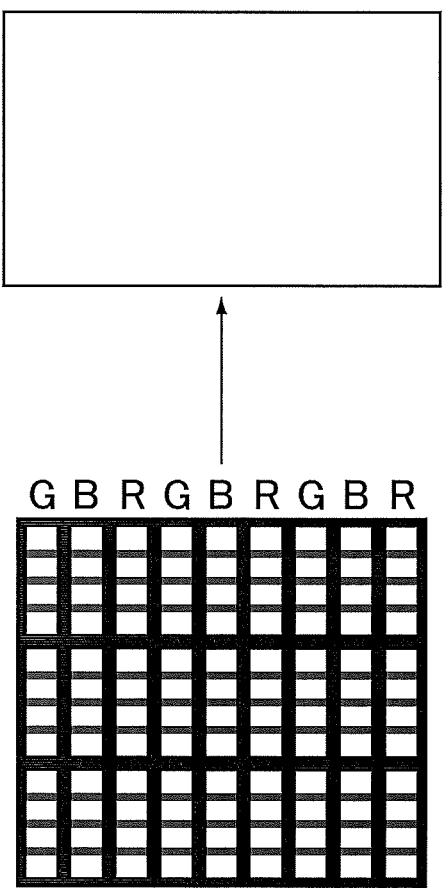
FIGS. 32A and 32B are views each illustrating the case that a third conventional liquid crystal panel is bent.
Figure 32B:
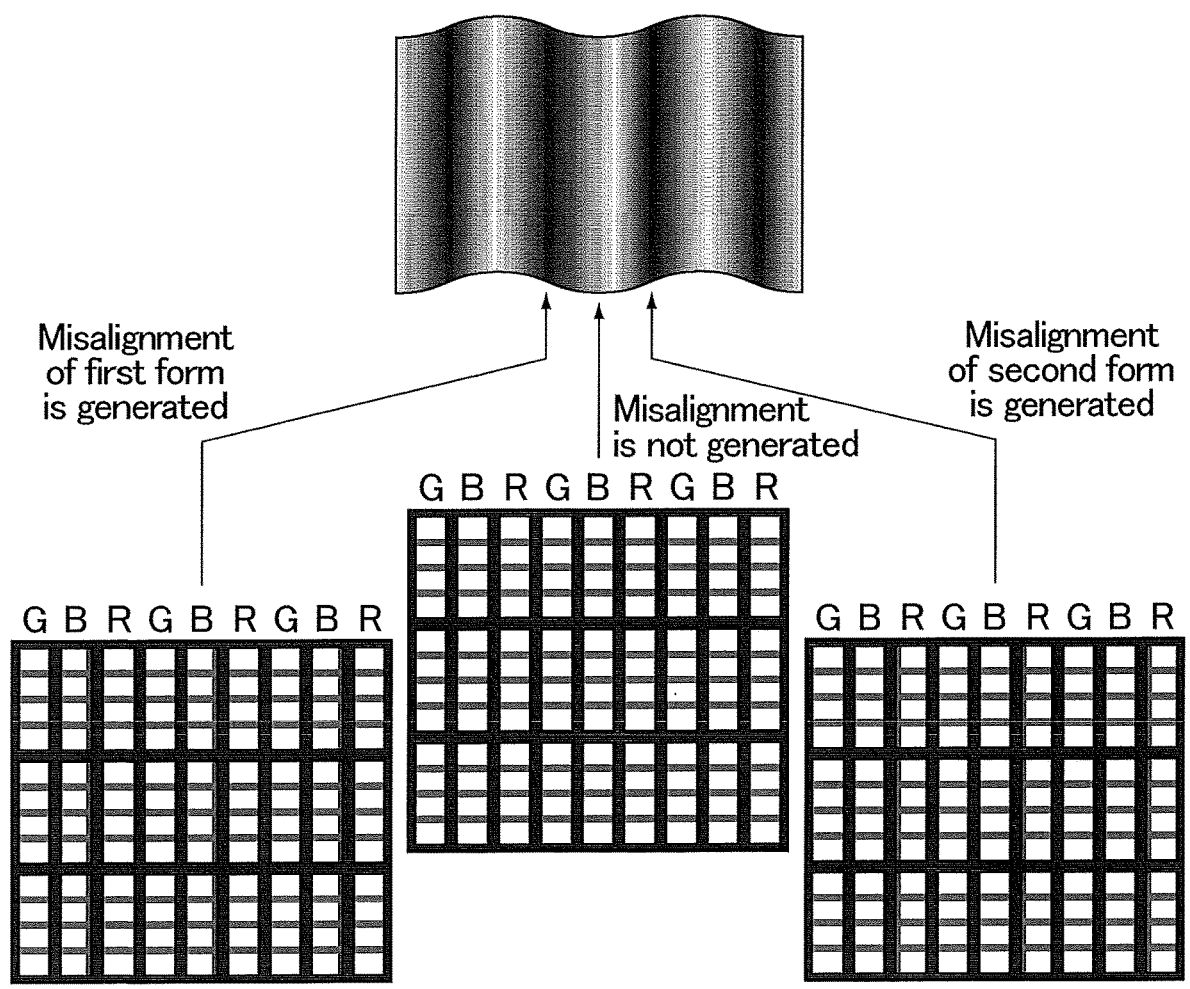
Figure 33A:
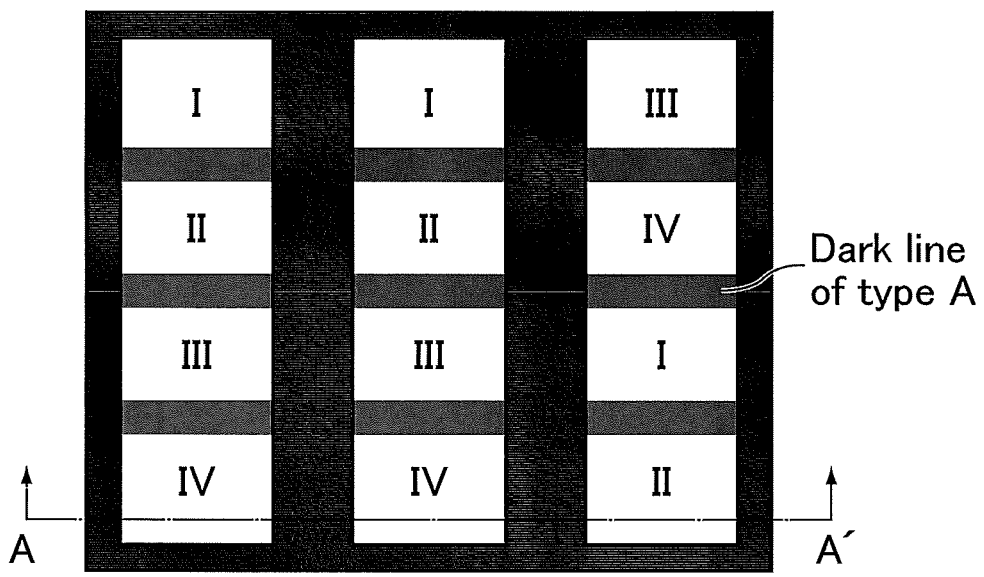
FIGS. 33A and 33B are views each illustrating the state of the dark line in a portion in which the misalignment is not generated in the third conventional liquid crystal panel.
Figure 33B:
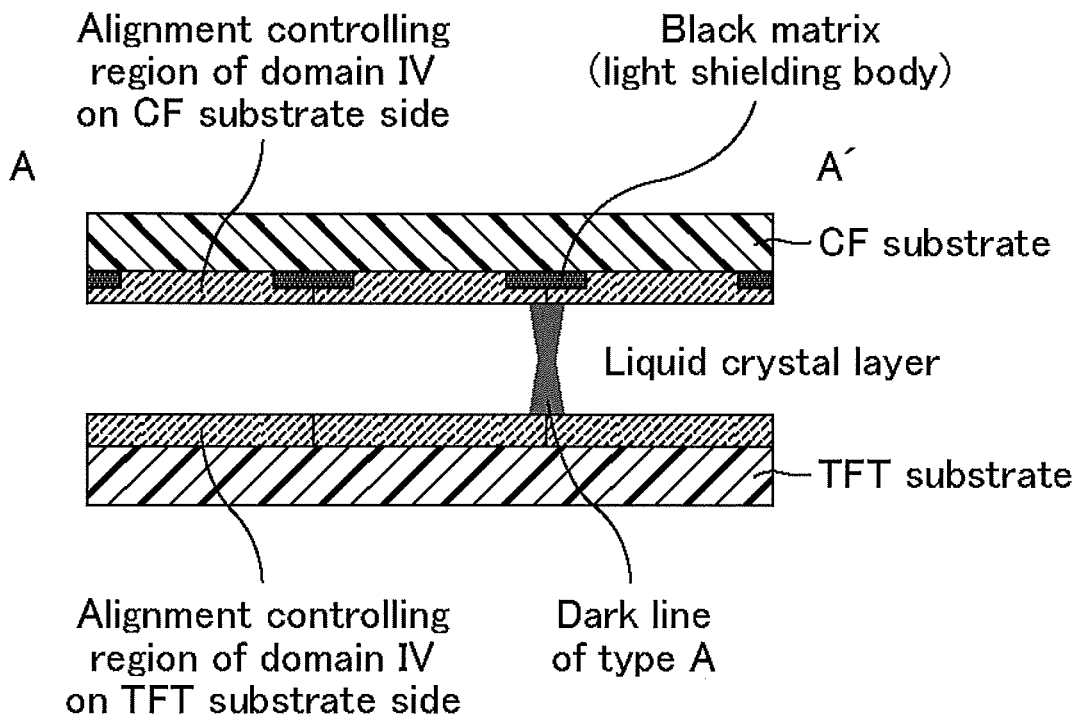
Figure 34A:
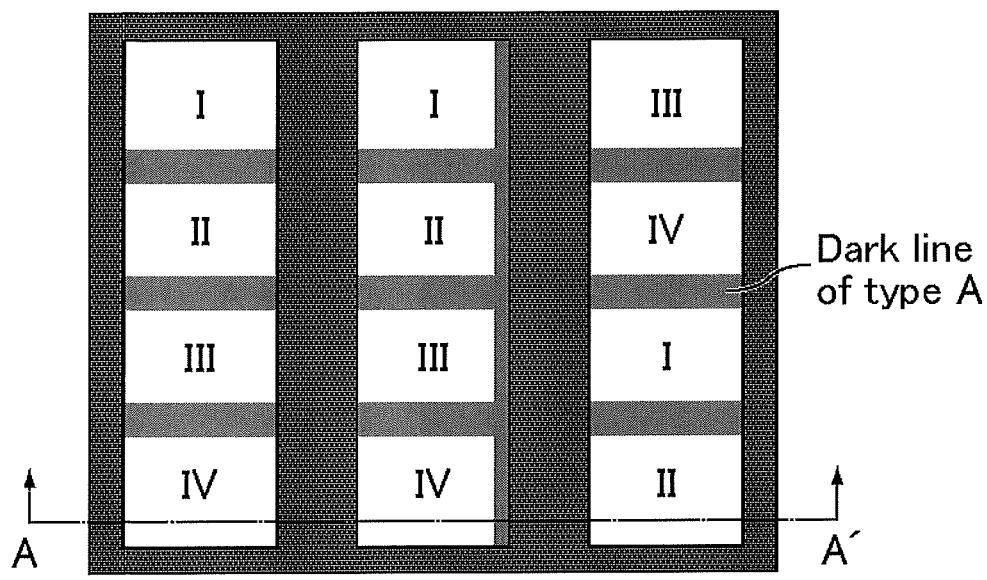
FIGS. 34A and 34B are views each illustrating the state of the dark line in a portion in which the misalignment of the first form is generated in the third conventional liquid crystal panel.
Figure 34B:
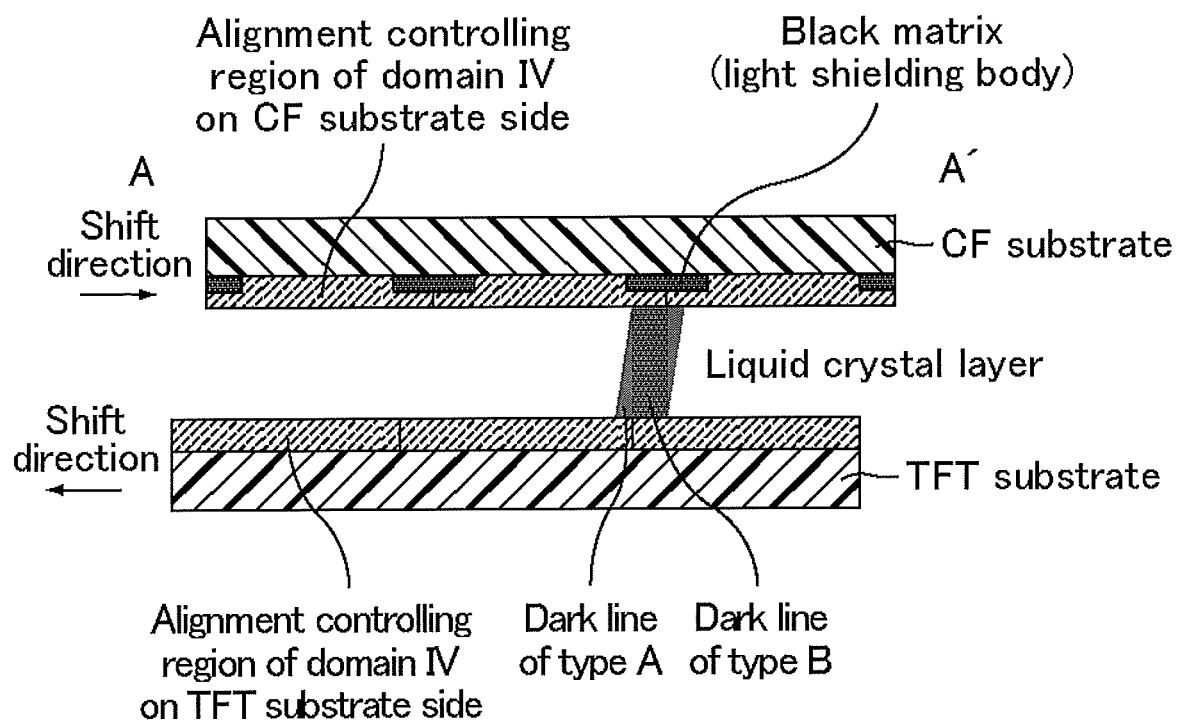
Figure 35A:
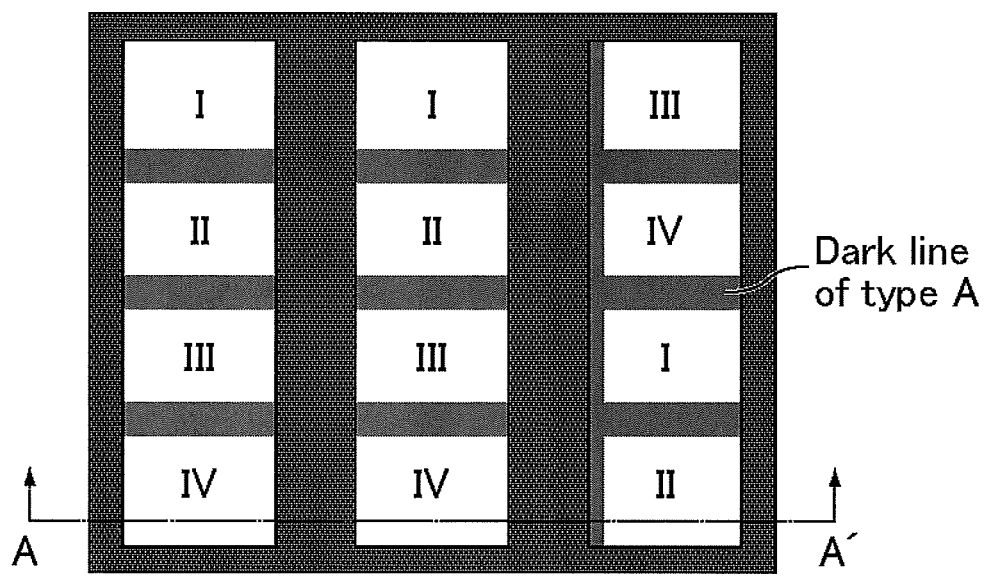
FIGS. 35A and 35B are views each illustrating the state of the dark line in a portion in which the misalignment of the second form is generated in the third conventional liquid crystal panel.
Figure 35B:
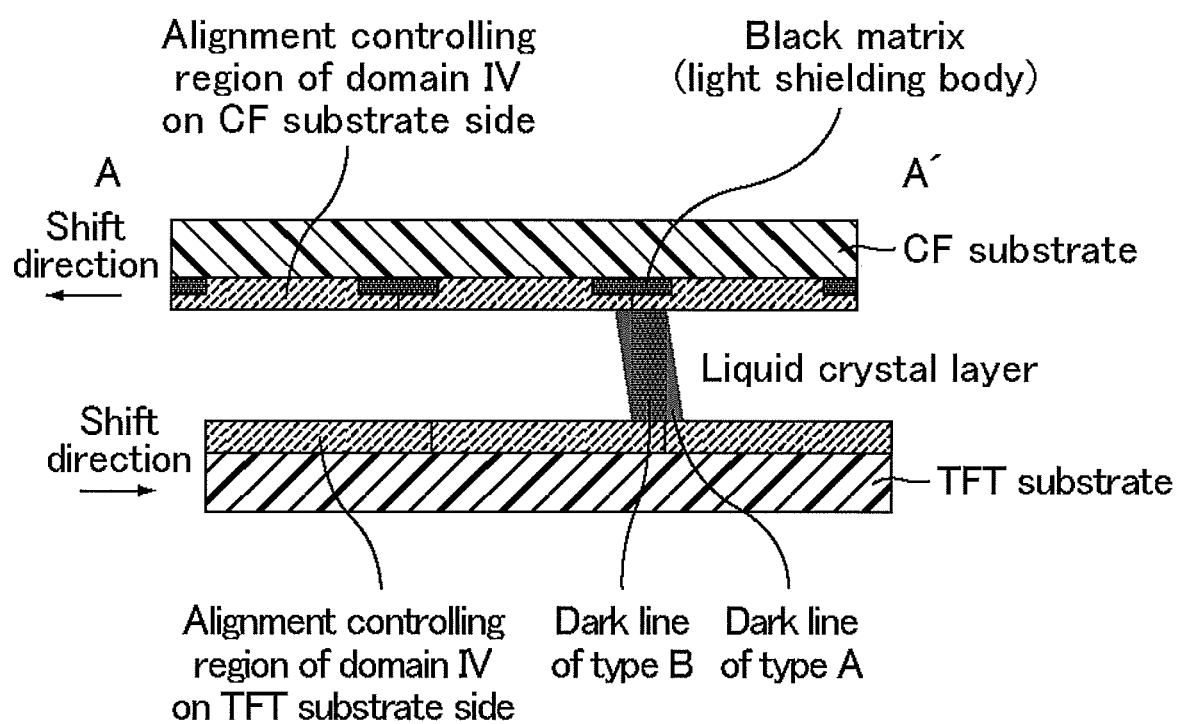

FIGS. 32A and 32B are views each illustrating the case that a third conventional liquid crystal panel is bent, FIG. 32A illustrates the state in which the third conventional liquid crystal panel is not bent, and FIG. 32B illustrates the state in which the third conventional liquid crystal panel is bent. As illustrated in FIG. 32B, the display defect is generated in the portion in which the misalignment of the first form is generated and the portion in which the misalignment of the second form is generated. FIGS. 33A and 33B are views each illustrating the state of the dark line in a portion in which the misalignment is not generated in the third conventional liquid crystal panel, FIG. 33A is a plan view of the pixel, and FIG. 33B is a cross-sectional view taken along line A-A'. As illustrated in FIGS. 33A and 33B, the dark line of the type A is generated only in the domain boundary region. FIGS. 34A and 34B are views each illustrating the state of the dark line in a portion in which the misalignment of the first form is generated in the third conventional liquid crystal panel, FIG. 34A is a plan view of the pixel, and FIG. 34B is a cross-sectional view taken along line A-A'. As illustrated in FIGS. 34A and 34B, in a portion, in which the third conventional liquid crystal panel is bent, and the TFT substrate is shifted onto the left side while the CF substrate is shifted onto the right side, thereby generating the misalignment of the first form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body. Because the dark line of the type A appears in the pixel having a specific color, a color shift is generated as compared with the portion in which the misalignment is not generated. FIGS. 35A and 35B are views each illustrating the state of the dark line in a portion in which the misalignment of the second form is generated in the third conventional liquid crystal panel, FIG. 35A is a plan view of the pixel, and FIG. 35B is a cross-sectional view taken along line A-A'. As illustrated in FIGS. 35A and 35B, in a portion, in which the third conventional liquid crystal panel is bent, and the TFT substrate is shifted onto the right side while the CF substrate is shifted onto the left side, thereby generating the misalignment of the second form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body. Because the dark line of the type A appears in the pixel having a specific color, a color shift is generated as compared with the portion in which the misalignment is not generated.

Figure 4:
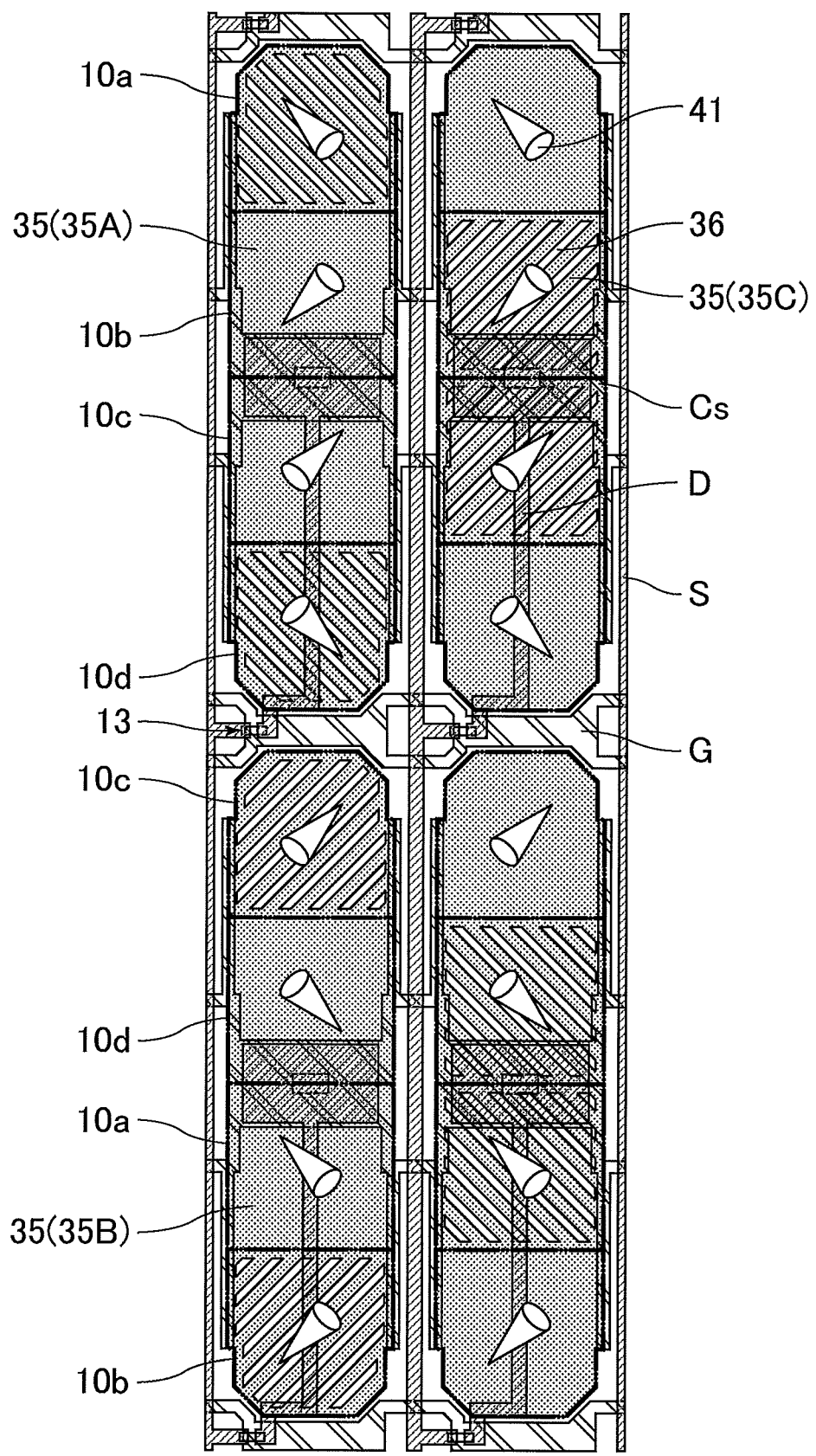
FIG. 4 is a schematic plan view illustrating the oblique azimuth of the liquid crystal molecules in the liquid crystal layer while the oblique azimuth is superposed on an example of an electrode and line structure of a first substrate of the embodiment.

An outline of the configuration of the liquid crystal display device of the embodiment will be described below. The first substrate 30 is an active matrix substrate (TFT substrate), and the active matrix substrate that is commonly used in the field of the liquid crystal panel can be used as the first substrate 30. FIG. 4 is a schematic plan view illustrating the oblique azimuth of the liquid crystal molecules 41 in the liquid crystal layer 40 while the oblique azimuth is superposed on an example of an electrode and line structure of the first substrate 30 of the embodiment. A configuration in which multiple gate lines G parallel to each other; multiple source lines S that extend in a direction orthogonal to the gate line G and are formed in parallel to each other; an active element such as a TFT 13 disposed at an intersection of the gate line G and the source line S; multiple drain lines D disposed in the region sectioned by the gate line G and the source line S; and the pixel electrodes 35 are provided on a transparent substrate 31 in a plan view of the first substrate 30. A capacitance line Cs may be disposed in parallel to the gate line G. In the cross section of the first substrate 30, an insulating film 32 such as a gate insulating film and an interlayer insulating film is provided between the gate line G and the pixel electrode 35.

A TFT in which a channel is formed using an oxide semiconductor is suitably used as the TFT 13. Examples of the oxide semiconductors include a compound (In—Ga—Zn—O) containing indium (In), gallium (Ga), zinc (Zn), and oxygen (O), a compound (In—Sn—Zn—O) containing indium (In), tin (Sn), zinc (Zn), and oxygen (O), and a compound (In—Al—Zn—O) containing indium (In), aluminum (Al), zinc (Zn), and oxygen (O).

The pixel electrode 35 is preferably made of a transparent conductive material. Examples of the transparent conductive materials include indium tin oxide (ITO) and indium zinc oxide (IZO).

Each of the pixel electrodes 35 is superimposed on the first domain 10a, the second domain 10b, the third domain 10c, and the fourth domain 10d. Thus, when the voltage is applied to the liquid crystal layer 40, an electric field having the same magnitude is applied in a thickness direction of the liquid crystal layer 40 in the first domain 10a, the second domain 10b, the third domain 10c, and the fourth domain 10d.

The pixel electrode 35 includes a first pixel electrode 35A having a configuration in which a fine slit 36 parallel to the alignment vector of the corresponding domain is provided in at least one of a region superimposed on the first domain 10a, a region superimposed on the second domain 10b, a region superimposed on the third domain 10c, or a region superimposed on the fourth domain 10d while the fine slit 36 is not provided in the remaining region. As used herein, the fine slit means multiple pairs in each of which the slit and electrode extending in a direction parallel to the desired alignment direction (alignment vector) of the liquid crystal are paired. The fine slit 36 generates electric field distortion having a groove-shaped equipotential surface parallel to the extending direction of the slit portion. The electric field formed by the fine slit 36 has a lateral electric field component parallel to the substrate surface and perpendicular to the extending direction of the slit portion. The alignment direction of the liquid crystal molecules 41 changes due to the lateral electric field component, and the liquid crystal molecules 41 are aligned in parallel to the slit.

Preferably a width (space) and a pitch (line+space) of the fine slit 36 satisfy the following conditions.

width (space) of fine slit 36≤5.1 μm pitch (line+space) of fine slit 36≤11 μm More preferably a width (space) and a pitch (line+space) of the fine slit 36 satisfy the following conditions.

width (space) of the fine slit 36≤4.3 μm pitch (line+space) of fine slit 36≤8.3 μm In the pixel electrode 35, preferably the fine slits 36 are not provided at both ends in the column direction. That is, as illustrated in FIG. 4, linear electrode portions sectioned by the slits of the fine slits 36 are electrically connected to each other by connection portion (solid electrode) at both ends in the column direction.

Preferably the fine slits 36 are not provided up to the end of the pixel electrode 35. Although the fine slits 36 have advantage of improving the alignment controlling force to enhance a response speed, the fine slits 36 have disadvantage of generating a line width variation due to reduction in production efficiency or unevenness of scanning exposure, so that the arrangement region of the fine slits 36 may be limited. For example, the arrangement patterns of the fine slits 36 may be those illustrated in FIGS. 18A to 18E, 19A, and 19B. As illustrated in FIGS. 18A to 18E, 19A, and 19B, a slit (hereinafter also referred to as "center slit") 37 may be disposed at the boundary between the second domain 10b and the third domain 10c. Because an angle difference between the alignment vectors of the domains adjacent to each other is 180° at the boundary between the second domain 10b and the third domain 10c, the liquid crystal molecules 41 can hardly be aligned in the intended direction, and the linear dark portion (dark line) through which the light is insufficiently transmitted is easily generated during the display. For this reason, the center slit 37 is disposed to generate the electric field distortion, which allows the suppression of the dark line. The width of the center slit 37 ranges preferably from 1 µm to 8 µm, more preferably from 2.5 µm to 6 µm.

As illustrated in FIG. 4, preferably the first pixel electrode 35A has a configuration in which the fine slit 36 is provided in two of the region superimposed on the first domain 10*a*, the region superimposed on the second domain 10*b*, the region superimposed on the third domain 10*c*, and the region superimposed on the fourth domain 10*d* while the fine slit 36 is not provided in the remaining two regions.

In the first substrate 30, the pixel electrode 35 is disposed in each pixel 10. The fine slit 36 may be disposed in different regions of each pixel electrode 35. The pixel electrode 35 preferably includes at least one of the following combinations (1) to (4).

(1) a combination of the pixel electrode in which the fine slit 36 is provided in the region superimposed on the first domain 10*a* and the pixel electrode in which the fine slit 36 is not provided in the region superimposed on the first domain 10*a*

(2) a combination of the pixel electrode in which the fine slit 36 is provided in the region superimposed on the second domain 10*b* and the pixel electrode in which the fine slit 36 is not provided in the region superimposed on the second domain 10*b*

(3) a combination of the pixel electrode in which the fine slit 36 is provided in the region superimposed on the third domain 10*c* and the pixel electrode in which the fine slit 36 is not provided in the region superimposed on the third domain 10*c*

(4) a combination of the pixel electrode in which the fine slit 36 is provided in the region superimposed on the fourth domain 10*d* and the pixel electrode in which the fine slit 36 is not provided in the region superimposed on the fourth domain 10*d*

As illustrated in FIG. 4, preferably the pixel electrode 35 includes second pixel electrodes 35B and 35C. The second pixel electrodes 35B and 35C are disposed adjacent to the first pixel electrode 35A, and have a configuration in which the fine slit 36 is provided in two regions superimposed on two types of domains (the second domain 10*b* and the third domain 10*c*) in which the fine slit 36 is not provided in the first pixel electrode 35A while the fine slit 36 is not provided in the remaining two regions. The second pixel electrode 35B is disposed adjacent to the first pixel electrode 35A in the column direction. The second pixel electrode 35C is disposed adjacent to the first pixel electrode 35A in the row direction.

A combination of the first pixel electrode 35A having the configuration in which the fine slit 36 is provided in the region superimposed on the first domain 10*a* and the region superimposed on the fourth domain 10*d* while the fine slit 36 is not provided in the region superimposed on the second domain 10*b* and the region superimposed on the third domain 10*c* and the second pixel electrodes 35B and 35C having the configuration in which the fine slit 36 is provided in the region superimposed on the second domain 10*b* and the region superimposed on the third domain 10*c* while the fine slit 36 is not provided in the region superimposed on the first domain 10*a* and the region superimposed on the fourth domain 10*d* can be cited as a preferred combination of the first pixel electrode 35A and the second pixel electrodes 35B and 35C.

The color filter substrate (CF substrate) can be used as the second substrate 50. A configuration in which the black matrix formed into a lattice shape and a lattice, namely, the color filter formed inside the pixel 10 are provided on the transparent substrate can be cited as the configuration of the color filter substrate. The black matrix may be formed into the lattice shape in each pixel so as to overlap the boundary of the pixel 10, or formed into the lattice shape in each half pixel so as to cross the center of one pixel along the short-side direction. When the black matrix is formed so as to overlap the region where dark line is generated, the dark line is hardly observed, and the influence of the dark line on the display can be minimized.

The counter electrode 51 is disposed so as to be opposed to the pixel electrode 35 with the liquid crystal layer 40 interposed therebetween. The vertical electric field is formed between the counter electrode 51 and the pixel electrode 35 and the liquid crystal molecules 41 are inclined, which allows the display to be performed. For example, in each column, the color filters may be arranged in the order of red (R), green (G), and blue (B), in the order of yellow (Y), red (R), green (G), and blue (B), or in the order of red (R), green (G), blue (B), and green (G).

Preferably the counter electrode 51 is a planar electrode. The counter electrode 51 may be a transparent electrode. For example, the counter electrode 51 can be made of a transparent conductive material such as indium tin oxide (ITO), indium zinc oxide (IZO), zinc oxide (ZnO), and tin oxide (SnO) or an alloy thereof.

In the liquid crystal panel 100 of the embodiment, the first substrate 30 and the second substrate 50 are bonded together by the sealing material 80 that is provided so as to surround the liquid crystal layer 40, and the liquid crystal layer 40 is held in a predetermined region. For example, an epoxy resin containing an inorganic filler or an organic filler and a hardener can be used as the sealing material 80.

A polymer sustained alignment (PSA) technique may be used in the embodiment. In the PSA technique, a liquid crystal composition containing a photopolymerizable monomer is filled between the first substrate 30 and the second substrate 50, the liquid crystal layer 40 is irradiated with light to polymerize the photopolymerizable monomer, a polymer is formed on the surfaces of the first alignment film 71 and the second alignment film 72, and the initial inclination (pre-tilt) of the liquid crystal is fixed by the polymer.

As illustrated in FIG. 2, a polarization axis of the back-side polarizing plate 20 and a polarization axis of the display-side polarizing plate 60 may be orthogonal to each other. The polarization axis may be an absorption axis or a transmission axis of the polarizing plate. Typically, the back-side polarizing plate 20 and the display-side polarizing plate 60 are those obtained by adsorbing and aligning an anisotropic material such as a dichroic iodine complex onto a polyvinyl alcohol (PVA) film. Usually, a protective film such as a triacetyl cellulose film is laminated on both sides of the PVA film, and put into practical use. An optical film such as a retardation film may be disposed between the back-side polarizing plate 20 and the first substrate 30 and between the display-side polarizing plate 60 and the second substrate 50.

Any backlight that emits the light including visible light, any backlight that emits the light including only the visible light, or any backlight that emits the light including both the visible light and ultraviolet light may be used as the backlight 110. A backlight that emits white light is suitably used in order to perform color display on the liquid crystal display device. For example, a light emitting diode (LED) is suitably used as a type of the backlight 110. As used herein, the term "visible light" means light (electromagnetic wave) having a wavelength that is greater than or equal to 380 nm and less than 800 nm.

In addition to the liquid crystal panel 100 and the backlight 110, the liquid crystal display device of the embodiment includes an external circuit such as a tape-carrier package (TCP) and a printed circuit board (PCB); an optical film such as a viewing angle increasing film and a luminance improving film; and a bezel (frame). Some components may be incorporated into another component. Components other than those described above are not particularly limited and are not described here because such components can be those commonly used in the field of liquid crystal display devices.

A method of manufacturing the liquid crystal panel 100 of the embodiment will be described below. The method of manufacturing the liquid crystal panel 100 of the embodiment is not particularly limited, but a method usually used in the field of the liquid crystal panel can be adopted. The gate line G and the pixel electrode 35 that are provided on the first substrate 30 and the color filter provided on the second substrate 50 can be formed by photolithography.

From the viewpoints of patterning accuracy and productivity, the photolithography is suitably used as the method of forming the pixel electrode 35 having the fine slits 36. In the case that the fine slits 36 are formed by the photolithography, a photosensitive resin (photoresist) formed on the conductive film that constitutes a material of the pixel electrode 35 is irradiated with light through a mask having a pattern corresponding to the fine slits 36. The photoresist may be irradiated with the light through multiple lenses (multi-lens).

Figure 5:
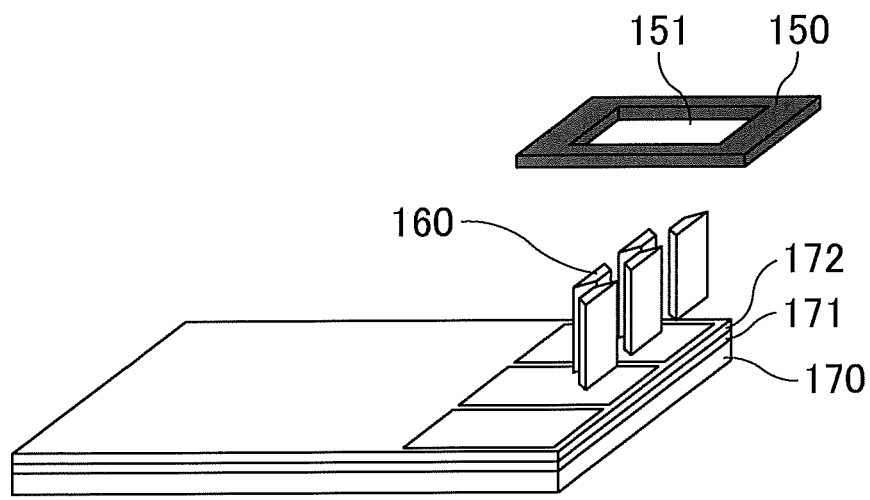
FIG. 5 is a view illustrating photolithography using a multi-lens.

The case that the photoresist is irradiated with the light used for the patterning of the fine slits 36 through the multi-lens will be described with reference to the drawings. FIG. 5 is a view illustrating photolithography using a multi-lens; As illustrated in FIG. 5, exposure is performed on a substrate 170 through a mask 150 including a pattern formation region 151 where a light shielding pattern or a light transmitting pattern corresponding to the fine slit 36 is formed and a multi-lens 160 including the lenses. A substrate on which a photoresist 172 is formed on a conductive film 171 that constitutes the material of the pixel electrode 35 is used as the substrate 170. An exposure system is preferably scanning exposure that is performed while at least one of an exposure unit including the mask 150 and the multi-lens 160 or the substrate 170 is moved. Development of the photoresist 172, etching of the conductive film 171, and peeling of the photoresist 172 are sequentially performed after the exposure.

Figure 6A:
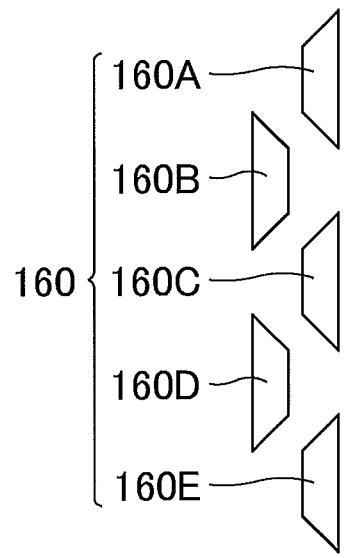
FIG. 6A is a schematic cross-sectional view illustrating an arrangement relation of the lenses in the multi-lens.
Figure 6B:
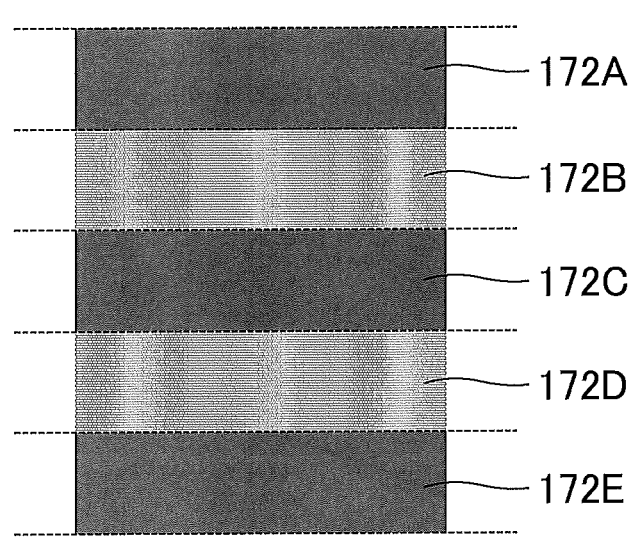
FIG. 6B is a conceptual view illustrating a pattern of luminance unevenness generated when a pixel electrode including fine slits is formed by scanning exposure in which the multi-lens in FIG. 6A is used.

When the exposure is performed using the multi-lens 160, a focal point or illuminance of each lens may vary. FIG. 6A is a schematic cross-sectional view illustrating an arrangement relation of lenses 160A, 160B, 160C, 160D, 160E in the multi-lens 160, and FIG. 6B is a conceptual view illustrating a pattern of the luminance unevenness generated when the pixel electrode 35 including fine slits 36 is formed by scanning exposure in which the multi-lens 160 in FIG. 6A is used. In the case that a difference in the focal point or illuminance exists among the lenses 160A, 160B, 160C, 160D, 160E when the scanning exposure is performed with the arrangement of the lenses 160A, 160B, 160C, 160D, 160E in FIG. 6A, the line width of the fine slits 36 varies in exposure regions 172A, 172B, 172C, 172D, 172E corresponding to the lenses 160A, 160B, 160C, 160D, 160E as illustrated in FIG. 6B. As a result, the luminance of the liquid crystal panel 100 varies in each of the exposure regions 172A, 172B, 172C, 172D, 172E, and is sometimes recognized as the display unevenness. In particular, because the boundary between the adjacent exposure regions 172A, 172B, 172C, 172D, 172E is a portion in which the line width of the fine slits 36 changes, the boundary is recognized as seam-shaped display unevenness to degrade the display quality of the liquid crystal panel 100.

On the other hand, in the liquid crystal panel 100 of the embodiment, the region (also referred to as a "fine slit region") where the fine slit 36 parallel to the alignment vector of the corresponding domain is provided and the region (also referred to as a "solid region") where the fine slit 36 is not provided are provided in the pixel electrode 35. By providing the solid region, the boundary between the regions having different line widths of the fine slits 36 can be prevented from continuing linearly, and hardly recognized as seam-shaped display unevenness.

Figure 7:
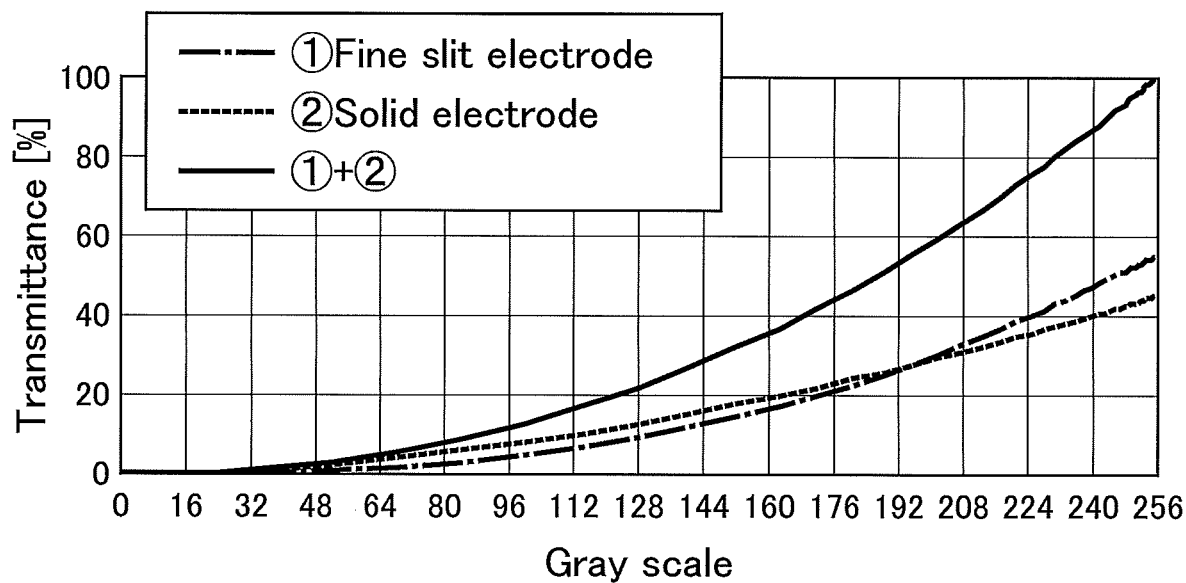
FIG. 7 is a graph illustrating a relationship between gray scale of liquid crystal display in the liquid crystal panel of the embodiment and transmittance with respect to each of a fine slit region, a solid region, and a total of the fine slit region and the solid region.
Figure 8:
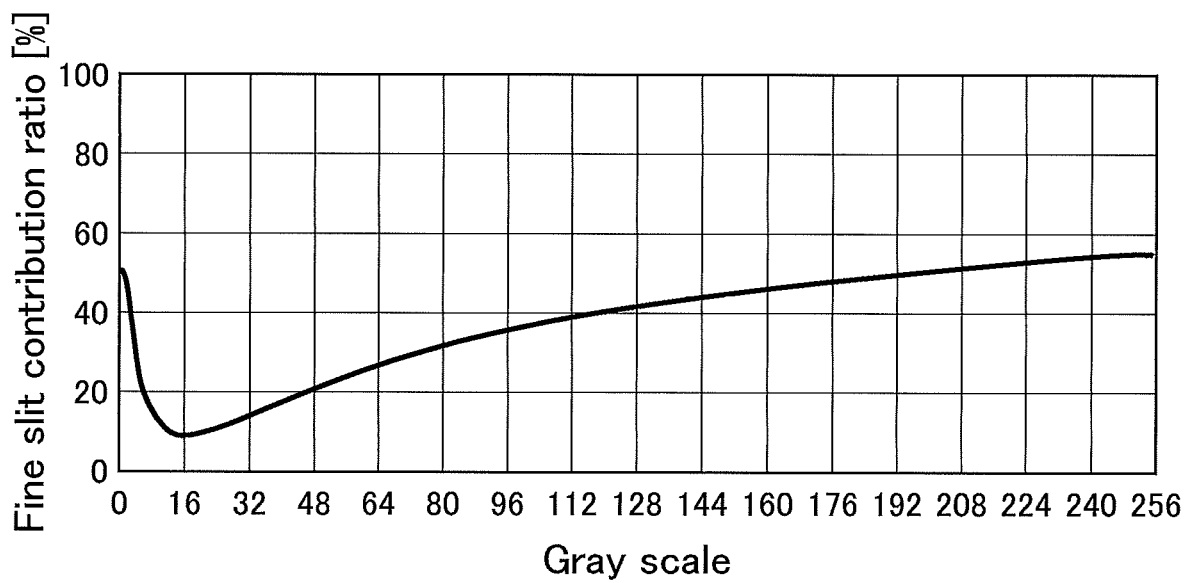
FIG. 8 is a graph illustrating a ratio (fine slit contribution ratio) of transmittance of the fine slit region to the total of transmittances of the fine slit region and the solid region for each gray scale value of the liquid crystal display.

The fine slit region and the solid region are different from each other in luminance (transmittance) obtained with respect to the voltage (the gray scale of the liquid crystal display) applied to the pixel electrode 35. FIG. 7 is a graph illustrating a relationship between the gray scale of the liquid crystal display in the liquid crystal panel 100 of the embodiment and transmittance with respect to each of the fine slit region, the solid region, and a total of the fine slit region and the solid region. As illustrated in FIG. 7, the transmittance of the fine slit region is higher than that of the solid region at the maximum gray scale (around a gray scale value of 255), but the transmittance of the solid region is higher than the transmittance of the fine slit region at the low gray scale (around a gray scale value of 16). FIG. 8 is a graph illustrating a ratio (fine slit contribution ratio) of the transmittance of the fine slit region to the total of the transmittances of the fine slit region and the solid region for each gray scale value of the liquid crystal display. Because the solid region has the higher transmittance than that of the fine slit region at the low gray scale, the ratio of the transmittance of the fine slit region becomes about 10% at the low gray scale as illustrated in FIG. 8. As a result, even if transmittance unevenness (luminance unevenness) is generated in each domain due to the variation in the line width of the fine slit, the transmittance unevenness is not conspicuous particularly at the low gray scale. According to the study by the inventors, it is found that the change in transmittance caused by the variation in the line width of the fine slit is notable particularly at the low gray scale in the display mode of the liquid crystal panel 100 of the embodiment. Thus, when the fine slit region and the solid region are mixed, the luminance unevenness at the low gray scale can effectively be prevented.

In the liquid crystal panel 100 of the embodiment, because the plurality of pixels 10 each of which includes four domains 10a, 10b, 10c, and 10d having different alignment vectors are provided, the display unevenness can be prevented from having viewing angle dependency by providing the fine slit region and the solid region in each domain. That is, the pixel electrode (first pixel electrode 35A) in which the fine slit 36 is provided in the region superimposed on the first domain 10a and the pixel electrode (second pixel electrodes 35B and 35C) in which the fine slit 36 is not provided in the region superimposed on the first domain 10a are combined and disposed, which allows the luminance as viewed from the first direction to be prevented from being different from the luminance as viewed from another direction. Similarly, the pixel electrode (second pixel electrodes 35B and 35C) in which the fine slit 36 is provided in the region superimposed on the second domain 10b and the pixel electrode (first pixel electrode 35A) in which the fine slit 36 is not provided in the region superimposed on the second domain 10b are combined and disposed, which allows the luminance as viewed from the second direction to be prevented from being different from the luminance as viewed from another direction. The pixel electrode (second pixel electrodes 35B and 35C) in which the fine slit 36 is provided in the region superimposed on the third domain 10c and the pixel electrode (first pixel electrode 35A) in which the fine slit 36 is not provided in the region superimposed on the third domain 10c are combined and disposed, which allows the luminance as viewed from the third direction to be prevented from being different from the luminance as viewed from another direction. The pixel electrode (first pixel electrode 35A) in which the fine slit 36 is provided in the region superimposed on the fourth domain 10d and the pixel electrode (second pixel electrodes 35B and 35C) in which the fine slit 36 is not provided in the region superimposed on the fourth domain 10d are combined and disposed, which allows the luminance as viewed from the fourth direction to be prevented from being different from the luminance as viewed from another direction.

When the first pixel electrode 35A and the second pixel electrodes 35B and 35C are used in combination with each other, a set of the fine slit region and the solid region corresponding to the same type of domain are provided in two pixels adjacent to each other, so that the display unevenness having the viewing angle dependency can more effectively be prevented.

In the liquid crystal panel 100 of the embodiment, a repeating unit of the domain array is not one line (four domains) but two lines (eight domains) by varying the domain array in the nth row pixel and the domain array in the (n+1)th row pixel. This also exerts the effect that the boundaries of the exposure regions 172A, 172B, 172C, 172D, 172E are hardly recognized as the seam-shaped display unevenness as compared with a general form in which the domain array of each row is the same.

A photo alignment film can also be used for one or both of the first alignment film 71 and the second alignment film 72. In this case, the alignment treatment performed on the photo alignment film can be performed by the photo alignment treatment in which the photo alignment film is irradiated with light (electromagnetic wave) such as ultraviolet light and visible light. For example, the photo alignment treatment is performed using a device, which includes a light source that emits the light to the first alignment film 71 and the second alignment film 72 and has a function of performing continuous scanning exposure over the pixels. Examples of specific modes of the scanning exposure include a mode in which a substrate surface is irradiated with the light emitted from the light source while the substrate is moved, a mode in which the substrate surface is irradiated with the light emitted from the light source while the light source is moved, and a mode in which the substrate surface is irradiated with the light emitted from the light source while the light source and the substrate are moved.

Figure 9:
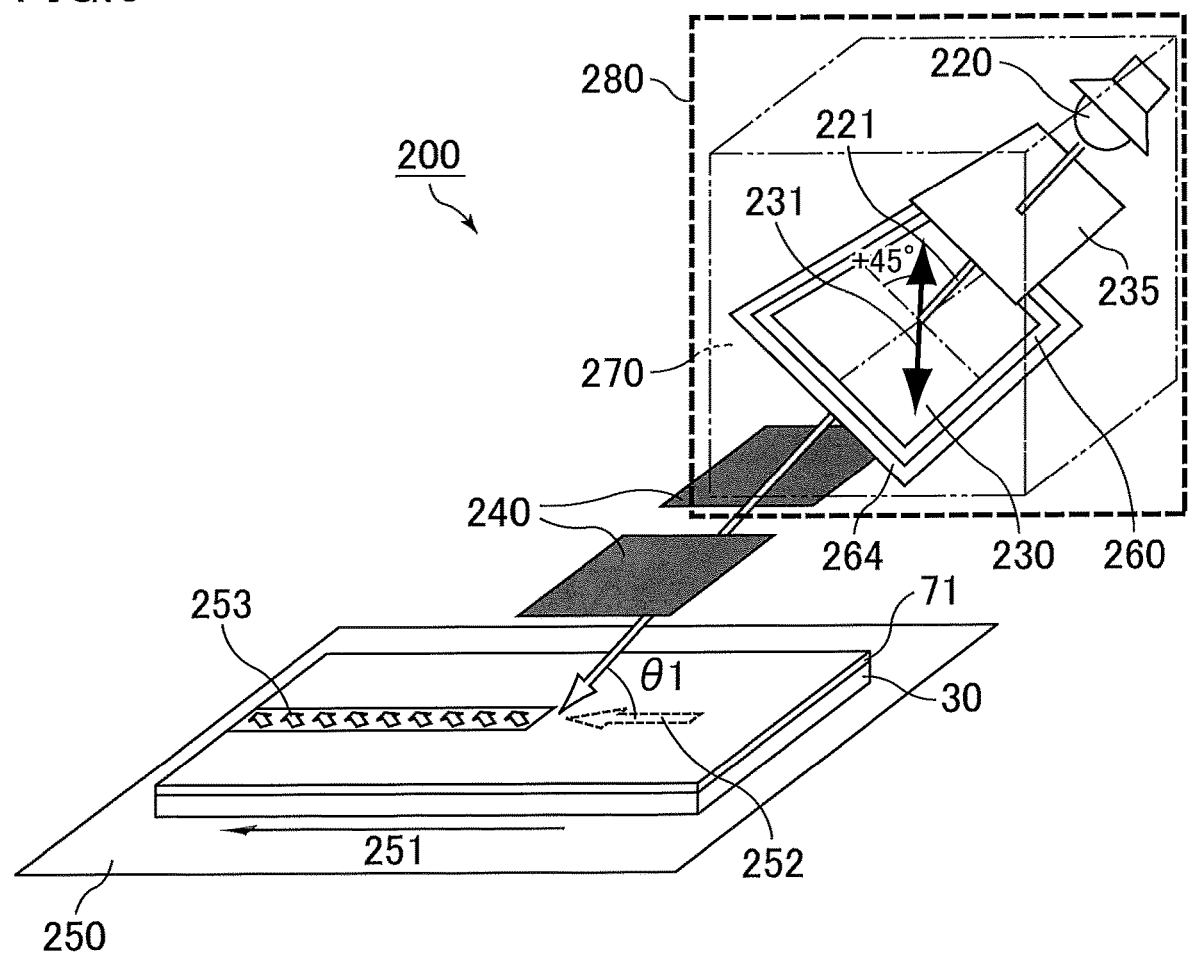
FIG. 9 is a schematic diagram illustrating an example of a photo alignment treatment device.

A specific example of the alignment treatment will be described below. FIG. 9 is a schematic diagram illustrating an example of the photo alignment treatment device. A photo alignment treatment device 200 in FIG. 9 performs the photo alignment treatment on the photo alignment film formed on the liquid crystal panel substrate. Although the first alignment film 71 formed on the first substrate (liquid crystal panel substrate) 30 is illustrated in FIG. 9, the second alignment film 72 can also be processed. The photo alignment treatment device 200 includes a light irradiation mechanism 280 and a stage 250 on which the liquid crystal panel substrate 30 is placed.

The light irradiation mechanism 280 includes a light source 220, a polarizer 230, and a rotation adjustment mechanism 260. The light source 220 and the polarizer 230 may be disposed in a lamp box 270. A type of the light source 220 is not particularly limited, but a light source typically used in the field of the photo alignment treatment device can be used. For example, a low-pressure mercury lamp, a deuterium lamp, a metal halide lamp, an argon resonance lamp, and a xenon lamp can be used.

Light 221 emitted from the light source 220 may be light (electromagnetic wave) such as ultraviolet light and visible light, and the light 221 preferably has a wavelength of 280 nm to 400 nm.

For example, the polarizer 230 extracts linearly polarized light from the light emitted from the light source 220 toward the liquid crystal panel substrate 30. The polarization axis means to transmission axis or an absorption axis of the polarizer. Examples of the polarizer 230 include an organic resin polarizer, a wire grid polarizer, and a polarizing beam splitter (PBS).

A polarizer obtained by adsorbing iodine in polyvinyl alcohol and extending polyvinyl alcohol in a sheet shape can be cited as an example of the organic resin polarizer.

For example, the wire grid polarizer includes a light transmission base material and multiple metal thin wires formed on the light transmission base material, and the metal thin wires are disposed in a period shorter than the wavelength of light incident on the wire grid polarizer. The metal thin wire is made of a light absorbing metal material such as chromium. When the wire grid polarizer is irradiated with the light while superimposed on the liquid crystal panel substrate 30, the liquid crystal molecules are aligned in the azimuth orthogonal to an extending azimuth of the metal thin wire. In the case that the polarizer 230 is the wire grid polarizer, the polarization axis is the azimuth orthogonal to the extending azimuth of the metal thin wire. Alignment division treatment can efficiently be performed using the wire grid polarizer having a different extending azimuth of the metal thin wire.

A cube type polarization beam splitter or a plate type polarization beam splitter can be cited as an example of the polarization beam splitter. A PBS, in which slopes of two prisms are bonded together and an optical thin film is evaporated on one of the slopes, can be cited as an example of the cube type PBS.

The polarizer 230 may be disposed perpendicular to the light irradiation axis. In the case that the polarizer 230 is not disposed perpendicularly to the light irradiation axis, sometimes the alignment of the liquid crystal molecules is influenced by a waveguide effect in the polarizer 230. The light irradiation axis is a direction in which the light 221 emitted from the light source 220 toward the liquid crystal panel substrate 30 propagates linearly. The disposition of the polarizer perpendicular to the light irradiation axis means that the polarizer is disposed such that the light is emitted from a normal direction of the polarizer toward the liquid crystal panel substrate, and the term "perpendicular" means a range in which an angle formed between the normal line of the polarizer and the light irradiation axis is less than 0.5°.

A wavelength selection filter 235 may be included between the light source 220 and the polarizer 230. A main wavelength of the light emitted through the wavelength selection filter 235 may range from 280 nm to 400 nm. The selection wavelength of 280 nm to 400 nm can generate a structural change of a material, which constitutes the first alignment film 71 and exhibits the photo alignment characteristic, and exert the alignment controlling force. Intensity of the light emitted from the light source may range from 10 mJ/cm$^2$ to 100 mJ/cm$^2$.

The wavelength selection filter 235 is not particularly limited, and a wavelength selection filter typically used in the field of the photo alignment treatment device can be used. A wavelength selection filter in which a substance absorbing a wavelength other than the transmission wavelength is dispersed in the filter or a wavelength selection filter in which a substance reflecting a wavelength other than the transmission wavelength is coated on the surface of the filter can be cited as an example of the wavelength selection filter 235.

The light irradiation angle with respect to the liquid crystal panel substrate 30 may range from 30° to 60°. The irradiation angle is represented by θ1 in FIG. 13, and is an angle formed between a plane of the liquid crystal panel substrate 30 and the light irradiation axis in the case that the surface of the liquid crystal panel substrate 30 is set to 0° and in the case that the normal line of the liquid crystal panel substrate 30 is set to 90°.

An extinction ratio of the polarizer may range from 50:1 to 500:1. The extinction ratio is represented by Tmax:Tmin, where Tmax is maximum transmittance in the case that the polarizer is irradiated with the light and Tmin is minimum transmittance obtained by rotating the polarizer by 90°. The light in the desired polarization axis direction is taken out with increasing extinction ratio (a value of Tmax in the case that Tmin is set to 1), so that a variation in oblique azimuth of the liquid crystal molecules can be reduced.

The rotation adjustment mechanism 260 rotates a polarization axis 231 of the polarizer 230, and adjusts an exposure direction 253 on the surface of the liquid crystal panel substrate 30 so as to substantially become 45° with respect to a light irradiation direction 252. By setting the exposure direction 253 to substantially 45° with respect to the light irradiation direction 252, the photo alignment treatment can be performed on the liquid crystal panel substrate 30 by scanning exposure having excellent productivity while a movement direction 251 of the liquid crystal panel substrate 30 is kept in parallel to the light irradiation direction 252. As illustrated in FIG. 9, the light irradiation direction 252 means a light traveling direction in the case that the light 221 emitted from the light source 220 is projected onto the surface of the liquid crystal panel substrate 30. The exposure direction 253 means a vibration direction of polarized light emitted from the light source 220 to the surface of the liquid crystal panel substrate 30 through the polarizer 230. A pre-tilt azimuth that the alignment film formed on the surface of the liquid crystal panel substrate 30 provides to the liquid crystal molecules is fixed by the exposure direction 253.

For example, the polarization axis 231 is adjusted using the rotation adjustment mechanism 260 by the following method. The polarizer 230 is set such that the polarization axis 231 becomes 45° with respect to the light irradiation direction 252. The azimuth of the polarization axis before the polarization axis is adjusted by the rotation adjustment mechanism is also referred to as "a 45° azimuth". Subsequently, the rotation adjustment mechanism 260 rotates the polarizer 230 from the 45° azimuth to adjust the azimuth of the polarization axis 231 based on data calculated by geometric computation in consideration of the light irradiation angle with respect to the liquid crystal panel substrate and a refractive index of the alignment film material. The rotation adjustment mechanism 260 can match the azimuth of the polarization axis of the polarizer with respect to the light irradiation direction with the exposure direction on the surface of the liquid crystal panel substrate to set the oblique azimuth of the liquid crystal molecules in the liquid crystal panel to a desired angle. When the photo alignment treatment is performed with no use of the rotation adjustment mechanism 260 while the polarization axis 231 is fixed to the 45° azimuth, sometimes the oblique azimuth of the liquid crystal molecules deviates by about 10° from about 45°.

The rotation adjustment mechanism 260 may rotate the polarization axis of the polarizer 230 in the range of −15° to +15° from the 45° azimuth. When the rotation adjustment mechanism 260 rotates the polarization axis in the range of −15° to +15°, even if the light irradiation angle is changed with respect to the liquid crystal panel substrate 30, the exposure direction 253 can be adjusted to set the oblique azimuth of the liquid crystal molecules to the desired angle. For example, the polarization axis 231 is rotated from the 45° azimuth by +7.55° and set to 52.55° in order to adjust the exposure direction 253 on the surface of the liquid crystal panel substrate to substantial 45° with respect to the light irradiation direction 252.

The photo alignment treatment device 200 may further include a rotation mechanism 264. The rotation mechanism 264 can rotate the polarization axis 231 of the polarizer 230 by selecting either substantial 45° or substantial 90° from the 45° azimuth. In the case that the azimuth of 45° is set to the +45° azimuth clockwise with respect to the light irradiation direction 252, the rotated polarization axis 231 becomes the −45° azimuth with respect to the light irradiation direction 252 when the polarization axis 231 of the polarizer 230 is rotated by 90° from the +45° azimuth. The polarization axis 231 is rotated by 90° from the +45° azimuth and adjusted by the rotation adjustment mechanism 260, which allows the light irradiation to be performed while the exposure direction 253 is set to substantial 45° with respect to the light irradiation direction 252 before and after the rotation. Consequently, the embodiment is suitable for manufacturing a liquid crystal panel having an alignment control mode, in which four alignment regions having mutually different oblique azimuths of the liquid crystal molecules are arranged along a longitudinal direction of the pixel as illustrated in FIG. 2. The liquid crystal panel having the new alignment control mode can be manufactured by the scanning exposure, so that production efficiency can greatly be improved. The term "substantial 45° or substantial 90° from the 45° azimuth" means a range of an angle of 15° clockwise or counterclockwise from 45° or 90° with respect to the 45° azimuth, respectively. The 45° azimuth and the 90° azimuth refer to a range of ±0.5° from 45° and 90°, respectively.

The rotation mechanism 264 can also rotate the polarization axis 231 of the polarizer 230 from the 45° azimuth to substantial 45°. When the polarization axis 231 is rotated by 45° from the 45° azimuth, the rotated polarization axis 231 is parallel to the light irradiation direction, so that the conventional photo alignment treatment in which the polarization axis of the polarizer is matched with the light irradiation direction can also be performed.

The stage 250 is a stage on which the liquid crystal panel substrate 30 is placed. The liquid crystal panel substrate 30 is fixed onto the stage 250, and the liquid crystal panel substrate 30 is irradiated with the light while the liquid crystal panel substrate 30 is moved, or the liquid crystal panel substrate 30 is irradiated with the light while the light source is moved with respect to the liquid crystal panel substrate 30. The photo alignment treatment can efficiently be performed by performing the scanning exposure. The light irradiation direction with respect to the liquid crystal panel substrate 30 is parallel to the movement direction of the liquid crystal panel substrate 30 or the movement direction of the light source 220, and an incident angle of light incident on the substrate from the light source becomes substantially the same in a light irradiation area of the light source, so that a pre-tilt angle (polar angle) provided to the liquid crystal molecules also becomes substantially the same. For this reason, a variation in pre-tilt angle can be suppressed in the light irradiation area to manufacture the liquid crystal panel having excellent display quality. The photo alignment treatment device 200 may include a stage scanning mechanism that moves the stage 250 and/or a light source scanning mechanism that moves the light source 220. The term "parallel" includes a range in which the angle formed between the light irradiation direction and the movement direction of the liquid crystal panel substrate 30 or the movement direction of the light source 220 is less than 5°.

The photo alignment treatment device 200 may include a light shielding member 240 in addition to the stage scanning mechanism and/or the light source scanning mechanism. The alignment division treatment can be performed by performing the photo alignment treatment while a portion that is not irradiated with the light is shielded by the light shielding member 240.

The use of the photo alignment treatment device can match the azimuth of the polarization axis of the polarizer with respect to the light irradiation direction with the exposure direction on the surface of the liquid crystal panel substrate to set the oblique azimuth of the liquid crystal molecules 41 in the liquid crystal panel 100 to the desired angle.

Figure 10:
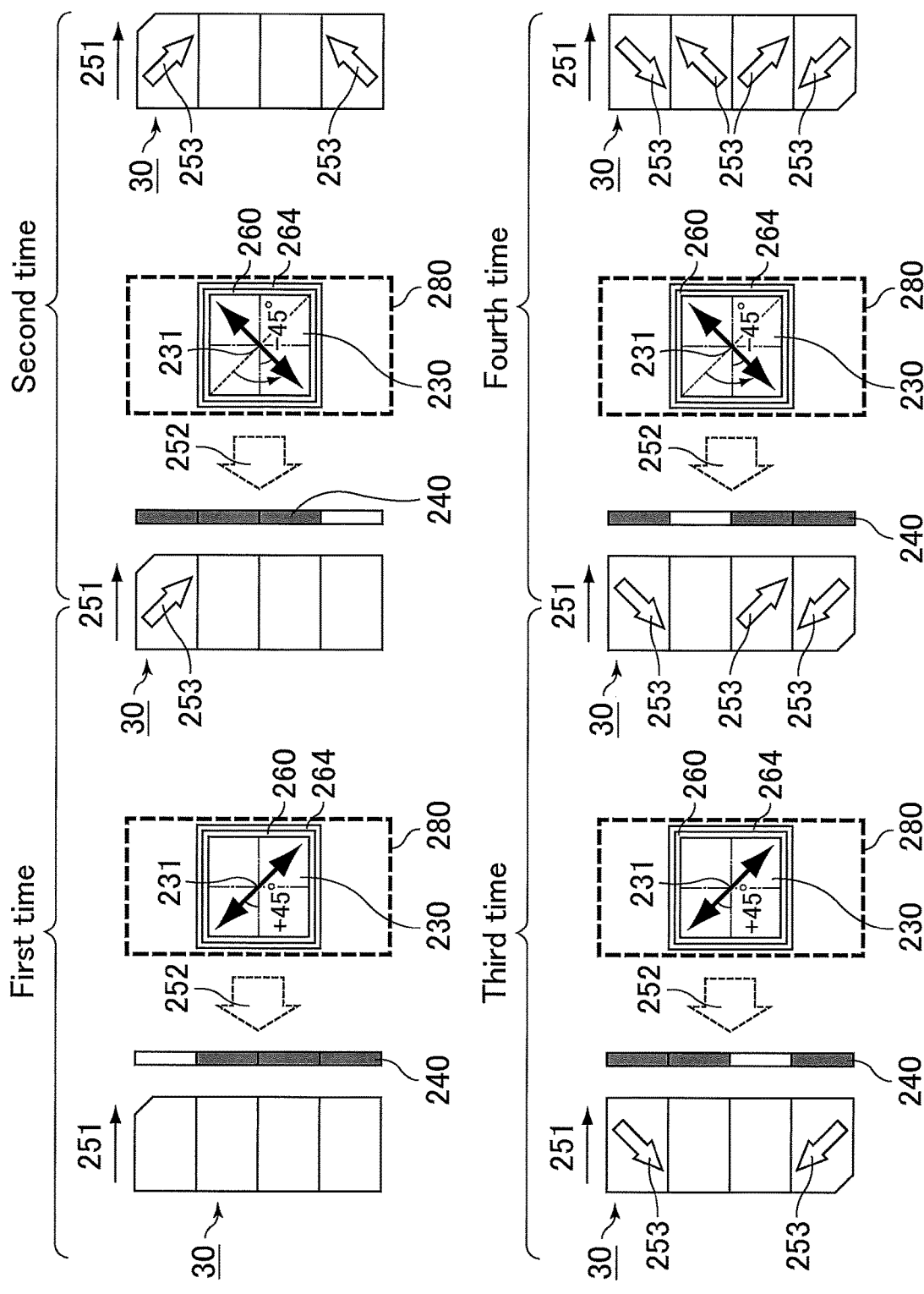
FIG. 10 is a view illustrating an example of a photo alignment treatment step using the photo alignment treatment device.

An example of a photo alignment treatment step using the photo alignment treatment device 200 will be described below with reference to FIG. 14. FIG. 10 is a view illustrating an example of the photo alignment treatment step using the photo alignment treatment device. The photo alignment treatment step in FIG. 10 is an example in which, using the light irradiation mechanism 280 including one polarizer 230, the polarization axis 231 of the polarizer 230 is rotated by the rotation mechanism 264 to perform the photo alignment treatment. In FIG. 10, in order to describe the azimuth of the liquid crystal panel substrate 30, a notch is illustrated in one corner. However, the actual liquid crystal panel substrate 30 may not include the notch.

As illustrated in FIG. 10, the movement direction 251 of the liquid crystal panel substrate 30 is set to the first direction, the light irradiation direction 252 is set to the second direction, and the first-time light irradiation is performed through the wavelength selection filter 235 (not illustrated) and the polarizer 230 using the light irradiation mechanism 280. The first direction and the second direction are parallel to each other. The region that is not irradiated with the light is shielded by the light shielding member 240. The polarization axis 231 of the polarizer 230 is set to the +45° azimuth clockwise with respect to the light irradiation direction 252, and then the rotation adjustment mechanism 260 adjusts the exposure direction 253 on the surface of the liquid crystal panel substrate 30 to substantial 45° with respect to the light irradiation direction 252 to perform the first-time light irradiation. Subsequently, the light shielding member 240 is moved, the polarization axis 231 of the polarizer 230 is rotated by 90° from the +45° azimuth by the rotation mechanism 264 and set to the −45° azimuth counterclockwise with respect to the light irradiation direction 252, and then the polarization axis 231 is adjusted by the rotation adjustment mechanism 260 to perform the second-time light irradiation. Subsequently, the substrate is rotated by 180°, the light shielding member 240 is further moved, the polarizer 230 is rotated by 90° from the −45° azimuth by the rotation mechanism 264 and set to the +45° azimuth, and then the polarization axis 231 is adjusted by the rotation adjustment mechanism 260 to perform the third-time light irradiation. Finally, the light shielding member 240 is moved, the polarizer 230 is rotated by 90° from the +45° azimuth by the rotation mechanism 264 and set to the −45° azimuth, and then the polarization axis 231 is adjusted by the rotation adjustment mechanism 260 to perform the fourth-time light irradiation. In the liquid crystal panel substrate 30 subjected to the light irradiation step, a pre-tilt azimuth 253 varies in each of regions corresponding to the four alignment regions formed in one pixel. The movement direction 251 and the light irradiation direction 252 of the liquid crystal panel substrate 30 are the same in all the first-time light irradiation to the fourth-time light irradiation. In all the first-time light irradiation to the fourth-time light irradiation, the polarization axis 231 is adjusted by the rotation adjustment mechanism 260 such that the exposure direction 253 on the surface of the liquid crystal panel substrate 30 becomes substantial 45° with respect to the light irradiation direction 252.

Figure 11A:
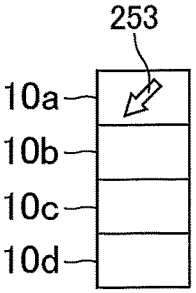
FIG. 11A is a view illustrating the photo alignment treatment performed on a TFT substrate (first substrate)
Figure 11B:
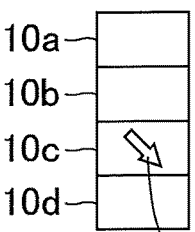
FIG. 11B is a view illustrating the photo alignment treatment performed on a CF substrate (second substrate)
Figure 11C:
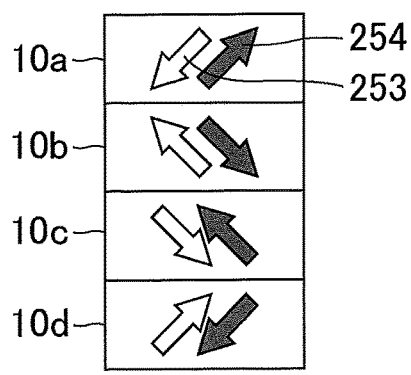
FIG. 11C is a view illustrating a state after bonding of the TFT substrate and the CF substrate that are subject to the photo alignment treatment.

FIG. 11A is a view illustrating the photo alignment treatment performed on the TFT substrate (first substrate), FIG. 11B is a view illustrating the photo alignment treatment performed on the CF substrate (second substrate), and FIG. 11C is a view illustrating a state after bonding of the TFT substrate and the CF substrate that are subject to the photo alignment treatment; As illustrated in FIG. 11A, the TFT substrate (first substrate) 30 is subjected to the photo alignment treatment by changing the pre-tilt azimuth 253 in each domain by the first-time light irradiation to the fourth-time light irradiation. In the same manner as in the TFT substrate, as illustrated in FIG. 11B, the CF substrate (second substrate) 50 is also subjected to the photo alignment treatment by changing a pre-tilt azimuth 254 in each domain by the first-time light irradiation to the fourth-time light irradiation. As illustrated in FIGS. 11A and 11B, the first domain 10a, the second domain 10b, the third domain 10c, and the fourth domain 10d that are included in the liquid crystal panel 100 of the embodiment are completed when the TFT substrate 30 and the CF substrate 50 that are subjected to the photo alignment treatment are bonded together.

(Modifications)

Figure 12:
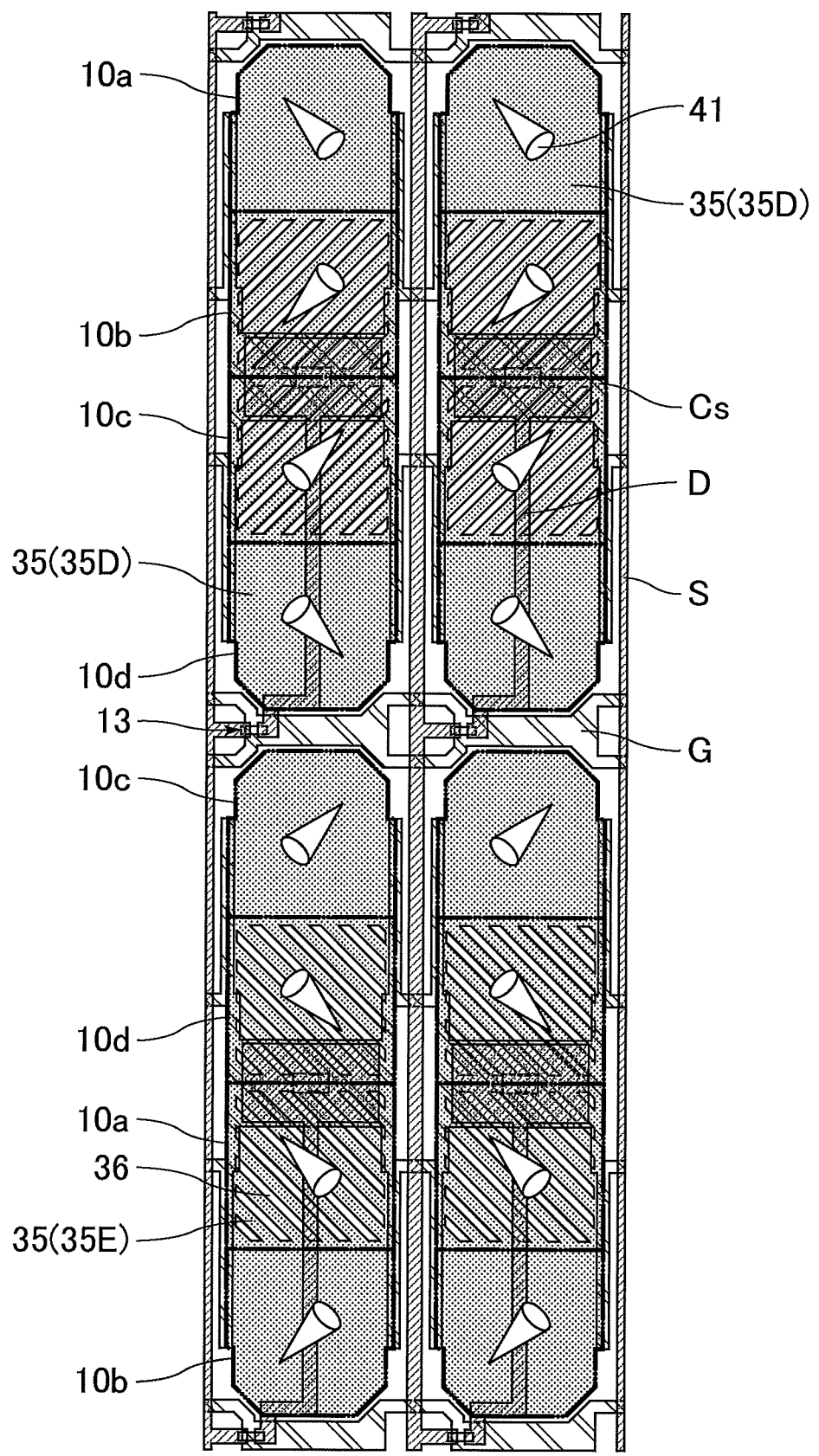
FIG. 12 is a schematic plan view illustrating the oblique azimuth of the liquid crystal molecules in the liquid crystal layer while the oblique azimuth is superposed on an example of an electrode and line structure of a first substrate according to a first modification.

The arrangement relation between the domain array and the fine slits provided in the pixel electrode 35 may be those in FIGS. 12 to 18. FIG. 12 is a schematic plan view illustrating the oblique azimuth of the liquid crystal molecules 41 in the liquid crystal layer 40 while the oblique azimuth is superposed on an example of the electrode and line structure of the first substrate 30 according to a first modification. In the pixel electrode 35 of the first modification, the fine slit 36 is provided in the two regions located at the second and third positions from one electrode end among the regions superimposed on the four domains, and the fine slit 36 is not provided in the two regions located at the first and fourth positions. In relation to the line, the fine slit 36 is provided in the domain located along the capacitance line Cs. In relation to the domain, the pixel electrode 35 of the first modification includes a first pixel electrode 35D having a configuration in which the fine slit 36 is provided in the region superimposed on the second domain 10b and the region superimposed on the third domain 10c while the fine slit 36 is not provided in the region superimposed on the first domain 10a and the region superimposed on the fourth domain 10d and a second pixel electrode 35E having a configuration in which the fine slit 36 is provided in the two regions superimposed on the two types of domains (the first domain 10a and the fourth domain 10d) in which the fine slit 36 is not provided in the first pixel electrode 35D while the fine slit 36 is not provided in the remaining two regions. The first pixel electrode 35D and the second pixel electrode 35E are alternately arranged in the column direction. There are a row in which the first pixel electrode 35D is repeatedly arranged and a row in which the second pixel electrode 35E is repeatedly arranged.

The liquid crystal display device of the embodiment in FIG. 4 has a high unevenness improvement effect when viewed from a relatively distant position, but the liquid crystal display device of the embodiment has discomfort in the display depending on the image when viewed at a close distance. For example, sometimes a two-line-period lateral line is visible or granular feeling is felt when halftone solid display is obliquely viewed, and an edge of a box is seen jaggy in the display of a box-shaped image on a halftone background. On the other hand, in the liquid crystal display device of the first modification in FIG. 12, the granular feeling at a close distance and the jaggy feeling at the edge of the box are improved, and clear display is obtained.

Figure 13:
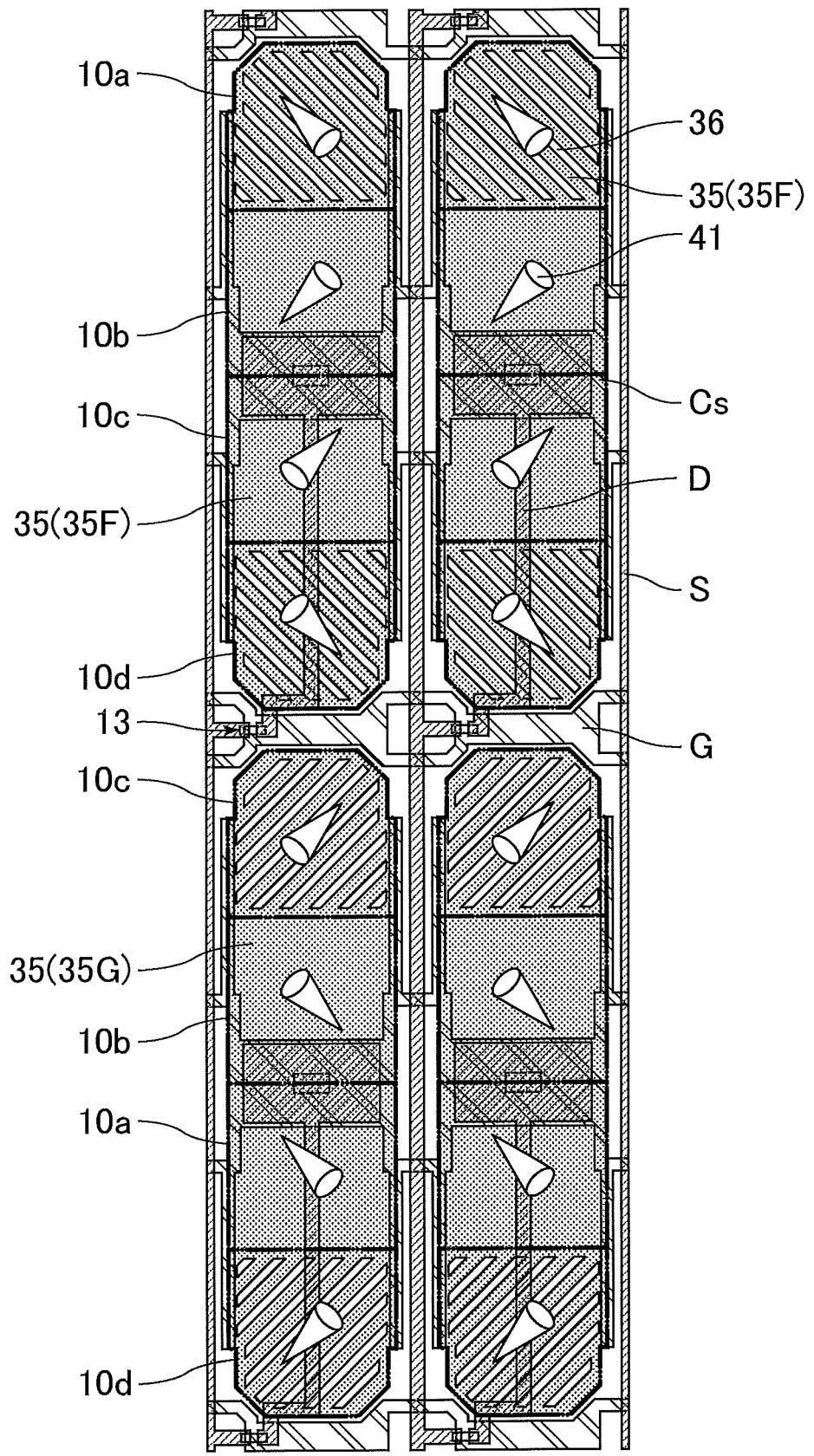
FIG. 13 is a schematic plan view illustrating the oblique azimuth of the liquid crystal molecules in the liquid crystal layer while the oblique azimuth is superposed on an example of an electrode and line structure of a first substrate according to a second modification.

FIG. 13 is a schematic plan view illustrating the oblique azimuth of the liquid crystal molecules 41 in the liquid crystal layer 40 while the oblique azimuth is superposed on an example of the electrode and line structure of the first substrate 30 according to a second modification. In the pixel electrode 35 of the second modification, the fine slit 36 is provided in two regions located at the first and fourth positions from one electrode end among the regions superimposed on the four domains, and the fine slit 36 is not provided in the two regions located at the second and third positions. In relation to the line, the fine slit 36 is provided in the domain located along the gate line G. In relation to the domain, the pixel electrode 35 of the second modification includes a first pixel electrode 35F having a configuration in which the fine slit 36 is provided in the region superimposed on the first domain 10a and the region superimposed on the fourth domain 10d while the fine slit 36 is not provided in the region superimposed on the second domain 10b and the region superimposed on the third domain 10c and a second pixel electrode 35G having a configuration in which the fine slit 36 is provided in the two regions superimposed on the two types of domains (the second domain 10b and the third domain 10c) in which the fine slit 36 is not provided in the first pixel electrode 35F while the fine slit 36 is not provided in the remaining two regions. The first pixel electrode 35F and the second pixel electrode 35G are alternately arranged in the column direction. There are a row in which the first pixel electrode 35F is repeatedly arranged and a row in which the second pixel electrode 35G is repeatedly arranged.

In the liquid crystal display device of the second modification in FIG. 13, in the same manner as in the liquid crystal display device of the first modification in FIG. 12, as compared with the liquid crystal display device of the embodiment, the granular feeling at a close distance and the jaggy feeling at the edge of the box are improved, and the clear display is obtained. Looking more closely the horizontal edge of the box, sometimes the edge of the liquid crystal display device of the first modification may appear as a double line. However, in the liquid crystal display device of the second modification, this point is also improved.

Figure 14:
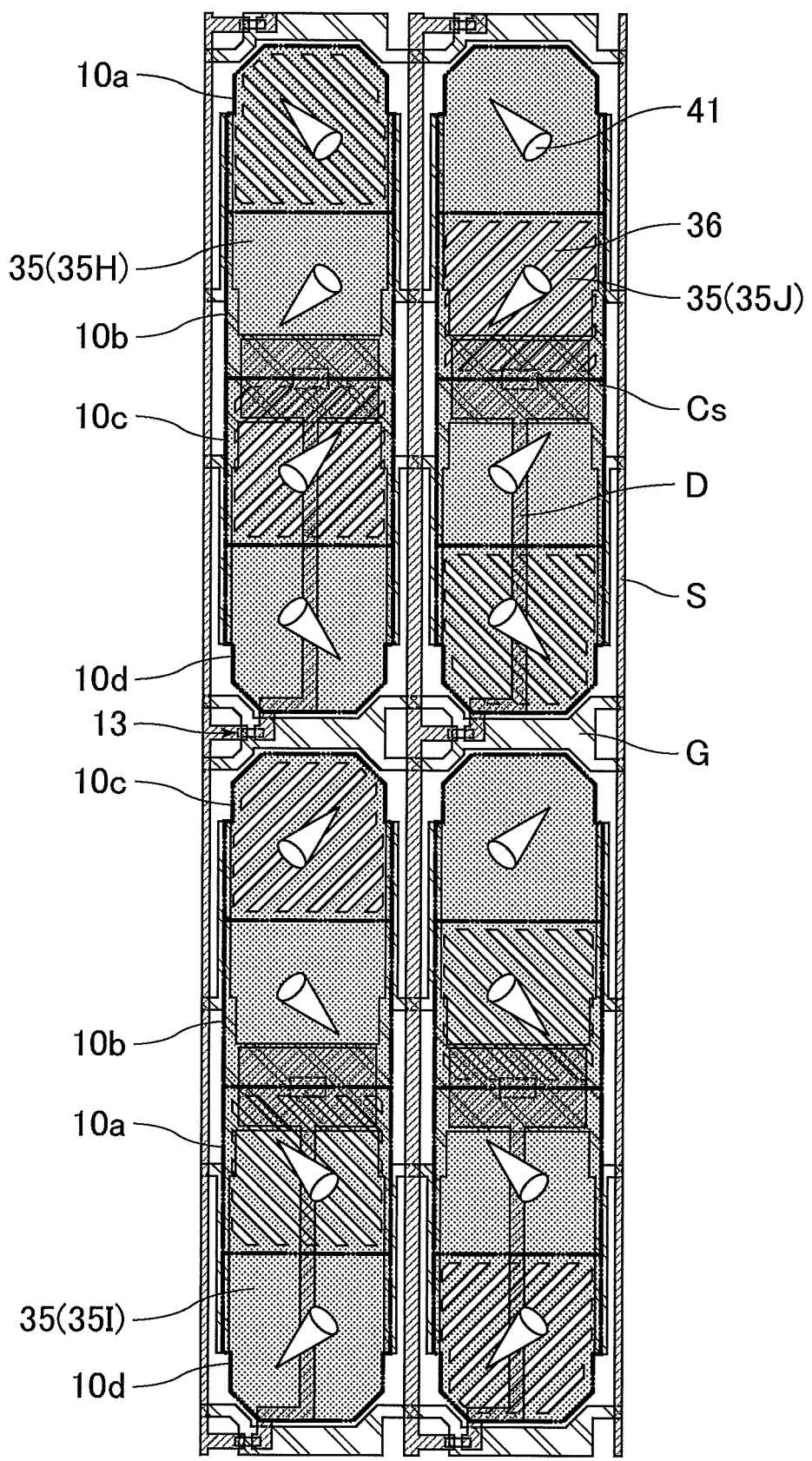
FIG. 14 is a schematic plan view illustrating the oblique azimuth of the liquid crystal molecules in the liquid crystal layer while the oblique azimuth is superposed on an example of an electrode and line structure of a first substrate according to a third modification.

FIG. 14 is a schematic plan view illustrating the oblique azimuth of the liquid crystal molecules 41 in the liquid crystal layer 40 while the oblique azimuth is superposed on an example of the electrode and line structure of the first substrate 30 according to a third modification. The pixel electrode 35 of the third modification includes first pixel electrodes 35H and 35I having an electrode structure in which the fine slit 36 is provided in two regions located at the first and third positions from one electrode end among the regions superimposed on the four domains while the fine slit 36 is not provided in the two regions located at the second and fourth positions and a third pixel electrode 35J having an electrode structure in which the fine slit 36 is provided in the two regions located at the second and fourth positions from one electrode end while the fine slit 36 is not provided in two regions located at the first and third positions. In relation to the domain, the pixel electrode 35 of the third modification includes the first pixel electrodes 35H and 35I having the configuration in which the fine slit 36 is provided in the region superimposed on the first domain 10a and the region superimposed on the third domain 10c while the fine slit 36 is not provided in the region superimposed on the second domain 10b and the region superimposed on the fourth domain 10d and the third pixel electrode 35J having the configuration in which the fine slit 36 is provided in the two regions superimposed on the two types of domains (the second domain 10b and the fourth domain 10d) in which the fine slit 36 is not provided in the first pixel electrodes 35H and 35I while the fine slit 36 is not provided in the remaining two regions.

In the liquid crystal display device of the third modification in FIG. 14, as compared with the liquid crystal display device of the embodiment, density of the granule at a close distance is high, the granular feeling and the jaggy feeling at the edge of the box are improved, and the relatively clear display is obtained. The granular feeling at the pixel edge is improved, and the relatively clearly display is obtained.

Figure 15:
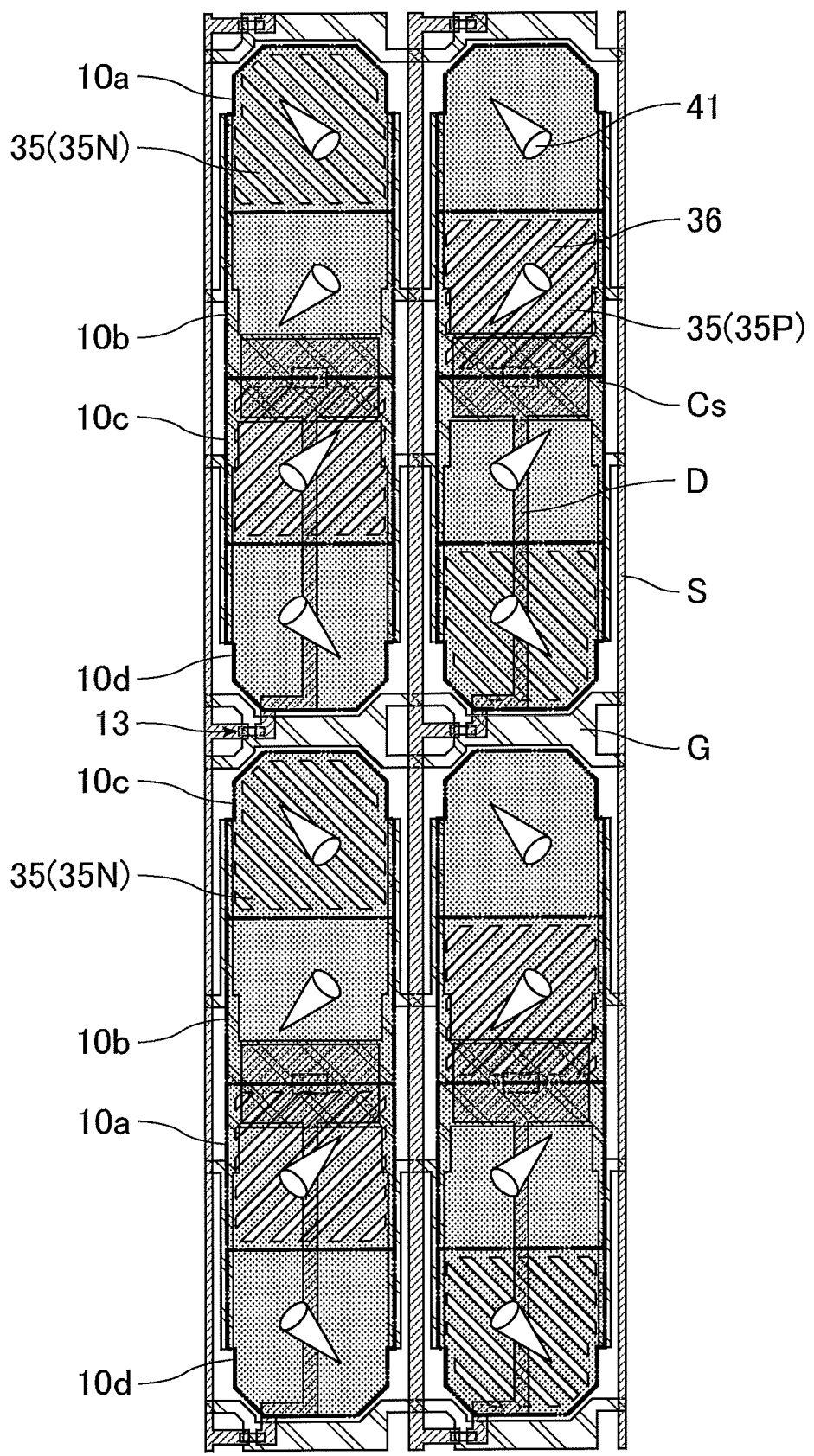
FIG. 15 is a schematic plan view illustrating the oblique azimuth of the liquid crystal molecules in the liquid crystal layer while the oblique azimuth is superposed on an example of an electrode and line structure of a first substrate according to a fourth modification.

FIG. 15 is a schematic plan view illustrating the oblique azimuth of the liquid crystal molecules 41 in the liquid crystal layer 40 while the oblique azimuth is superposed on an example of the electrode and line structure of the first substrate 30 according to a fourth modification. The fourth modification is different from the third modification having a configuration of the two-line-period in that the domain array is one line period. That is, the domains in the nth row pixel are arranged in the order of the first domain 10a, the second domain 10b, the third domain 10c, and the fourth domain 10d, and the domains in the (n+1)th row pixel are arranged in the order of the first domain 10a, the second domain 10b, the third domain 10c, and the fourth domain 10d. The pixel electrode 35 of the fourth modification includes a first pixel electrode 35N having an electrode structure in which the fine slit 36 is provided in two regions located at the first and third positions from one electrode end among the regions superimposed on the four domains while the fine slit 36 is not provided in the two regions located at the second and fourth positions and a second pixel electrode 35P having an electrode structure in which the fine slit 36 is provided in the two regions located at the second and fourth positions from one electrode end while the fine slit 36 is not provided in two regions located at the first and third positions. In relation to the domain, the pixel electrode 35 of the fourth modification includes the first pixel electrode 35N having the configuration in which the fine slit 36 is provided in the region superimposed on the first domain 10a and the region superimposed on the third domain 10c while the fine slit 36 is not provided in the region superimposed on the second domain 10b and the region superimposed on the fourth domain 10d and the second pixel electrode 35P having the configuration in which the fine slit 36 is provided in the two regions superimposed on the two types of domains (the second domain 10b and the fourth domain 10d) in which the fine slit 36 is not provided in the first pixel electrode 35N while the fine slit 36 is not provided in the remaining two regions.

In the liquid crystal display device of the fourth modification in FIG. 15, as compared with the liquid crystal display device of the embodiment, the granular feeling at a close distance and the jaggy feeling at the edge of the box are improved, and the relatively clear display is obtained. As compared with the liquid crystal display devices of the embodiment and the first to third modifications, the two-line-period horizontal stripe seen obliquely at a close distance is also improved. On the other hand, when the liquid crystal display device of the fourth modification is viewed from a relatively distant distance, the unevenness improvement effect is slightly inferior to that of the embodiment and the first to third modifications.

Figure 16:
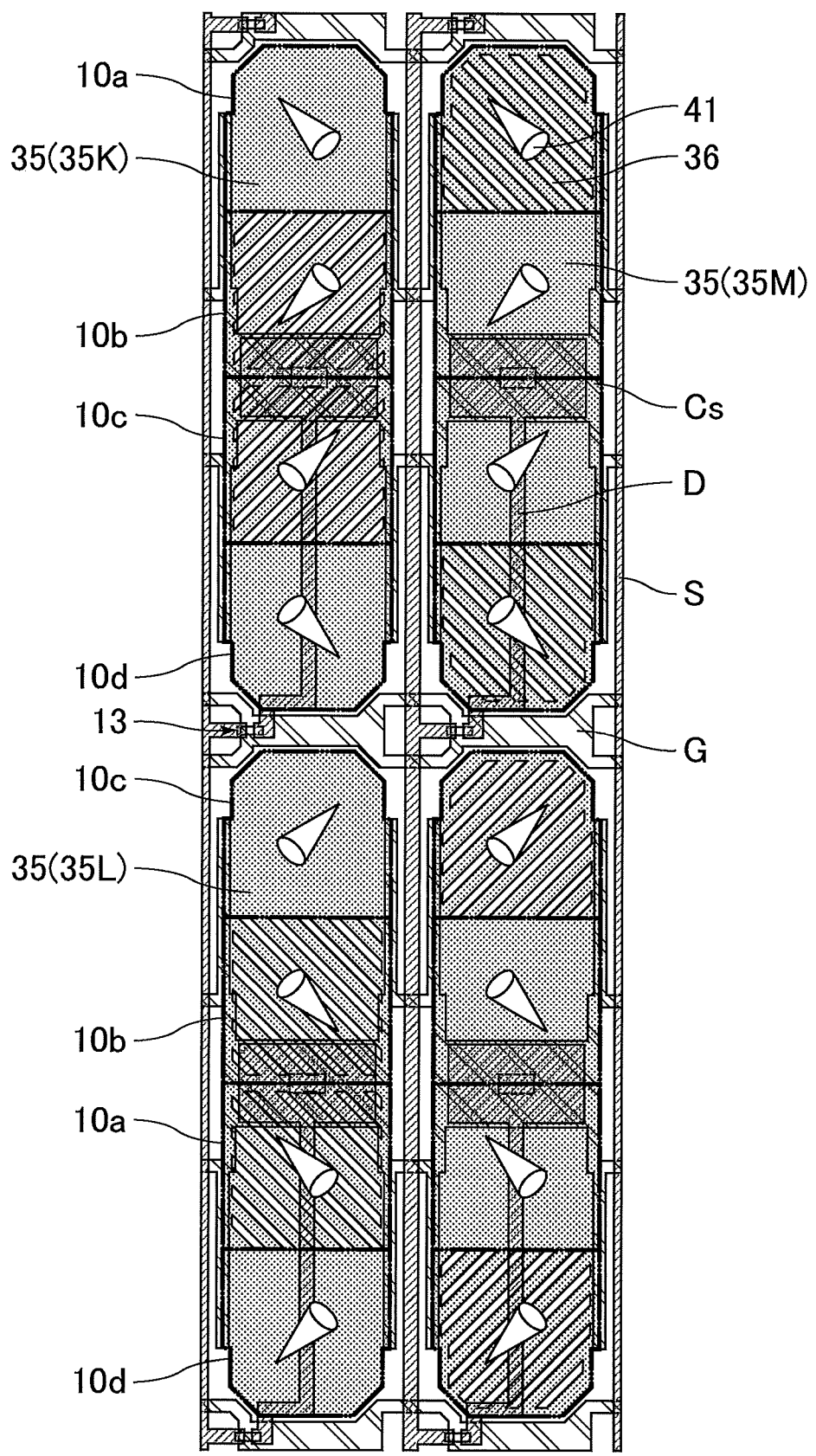
FIG. 16 is a schematic plan view illustrating the oblique azimuth of the liquid crystal molecules in the liquid crystal layer while the oblique azimuth is superposed on an example of an electrode and line structure of a first substrate according to a fifth modification.

FIG. 16 is a schematic plan view illustrating the oblique azimuth of the liquid crystal molecules 41 in the liquid crystal layer 40 while the oblique azimuth is superposed on an example of the electrode and line structure of the first substrate 30 according to a fifth modification. The fifth modification is different from the embodiment only in that the solid electrode region does not exist at the domain boundary located in the light transmission region to match the ends of the fine slits 36 of the pixel electrodes 35 of adjacent columns with each other. That is, when the pixel electrodes 35 of adjacent columns are translated and superposed, the region where the fine slit 36 does not exist does not exist at the boundary between the first region and the second region from the pixel electrode end, and the region where the fine slit 36 does not exist does not exist at the boundary between the third region and the fourth region from the pixel electrode end.

In the liquid crystal display device of the fifth modification in FIG. 16, the luminance tends to be improved as compared with the liquid crystal display devices of the embodiment and the first to fourth modifications. On the other hand, the luminance is easily decreased when the misalignment is generated.

As illustrated in FIGS. 4 and 14 to 16, one of the two pixel electrodes 35 of the adjacent column includes the fine slit 36 in the first region from the end of the electrode but does not include the fine slit 36 in the second region, and the other pixel electrode 35 does not include the fine slit 36 in the first region from the end of the electrode but includes the fine slit 36 in the second region, and/or one of the two pixel electrodes 35 of the adjacent column includes the fine slit 36 in the third region from the end of the electrode but does not include the fine slit 36 in the fourth region, and the other pixel electrode 35 does not include the fine slit 36 in the third region from the edge of the electrode but includes the fine slit 36 in the fourth region. At this point, the arrangement of the fine slits 36 may have the following features.

The ends of the fine slits 36 of the pixel electrodes 35 of the adjacent column are not matched with each other.

When the pixel electrodes 35 of the adjacent column are translated and superposed, the region where fine slit 36 does not exist exists at the boundary between the first region and the second region from the pixel electrode end.

When the pixel electrodes 35 of the adjacent columns are translated and superposed, the region where fine slit 36 does not exist exists at the boundary between the third region and the fourth region from the pixel electrode end.

As illustrated in FIGS. 4 and 14 to 16, one of the two pixel electrodes 35 of the adjacent column includes the fine slit 36 in the first region from the end of the electrode but does not include the fine slit 36 in the second region, and the other pixel electrode 35 does not include the fine slit 36 in the first region from the end of the electrode but includes the fine slit 36 in the second region, and/or one of the two pixel electrodes 35 of the adjacent column includes the fine slit 36 in the third region from the end of the electrode but does not include the fine slit 36 in the fourth region, and the other pixel electrode 35 does not include the fine slit 36 in the third region from the edge of the electrode but includes the fine slit 36 in the fourth region. At this point, the arrangement of the fine slits 36 may have the following features, and for example, the first substrate 30 in FIG. 16 satisfies all the following features.

The ends of the fine slits 36 of the pixel electrodes 35 of the adjacent column are matched with each other.

When the pixel electrodes 35 of the adjacent columns are translated and superposed, the region where fine slit 36 does not exist does not exist at the boundary between the first region and the second region from the pixel electrode end.

When the pixel electrodes 35 of the adjacent columns are translated and superposed, the region where fine slit 36 does not exist does not exist at the boundary between the third region and the fourth region from the pixel electrode end.

Figure 17:
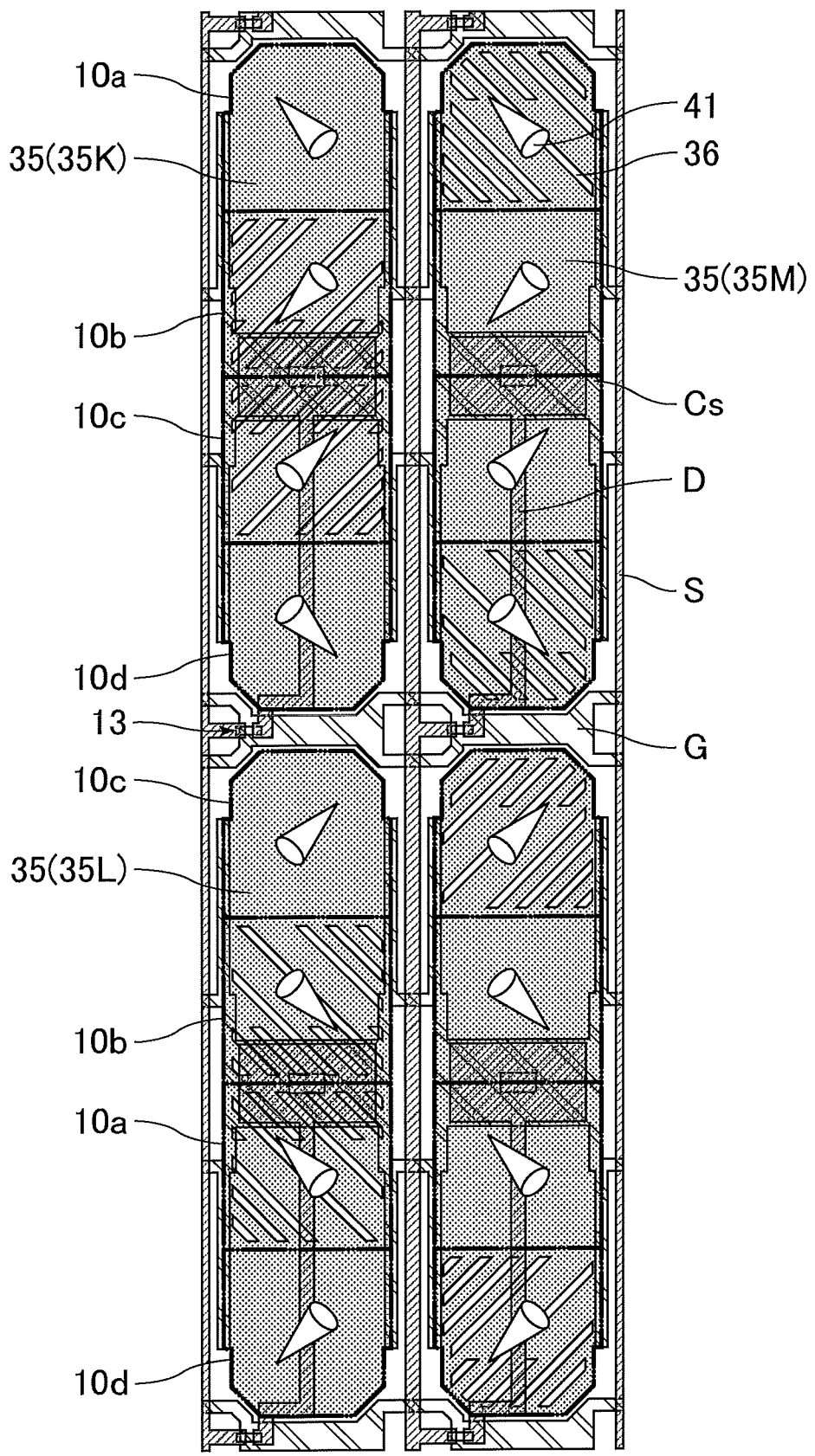
FIG. 17 is a schematic plan view illustrating the oblique azimuth of the liquid crystal molecules in the liquid crystal layer while the oblique azimuth is superposed on an example of an electrode and line structure of a first substrate according to a sixth modification.
Figure 18A:
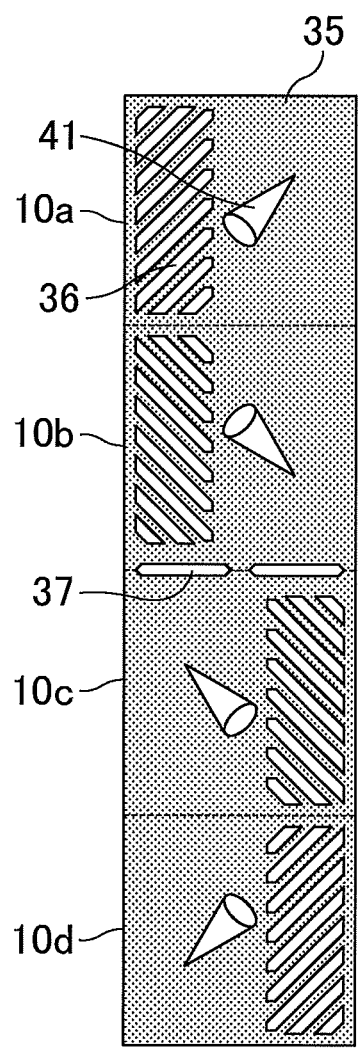
FIGS. 18A to 18E are schematic plan views each illustrating an example of an arrangement pattern of the fine slits.
Figure 18B:
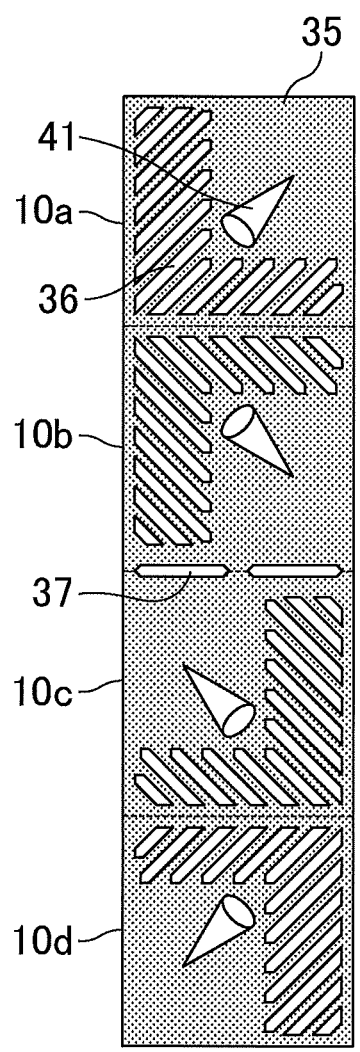
Figure 18C:
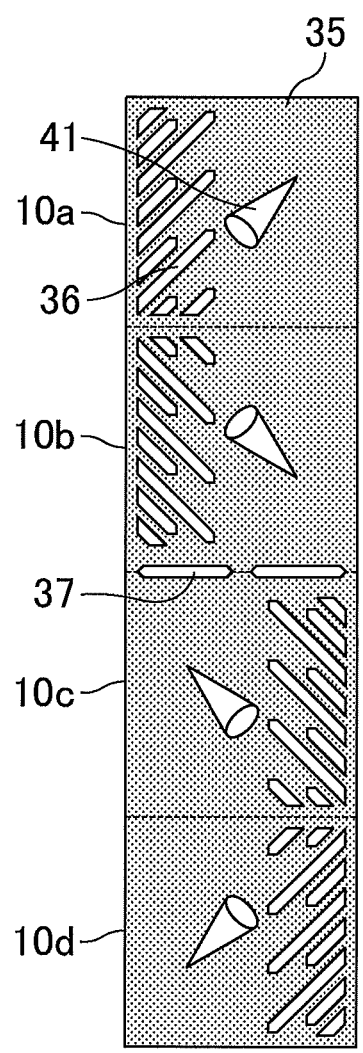
Figure 18D:
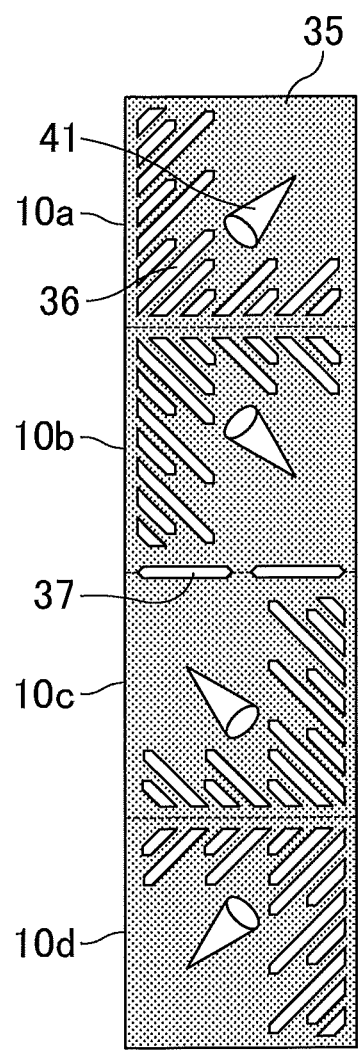
Figure 18E:
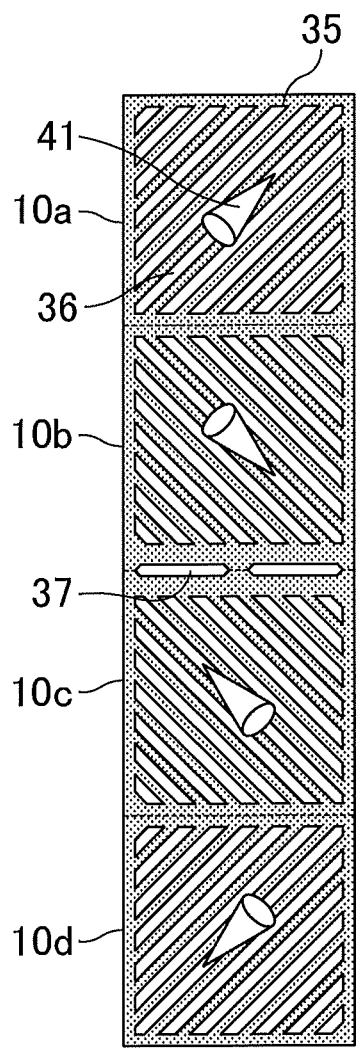

FIG. 17 is a schematic plan view illustrating the oblique azimuth of the liquid crystal molecules 41 in the liquid crystal layer 40 while the oblique azimuth is superposed on an example of the electrode and line structure of the first substrate 30 according to a sixth modification. The sixth modification is different from the embodiment only in that the ends of the fine slits 36 are not linearly arranged while the fine slit is thinned out.

In the liquid crystal display device of the sixth modification in FIG. 17, as compared with the liquid crystal display devices of the embodiment and the first to fifth modifications, the unevenness improvement effect tends to be slightly favorable when the liquid crystal display device of the sixth modification is viewed from a relatively distant distance. On the other hand, there is a tendency that the luminance is slightly decreased.

In the present invention, the arrangement of the fine slits 36 may have the following features. For example, the first substrate 30 in FIG. 17 satisfies all the following features.

Some of the fine slits 36 are broken in the middle.

A pitch of the fine slits 36 changes within the pixel electrode.

The region where the pitch of the fine slits 36 is dense is located at the pixel electrode end.

The region where the pitch of the fine slits 36 is dense has an L shape, and is in two portions at the pixel electrode end.

Table 1 illustrates features of the embodiment and the first to sixth modifications. As illustrated in Table 1, in the embodiment and the first to third and fifth modifications, the scanning unevenness improvement effect is equal when viewed at a relatively long distance, but a difference in display quality exists when viewed at a relatively close distance. The first to third modifications are better than in the embodiment, particularly in second modification, the jaggy feeling of edges is eliminated and the clear display is obtained. In the fourth modification, although the scanning unevenness improvement effect is slightly inferior, the display quality at a close distance is satisfactory, so that the fourth modification is suitably used when the scanning unevenness can be improved by improving the manufacturing process or the like. Conversely, when problems such as the manufacturing process are large but the scanning unevenness cannot be expected to be improved, the sixth modification is suitably selected.

TABLE 1

| | Corresponding drawing | Domain array period in column direction | Slit and solid electrode arrangement pattern | Arrangement of fine slit |
|---|---|---|---|---|
| Embodiment | FIG. 4 | Two lines | Half pixel has checkered pattern | Sloid portion exists at domain boundary located in transmission region |
| First modification | FIG. 12 | Two lines | Half-line stripe Both ends are solid electrode | Sloid portion exists at domain boundary located in transmission region |
| Second modification | FIG. 13 | Two lines | Half-line stripe Central portion is solid electrode | Sloid portion exists at domain boundary located in transmission region |
| Third modification | FIG. 14 | Two lines | Quarter pixel has checkered pattern | Sloid portion exists at domain boundary located in transmission region |
| Fourth modification | FIG. 15 | One line | Quarter pixel has checkered pattern | Sloid portion exists at domain boundary located in transmission region |
| Fifth modification | FIG. 16 | Two lines | Half pixel has checkered pattern | Sloid portion does not exist at domain boundary located in transmission region |
| Sixth modification | FIG. 17 | Two lines | Half pixel has checkered pattern | Fine slit is thinned out |

| | unevenness viewed at relatively long distance (such as scanning unevenness) | Abnormality viewed at comparatively close distance | | |
|---|---|---|---|---|
| | | Lateral line feeling of gray scale display | Granular feeling of gray scale display | Jaggy feeling of edge of box |
| Embodiment | (Comparison reference) | (Comparison reference) | (Comparison reference) | (Comparison reference) |
| First modification | Equal | Slightly inferior | Good | Good (however, edge has a double line shape) |
| Second modification | Equal | Slightly inferior | Good | Good |
| Third modification | Equal | Equal | Slightly good | Slightly good |
| Fourth modification | Slightly inferior | Good | Slightly good | Slightly good |
| Fifth modification | Equal | Equal | Equal | Equal |
| Sixth modification | Good | Equal | Equal | Equal |

Table 2 illustrates the feature of each element.

TABLE 2

| Element | | Corresponding drawing | Feature |
|---|---|---|---|
| Domain array period in column direction | Two lines | FIGS. 4, 12, 13, 14, 16, 17 | Advantage: A complementary relationship between a pixel shape (upper and lower ends of pixel: A and center: B) and a combination of four domains 1 to 4 holds, and scanning unevenness having viewing angle can be suppressed. An nth row becomes "1/A, 2/B, 3/B, 4/A", an (n + 1)th row becomes "3/A, 4/B, 1/B, 2I/A", and both A and B are allocated to all the domains 1 to 4. Disadvantage: Sometimes two-line-pitch lateral line unevenness is visually recognized when obliquely viewed. Domains are arranged in a column direction in order of 3 × 4 × 3 × 4 × 1 × 2 × 1 × 2 × 3 × 4 × 3 × 4 × 1 × 2 × 1 × 2 . . . , and domains 3 and 4 are bright while domains 1 and 2 are dark when viewed from the right, so that bright bright bright bright dark dark dark dark bright bright bright bright dark dark dark dark . . . are obtained to occasionally visually recognize two-line-pitch lateral line unevenness when viewed from the right. (bright and dark are reverse when viewed from the left) |
| | One line | FIG. 15 | Advantage: When obliquely viewed, periodicity is minimum of one-line pitch, the two-line-pitch lateral line unevenness is not visually recognized. Domain arrangement in the column direction is 1 × 2 × 3 × 4 × 1 × 2 × 3 × 4 . . . , bright bright dark dark bright bright dark dark . . . to obtain a one-line period when viewed from the right. Disadvantage: There is deviation between the pixel shape and the combination of the four domains 1 to 4, so that the scanning unevenness suppression function in which the complementary relationship is used does not hold. The combination is "1/A, 2/B, 3/B, 4/A", all the domain 1 and 3 correspond to A, and all the domains 2 and 4 correspond to B. |
| Slit/solid electrode arrangement pattern | Half pixel has checkered pattern | FIGS. 4, 16, 17 | Advantage: Disadvantage: Granular feeling is conspicuous. In particular, granular feeling appears notably at horizontal-line boundary edge when halftone solid display is performed or a white or black box is displayed in a background of the halftone solid display. |
| | Half-line stripe Both ends are solid electrode | FIG. 12 | Advantage: The granular feeling is eliminated, and clear display is obtained. Disadvantage: Lateral line feeling is easily visually recognized. This is because the lateral line unevenness is superimposed on a bright and dark lateral line in halftone by slit and solid electrode arrangement. Domain array period in the column direction does not hold in one line, at least two line are required. (For the viewpoint of eliminating deviation of the viewing angle) |
| | Half-line stripe Central portion is solid electrode | FIG. 13 | Advantage: The granular feeling is eliminated, and clear display is obtained. Disadvantage: Lateral line feeling is easily visually recognized. This is because the lateral line unevenness is superimposed on a bright and dark lateral line in halftone by slit and solid electrode arrangement. Domain array period in the column direction does not hold in one line, at least two line are required. (For the viewpoint of eliminating deviation of the viewing angle) |
| | Quarter pixel has checkered pattern | FIGS. 14, 16 | Advantage: Checkered-pattern dot has high density, and granular feeling is improved. Disadvantage: Granular feeling is not completely eliminated. |
| Arrangement of fine slit | Solid portion exists at domain boundary located in transmission region | FIGS. 4, 12, 13, 14, 15 | (Comparison reference) |
| | Solid portion does not exist at domain boundary located in transmission region | FIG. 16 | Advantage: Transmittance is slightly improved. Disadvantage: High accuracy is required for optical alignment process (division exposure) in manufacturing step, alignment between TFT substrate and CF substrate, and bonding. |
| | Fine slit is thinned out | FIG. 17 | Advantage: Scanning unevenness improvement effect is improved. Disadvantage: Luminance and transmittance tend to be decreased. |

[Additional Remarks]

According to one aspect of the present invention, there is provided a liquid crystal panel including, in the following order: a first substrate including multiple pixel electrodes arranged into a matrix form and a first alignment film; a liquid crystal layer containing liquid crystal molecules; and a second substrate including a common electrode and a second alignment film, wherein an alignment vector is defined as being from a first substrate side long-axis end of each of the liquid crystal molecules, a start point, to a second substrate side long-axis end of the liquid crystal molecule, an end point, and the first alignment film and the second alignment film having been subjected to an alignment treatment each include a first domain in which a direction of the alignment vector is a first direction, a second domain in which a direction of the alignment vector is a second direction, a third domain in which a direction of the alignment vector is a third direction, and a fourth domain in which a direction of the alignment vector is a fourth direction, in a column direction in each display unit region superimposed on one of the pixel electrodes, in at least 30 pixels consecutive in a row direction, arrays of the domains are identical, the domains in the display unit region located in an nth row, where n is any integer of 1 or more, are arranged in an order of the first domain, the second domain, the third domain, and the fourth domain, and each of the pixel electrodes includes a first pixel electrode having a configuration in which fine slits parallel to the alignment vector of the corresponding domain is provided in at least one of a region superimposed on the first domain, a region superimposed on the second domain, a region superimposed on the third domain, or a region superimposed on the fourth domain while the fine slits are not provided in the remaining regions.

In the above aspect, the fine slits may not be provided at both ends of each of the pixel electrodes in the column direction.

In the above aspect, the fine slits may not be provided up to an end of each of the pixel electrodes.

The pixel electrodes may include at least one of the following combinations (1) to (4):

(1) a combination of the pixel electrode in which the fine slits are provided in the region superimposed on the first domain and the pixel electrode in which the fine slits are not provided in the region superimposed on the first domain;

(2) a combination of the pixel electrode in which the fine slits are provided in the region superimposed on the second domain and the pixel electrode in which the fine slits are not provided in the region superimposed on the second domain;

(3) a combination of the pixel electrode in which the fine slits are provided in the region superimposed on the third domain and the pixel electrode in which the fine slits are not provided in the region superimposed on the third domain; and (4) a combination of the pixel electrode in which the fine slits are provided in the region superimposed on the fourth domain and the pixel electrode in which the fine slits are not provided in the region superimposed on the fourth domain.

The first pixel electrode may have a configuration in which the fine slits are provided in two of the region superimposed on the first domain, the region superimposed on the second domain, the region superimposed on the third domain, and the region superimposed on the fourth domain while the fine slit is not provided in the remaining two regions.

The plurality of pixel electrodes may include the second pixel electrode. The second pixel electrode is disposed adjacent to the first pixel electrode, and have the configuration in which the fine slits are provided in two regions superimposed on two types of domains in which the fine slits are not provided in the first pixel electrode while the fine slits are not provided in the remaining two regions.

In the above aspect, the first pixel electrode may have the configuration in which the fine slits are provided in the region superimposed on the first domain and the region superimposed on the third domain while the fine slits are not provided in the region superimposed on the second domain and the region superimposed on the fourth domain, and the second pixel electrode may have the configuration in which the fine slits are provided in the region superimposed on the second domain and the region superimposed on the fourth domain while the fine slits are not provided in the region superimposed on the first domain and the region superimposed on the third domain.

In the above aspect, in a plan view of the display unit region, the alignment vector of the first domain and the alignment vector of the second domain may have a relationship in which the end points are opposed to each other and the alignment vectors are orthogonal to each other, the alignment vector of the second domain and the alignment vector of the third domain may have a relationship in which the start points are opposed to each other and the alignment vectors are parallel to each other, and the alignment vector of the third domain and the alignment vector of the fourth domain may have a relationship in which the end points are opposed to each other and the alignment vectors are orthogonal to each other.

The domains in the display unit region located in the (n+1)th row may satisfy a relationship in which the first domain and the fourth domain are located between the second domain and the third domain.

The domains in the display unit region located in the (n+1)th row may be arranged in the order of the third domain, the fourth domain, the first domain, and the second domain.

In the above aspect, the first pixel electrode may have the configuration in which the fine slits are provided in two regions located at the first and third positions from one electrode end among the regions superimposed on the four domains while the fine slits are not provided in the two regions located at the second and fourth positions, and the liquid crystal panel may include the third pixel electrode disposed adjacent to the first pixel electrode, the third pixel electrode having the configuration in which the fine slit is provided in the two regions located at the second and fourth positions from one electrode end while the fine slits are not provided in two regions located at the first and third positions.

In the above aspect, the first pixel electrode may have the configuration in which the fine slits are provided in two regions located at the second and third positions from one electrode end among the regions superimposed on the four domains while the fine slits are not provided in the two regions located at the first and fourth positions, and the liquid crystal panel may include the fourth pixel electrode disposed adjacent to the first pixel electrode, the fourth pixel electrode having the configuration in which the fine slits are provided in the two regions located at the first and fourth positions from one electrode end while the fine slits are not provided in two regions located at the second and third positions.

The liquid crystal molecules may be aligned substantially vertically to the first substrate and the second substrate when no voltage is applied to the liquid crystal layer, and the liquid crystal molecules may obliquely be aligned so as to be matched with each of the alignment vectors of the first domain, the second domain, the third domain, and the fourth domain when the voltage is applied to the liquid crystal layer.

An inter-substrate twist angle of the liquid crystal molecules may be less than or equal to 45° in the first domain, the second domain, the third domain, and the fourth domain.

At least one of the first alignment film or the second alignment film may be a photo alignment film.

Preferably both the first alignment film and the second alignment film are photo alignment films.

According to another aspect of the present invention, there is provided a method of manufacturing the liquid crystal panel of the above aspect, the method including forming the fine slits by photolithography, the photolithography including irradiating a photosensitive resin formed on a conductive film with light through a mask in which a pattern corresponding to the fine slits is formed and multiple lenses.

According to still another aspect of the present invention, there is provided a method of manufacturing the liquid crystal panel of the above aspect, wherein the alignment treatment performed on the photo alignment film includes irradiating the photo alignment film with polarized light emitted from a light source through a polarizer in an oblique direction, and a polarization axis of the polarizer is rotated in a range of −15° to +15° from a 45° azimuth such that an exposure direction on a surface of the photo alignment film is adjusted to the substantial 45° azimuth with respect to a light irradiation direction.

What is claimed is:
1. A liquid crystal panel comprising, in the following order:
 a first substrate including multiple pixel electrodes arranged into a matrix form and a first alignment film;
 a liquid crystal layer containing liquid crystal molecules; and a second substrate including a common electrode and a second alignment film, wherein an alignment vector is defined as being from a first substrate side long-axis end of each of the liquid crystal molecules, a start point, to a second substrate side long-axis end of the liquid crystal molecule, an end point, and the first alignment film and the second alignment film having been subjected to an alignment treatment each include a first domain in which a direction of the alignment vector is a first direction, a second domain in which a direction of the alignment vector is a second direction, a third domain in which a direction of the alignment vector is a third direction, and a fourth domain in which a direction of the alignment vector is a fourth direction, in a column direction in each display unit region superimposed on one of the pixel electrodes, in at least 30 pixels consecutive in a row direction, arrays of the domains are identical, the domains in the display unit region located in an nth row, where n is any integer of 1 or more, are arranged in an order of the first domain, the second domain, the third domain, and the fourth domain, and each of the pixel electrodes includes a first pixel electrode having a configuration in which fine slits parallel to the alignment vector of the corresponding domain is provided in at least one of a region superimposed on the first domain, a region superimposed on the second domain, a region superimposed on the third domain, or a region superimposed on the fourth domain while the fine slits are not provided in the remaining regions.

2. The liquid crystal panel according to claim 1, wherein the fine slits are not provided at both ends of each of the pixel electrodes in the column direction.

3. The liquid crystal panel according to claim 1, wherein the fine slits do not extend to an end of each of the pixel electrodes.

4. The liquid crystal panel according to claim 1, wherein the pixel electrodes include at least one of the following combinations (1) to (4):
(1) a combination of the pixel electrode in which the fine slits are provided in the region superimposed on the first domain and the pixel electrode in which the fine slits are not provided in the region superimposed on the first domain;
(2) a combination of the pixel electrode in which the fine slits are provided in the region superimposed on the second domain and the pixel electrode in which the fine slits are not provided in the region superimposed on the second domain;
(3) a combination of the pixel electrode in which the fine slits are provided in the region superimposed on the third domain and the pixel electrode in which the fine slits are not provided in the region superimposed on the third domain; and
(4) a combination of the pixel electrode in which the fine slits are provided in the region superimposed on the fourth domain and the pixel electrode in which the fine slits are not provided in the region superimposed on the fourth domain.

5. The liquid crystal panel according to claim 1, wherein the first pixel electrode has a configuration in which the fine slits are provided in two of the region superimposed on the first domain, the region superimposed on the second domain, the region superimposed on the third domain, and the region superimposed on the fourth domain while the first slits are not provided in the remaining two regions.

6. The liquid crystal panel according to claim 5, wherein each of the pixel electrodes includes a second pixel electrode disposed adjacent to the first pixel electrode, the second pixel electrode having a configuration in which the fine slits are provided in two regions superimposed on two types of domains in which the fine slits are not provided in the first pixel electrode while the fine slits are not provided in the remaining two regions.

7. The liquid crystal panel according to claim 6, wherein the first pixel electrode has a configuration in which the fine slits are provided in the region superimposed on the first domain and the region superimposed on the third domain while the fine slits are not provided in the region superimposed on the second domain and the region superimposed on the fourth domain, and the second pixel electrode has a configuration in which the fine slits are provided in the region superimposed on the second domain and the region superimposed on the fourth domain while the fine slits are not provided in the region superimposed on the first domain and the region superimposed on the third domain.

8. The liquid crystal panel according to claim 1, wherein in a plan view of the display unit region, the alignment vector of the first domain and the alignment vector of the first domain and the alignment vector of the second domain have a relationship in which the end points are opposed to each other and the alignment vectors are orthogonal to each other, the alignment vector of the second domain and the alignment vector of the third domain have a relationship in which the start points are opposed to each other and the alignment vectors are parallel to each other, and the alignment vector of the third domain and the alignment vector of the fourth domain have a relationship in which the end points are opposed to each other and the alignment vectors are orthogonal to each other.

9. The liquid crystal panel according to claim 1, wherein the domains in the display unit region located in an (n+1)th row satisfy a relationship in which the first domain and the fourth domain are located between the second domain and the third domain.

10. The liquid crystal panel according to claim 9, wherein the domains in the display unit region located in the (n+1)th row are arranged in an order of the third domain, the fourth domain, the first domain, and the second domain.

11. The liquid crystal panel according to claim 1, wherein the first pixel electrode has a configuration in which the fine slits are provided in two regions located at first and third positions from one electrode end among the regions superimposed on the four domains while the fine slits are not provided in the two regions located at second and fourth positions, and each of the pixel electrodes includes a third pixel electrode disposed adjacent to the first pixel electrode, the third pixel electrode having a configuration in which the fine slits are provided in the two regions located at the second and fourth positions from one electrode end while the fine slits are not provided in two regions located at the first and third positions.

12. The liquid crystal panel according to claim 1, wherein the first pixel electrode has a configuration in which the fine slits are provided in two regions located at second and third positions from one electrode end among the regions superimposed on the four domains while the fine slits are not provided in the two regions located at first and fourth positions, and each of the pixel electrodes includes a fourth pixel electrode disposed adjacent to the first pixel electrode, the fourth pixel electrode having a configuration in which the fine slits are provided in the two regions located at the first and fourth positions from one electrode end while the fine slits are not provided in two regions located at the second and third positions.

13. The liquid crystal panel according to claim 1, wherein the liquid crystal molecules are aligned substantially vertically to the first substrate and the second substrate when no voltage is applied to the liquid crystal layer, and the liquid crystal molecules are obliquely aligned so as to be matched with the alignment vectors of the first domain, the second domain, the third domain, and the fourth domain when voltage is applied to the liquid crystal layer.

14. The liquid crystal panel according to claim 1, wherein an inter-substrate twist angle of the liquid crystal molecules is less than or equal to 45° in the first domain, the second domain, the third domain, and the fourth domain.

15. The liquid crystal panel according to claim 1, wherein at least one of the first alignment film or the second alignment film is a photo alignment film.

16. The liquid crystal panel according to claim 15, wherein both the first alignment film and the second alignment film are photo alignment films.

17. A method of manufacturing the liquid crystal panel according to claim 15, wherein the alignment treatment performed on the photo alignment film includes irradiating the photo alignment film with polarized light emitted from a light source through a polarizer in an oblique direction, and a polarization axis of the polarizer is rotated in a range of −15° to +15° from a 45° azimuth such that an exposure direction on a surface of the photo alignment film is adjusted to the substantial 45° azimuth with respect to a light irradiation direction.

18. A method of manufacturing the liquid crystal panel according to claim 1, the method comprising
forming the fine slits by photolithography,
the photolithography including irradiating a photosensitive resin formed on a conductive film with light through a mask in which a pattern corresponding to the fine slits is formed and multiple lenses.

* * * * *